United States Patent
Luukko et al.

(10) Patent No.: US 10,414,074 B2
(45) Date of Patent: Sep. 17, 2019

(54) METHOD TO MANUFACTURE A COMPOSITE PRODUCT WITH MICRO CONTOURED SURFACE LAYER

(71) Applicant: UPM-KYMMENE CORPORATION, Helsinki (FI)

(72) Inventors: Kari Luukko, Espoo (FI); Stefan Fors, Kausala (FI); Harri Kosonen, Lappeenranta (FI); Sami Turunen, Lappeenranta (FI); Jere Salminen, Lappeenranta (FI); Petri Myllytie, Porsgrunn (NO)

(73) Assignee: UPM-KYMMENE CORPORATION, Helsinki (FI)

( * ) Notice: Subject to any disclaimer, the term of this patent is extended or adjusted under 35 U.S.C. 154(b) by 497 days.

(21) Appl. No.: 14/891,525

(22) PCT Filed: May 14, 2013

(86) PCT No.: PCT/FI2013/050526
§ 371 (c)(1),
(2) Date: Nov. 16, 2015

(87) PCT Pub. No.: WO2014/184418
PCT Pub. Date: Nov. 20, 2014

(65) Prior Publication Data
US 2016/0082625 A1    Mar. 24, 2016

(51) Int. Cl.
*B29C 37/00* (2006.01)
*B29C 45/00* (2006.01)
(Continued)

(52) U.S. Cl.
CPC .......... *B29C 37/0053* (2013.01); *B29C 45/00* (2013.01); *B29C 59/18* (2013.01);
(Continued)

(58) Field of Classification Search
None
See application file for complete search history.

(56) References Cited

U.S. PATENT DOCUMENTS

2011/0256348 A1* 10/2011 Koivisto ............. B29C 47/0004
                                                            428/146
2012/0090800 A1    4/2012 Ture et al.

FOREIGN PATENT DOCUMENTS

JP         08267530 A    10/1996
JP      2000334808 A    12/2000
(Continued)

OTHER PUBLICATIONS

May 9, 2014 Search Report issued in International Patent Application No. PCT/FI2013/050526.
(Continued)

*Primary Examiner* — Edmund H Lee
(74) *Attorney, Agent, or Firm* — Cantor Colburn LLP

(57) ABSTRACT

Providing composite structures with micro contoured surface layer. There is provided a method to adjust roughness level of micro contoured surface layer when manufacturing a composite and products thereof. The micro contoured surface layer may cover all or at least part of the surface area of the composite product. The roughness level of micro contoured surface layer may be increased or decreased by controlling the process parameters. In particular, there is provided a method to increase the roughness level of composite material having a primary surface layer with a primary surface roughness by softening the primary surface layer of the composite material by heating and providing a secondary surface layer of the composite material surface with a secondary surface roughness by cooling the softened surface layer. Further, there are provided methods to deter-
(Continued)

mine and visualize the level of micro contoured surface layer roughness on a composite product surface.

9 Claims, 24 Drawing Sheets

(51) Int. Cl.
*B29C 59/18* (2006.01)
*B29K 101/12* (2006.01)
*B29K 105/12* (2006.01)

(52) U.S. Cl.
CPC ...... *B29K 2101/12* (2013.01); *B29K 2105/12* (2013.01); *B29K 2995/0072* (2013.01)

(56) References Cited

FOREIGN PATENT DOCUMENTS

| | | |
|---|---|---|
| JP | 2001246664 A | 9/2001 |
| JP | 2005131807 A | 5/2005 |
| JP | 2009543929 A | 12/2009 |
| JP | 2010023356 A | 2/2010 |
| JP | 2012241735 A | 3/2012 |
| JP | 2012506800 A | 3/2012 |
| JP | 2012233043 A | 11/2012 |
| WO | 2010049593 A2 | 5/2010 |
| WO | 2011/051546 A1 | 5/2011 |

OTHER PUBLICATIONS

May 9, 2014 Written Opinion issued in International Patent Application No. PCT/FI2013/050526.

Research and Application of the Key Technology in Rapid Heat Cycle Molding; by Wang GuiLong, p. 283 to p. 300, Chinese Doctoral Dissertations Full-Text Database, Engineering Technology I, vol. 6, 2012, Jun. 15, 2012; English Translation (Concise Explanation of Relevance).

Research and Application of the Key Technology in Rapid Heat Cycle Molding; by Wang GuiLong, p. 283 to p. 300, Chinese Doctoral Dissertations Full-Text Database, Engineering Technology I, vol. 6, 2012, Jun. 15, 2012; Non-English Translation.

China Office Action for China Patent Application No. 201380078200. 2; OA Transmission dated Sep. 21, 2016; 14 pages; English Translation.

Len et al "Plastics forming technology and mould design"; UESTCP; 2013; pp. 44, partial translation attached.

Wang et al "Plastic Mold Design"; JUACP; 2009; pp. 48-49, partial translation attached.

\* cited by examiner

METHOD TO MANUFACTURE A COMPOSITE PRODUCT WITH MICRO CONTOURED SURFACE LAYER

FIELD OF THE INVENTION

This invention relates to providing composite structures with a micro contoured surface layer.

BACKGROUND

A variety of materials can be used for the manufacture of products, including metals, polymers or ceramics. Polymer materials are often used in industrial applications. However, utilization of composites is increasing. Some composite products typically comprise wood material and at least one kind of plastic polymer. Such composite products may differ from the polymers and be used for several purposes, for example in indoor or outdoor applications.

SUMMARY

The visual appearance of a product surface is a factor in deciding how appealing the product is for a user. However, at the same time, the user appreciates a functionality of the product, in particular the surface of the product and how it feels. In the mind of a user, polymer products often are a benchmark for evaluating the visual appearance of a composite. However, the artificial feeling of the polymer surface is less desired. An object of the invention is to provide a method to produce composite product comprising organic natural fiber based material, said composite product having a surface comprising a visual appearance resembling that of a polymer surface, but having a micro contoured surface layer providing the composite product surface with more natural feeling and enhanced functionality, such as an effect on the heat conductivity, surface roughness, printability, surface tension, paintability, attachment of a glue, gloss, colour, colour uniformity, surface friction or adhesive properties, for example. Further object of the invention is to enable providing products and components comprising such micro contoured surface layer.

Another object of the invention is to provide a method to adjust the roughness level of the micro contoured surface layer when manufacturing a composite and products thereof. The micro contoured surface layer may cover all of the surface or at least part of the surface area of the composite product. The roughness level of the micro contoured surface layer may be increased or decreased, by controlling the process parameters.

In particular, there is provided a method to increase the roughness level of composite material having a primary surface layer with a primary surface roughness by softening said primary surface layer of said composite material by heating and providing a secondary surface layer of said composite material surface with a secondary surface roughness by cooling said softened surface layer.

Further, there are provided methods, such as surface gloss measurement, surface friction measurement, ink absorbency measurements, surface colour value measurements, colour difference and variance determinations and surface roughness level measurements to determine and visualize the level of micro contoured surface layer roughness on a composite product surface.

Objects and embodiments of the invention are further described in the independent and dependent claims of the application.

Figure 1:
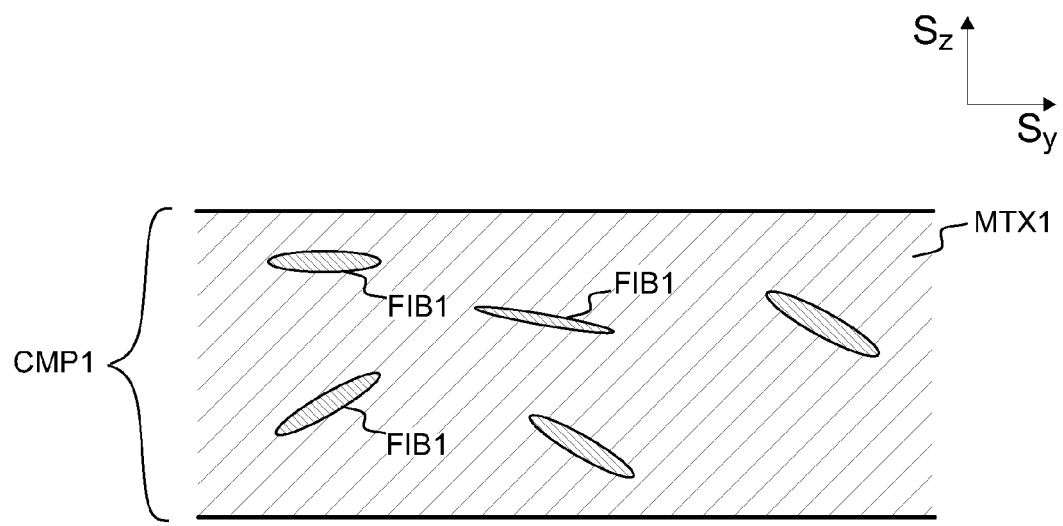
FIG. 1 illustrates a composite according to an embodiment of the invention.

In the figures, $S_x$, $S_y$ and $S_z$ represent orthogonal directions which are perpendicular to each other.

DETAILED DESCRIPTION

Polymer composites comprising organic natural fiber FIB1 material maybe used for substitutes on many applications both outdoors and indoors, a non-limited exemplary listing including decking boards, construction materials, decorative items, frames, panels, facades, flooring, fencing, decking, stairs, rails, window frames, trims, pallets, containers, household articles, automotive parts, vehicle accessories, consumer spare parts, handles and the like. Polymer composites comprising organic natural fiber FIB1 material may also be produced as pellets to be further used to manufacture articles as described above. Further, polymer composites comprising organic natural fiber FIB1 material are appreciated due to their biorenewable properties. Environmental awareness has caused many authorities to pass new regulations, which may require new industrial products to meet demanding standards. As a consequence, environmental considerations may play an increasing role in the design and manufacturing processes of consumables and industrial products in the future. There is a demand for products which show consideration to the environment but retain a quality that is required by the applications where they may be used. Ability to design and differentiate a product for the intended purpose may be a key factor required from the next generation of composite products.

In many industries the quantity of produced items, especially items of composite material, is very high. For example, accessories and spare parts for vehicles may be annually produced in tens of millions of pieces. The items may differ from each other in a variety of ways, such as in size, shape, weight, colour, gloss, roughness, surface friction or surface texture, to name a few examples. Novel solutions may be required to meet the increasing demand for environmental products with high quality. Depending of the purpose, an end application may for example require that a shaped product is coloured. Alternatively, the intended application may require that an adhesive label or a print is permanently attached to the surface of the composite product. The object surface texture may be selected to reduce or enhance the friction at the object surface. In some applications the composite product may be provided with attachable surfaces. On products handled by a user the colour, amount of gloss, amount of friction and/or surface roughness may promote the user experience. Some applications, such as automotive dash board panels may require a specific shape, but reduced gloss. The dash board surface should further comprise reduced surface roughness, to facilitate the cleaning of the surface. Furthermore, a user may, for example differentiate two products resembling each other visually by touching them, wherein the difference between the two products may be the sense of softness to a touch. Further still, the environmental aspect may be improved by composite products comprising components that enhance the specific surface area and promote degradation of the composite product.

It may be challenging to manufacture a new composite product while retaining special qualities in the product. The product may have a decorative purpose and it may need to be differentiated according to customer preferences, for example by selecting the colour of the product or by printing or by attaching an adhesive label on the surface of the product. Alternatively, a specific surface roughness may be a requirement set by an authority, for example for safety reasons.

A Composite

FIG. 1 illustrates a composite CMP1 according to an embodiment of the invention. A composite CMP1 comprises matrix material MTX1 and organic natural fiber FIB1 based material. The composite CMP1 comprises two or more material components combined together. At least in some/all embodiments the constituents of the component retain their identity. In addition to matrix material MTX1 and organic natural fiber FIB1 based material other additives may be blended to the composite. The matrix material MTX1 and organic natural fiber FIB1 based material may not dissolve or otherwise merge completely with each other in a composite CMP1. The properties of the composite CMP1 may differ from the properties of its components acting alone.

Matrix Material

A composite CMP1 according to embodiments comprises matrix MTX1 material, to which organic natural fiber FIB1 based material is compounded. The matrix material MTX1 may comprise any suitable polymer or polymer composition. The polymer matrix MTX1 may comprise polymer, such as a thermoplastic polymer. Thermoplastic polymer may be a long chain polymer that may comprise amorphous or semi-crystalline structure. A long polymer chain may comprise various lengths of polymer chains, such that the average polymer length is typically above at least 1000 monomers, such as 2000 or 3000 or 5000 or 10000 monomers. In general, the longer the average chain length is, the higher is the average molecular weight of the polymer in daltons (Da). The thermoplastic polymer may be a homopolymer, copolymer, or a blend thereof. The polymers consisting of only one type of repeat units repeated along the polymer chain are referred to homopolymers. Chains composed of two or more different repeat units are termed copolymers.

According to an embodiment the matrix material MTX1 contains at least 50 wt-% (weight percent), at least 60 wt-%, more preferably at least 70 wt-%, or at least 80 wt-%, and most preferably at least 90 wt-% or at least 95 wt-% of thermoplastic polymer. The thermoplastic polymer may be at least one of the following: polyolefin, such as polyethylene, polypropylene and polybutylene, polystyrene, poly(acrylic nitrile butadiene styrene) copolymer (ABS), polyamide, aliphatic polyester, aromatic polyester, such as poly(ethylene terephthalate) and polycarbonate, polyether, poly(vinyl chloride), thermoplastic elastomer, thermoplastic polyurethane (TPU), polyimide, and any derivative or copolymer of said monomers. The thermoplastic polymer may alternatively or in addition comprise biodegradable polymer. There are many sources for biodegradable polymers, from synthetic to natural. Bio-based polymers, such as natural polymers (biopolymers), are available from renewable sources, while synthetic polymers are produced from non-renewable petroleum resources. The biodegradable polymer may be at least one of the following: poly(lactic acid) (PLA), poly(glycolic acid) (PGA), polycaprolactone poly(hydroxyl alkanoate) (PHA), polysaccharide, poly(alkene dicarboxylate) such as poly(butylene succinate) and poly(ethylene succinate), poly(butylene adipate-co-terephthalate), and any derivate or copolymer of said monomers, their derivatives, and/or any combinations thereof. In an embodiment the amount of the thermoplastic material in the matrix material MTX1 is at least 80 wt-%, more preferably at least 90 wt-%, and most preferably at least 95 wt-%. The matrix material MTX1 may comprise 40-98 wt-%, or preferably 60-95 wt-% thermoplastic polymer or polymer composition. In an embodiment the amount of the thermoplastic material in the composite CMP1 comprising matrix material MTX1 and organic natural fiber FIB1 based material is 5-90 wt-%, more preferably 10-75 wt-%, more preferably 20-65 wt-%, or most preferably 40-60 wt-%.

A suitable thermoplastic polymer retains sufficient thermoplastic properties to allow melt blending with organic natural fiber FIB1 based material. The thermoplastic polymer may have effect of enabling providing shaped articles and/or components from the composite CMP1. Thermoplastic polymer may be manufactured and/or shaped by methods such as moulding, extrusion or thermoforming, for example. Thermoplastic polymer may have effect of enabling providing integral shapes, which extend over a corner and/or which extend to a second surface, which may not be parallel with a first surface of an integral thermoplastic component.

Advantageously, the matrix material MTX1 comprises at least one of crystalline polymer, non-crystalline polymer, crystalline oligomer, non-crystalline oligomer, semi-crystalline polymer and semi-crystalline oligomer or a combination thereof. The matrix MTX1 materials comprise glass transition temperatures. Semi-crystalline polymers comprise in addition melt temperatures. Semi-crystalline polymers may comprise both crystalline and amorphous portions. Polyolefin, for example a polypropylene, is an example of a semi-crystalline matrix material MTX1. Degree of crystallinity for an amorphous matrix material MTX1 is approaching zero. For a semi-crystalline polymers degree of crystallinity may be 10-80 wt-%, or preferably 20-70 wt-%, or more preferably 40-60 wt-%. Polyolefin may comprise degree of crystallinity of 40-60 wt-%. Polypropylene may comprise degree of crystallinity of 40-60 wt %. Material comprising small molecules may achieve higher degree of crystallinity compared to materials comprising bigger molecules. Methods for evaluating the degree of crystallinity comprise density measurement, differential scanning calorimetry (DSC), X-ray diffraction (XRD), infrared spectroscopy and nuclear magnetic resonance (NMR). The measured value is dependent on the method used. Distribution of crystalline and amorphous regions may be visualized with microscopic techniques, like polarized light microscopy and transmission electron microscopy.

The polymer matrix MTX1 of a composite CMP1 may comprise a polyolefin. The polymer matrix MTX1 may comprise, for example, a homopolymer, a copolymer or a modified polymer of unsaturated aliphatic hydrocarbons. Polymers, which may be used in polymer composites CMP1 comprising organic natural fiber FIB1 based material may comprise, for example, polyethylene, polypropylene, polystyrene, polyamides, polyesters, and combinations thereof. The preferred polyolefins may comprise C2-C4 polyolefins, such as polyethylene and polypropylene. Polyethylene and polypropylene are also available in high purity grades without process interfering residues.

The polymer matrix MTX1 may comprise recycled polymer. Alternatively, the polymer matrix MTX1 may comprise virgin polymer. In addition, the polymer matrix MTX1 may comprise both recycled polymer and virgin polymer. A virgin polymer may be added to the polymer matrix MTX1. The amount of added polymer, such as polypropylene, may depend on the other raw materials used. For example, if recycled polymer material is used, the amount of added virgin polymer may depend on the amount of the different raw materials coming along the recycled material. The recycled raw material may comprise paper or polymer or both paper and polymer. The polymer matrix MTX1 may comprise at least 50 wt-%, or preferably 70 wt-%, or more preferably 95 wt-% of virgin polymer. In an example the polymer matrix MTX1 comprises 100 wt-% of virgin polymer. The virgin polymer may have effect of providing better stiffness properties compared to recycled polymer.

The thermoplastic polymer may alternatively or in addition be a biodegradable polymer. A suitable biodegradable polymer retains sufficient thermoplastic properties to allow melt blending with organic natural fiber FIB1 based material. The biodegradable polymer may have effect of enabling providing shaped articles and/or components from the composite CMP1, which have an accelerated rate of degradation in comparison to other polymers. Biodegradability may be defined according to standard SFS-EN-13432. Biodegradable polymers may be manufactured and/or shaped by methods such as moulding, extrusion or thermoforming, for example.

Density of a polymer matrix material MTX1 in a solid form may be approximately 1 g/cm3, for example 0.8-1.7 g/cm3. For example, low density polyethylene (LDPE) comprises density of 0.840-0.926 g/cm3; medium density polyethylene (MDPE) comprises density of 0.926-0.941 g/cm3, high density polyethylene (HDPE) comprises density of 0.941-0.990 g/cm3, polypropylene (PP) comprises density of 0.85-0.95 g/cm3, polystyrene (PS) comprises density of 1.00-1.150 g/cm3, polylactic acid (PLA) comprises density of 1.18-1.50 g/cm3.

Matrix material MTX1 according to embodiments may be formed into a new shape several times when it is heated. The matrix material MTX1 keeps its new shape after cooling and then it flows very slowly, or it does not flow at all. The matrix material MTX1 has at least one repeat unit. Number average molecular weight of the matrix material may be 18-1000 g/mol, or 100-500 g/mol, or 500-1000 g/mol, or 1000-10 000 g/mol, or 10 000-100 000 g/mol, or over 100 000 g/mol.

The matrix material MTX1 may contain one or more polymer material components. Advantageously, at least one polymer is selected from the group consisting of polyethylene, polypropylene and their combinations. Advantageously, the amount of polypropylene or polyethylene in the matrix material MTX1 is at least 50 wt. %, at least 60 wt. %, at least 70 wt. ° A), at least 80 wt. %, at least 90 wt. % or at least 95 wt. %.

Advantageously, the melting point $T_m$ of the matrix material MTX1 is under 250° C., preferably under 220° C., and more preferable under 190° C. Advantageously, the glass transition temperature of the matrix material MTX1 is under 250° C., preferably under 210° C., and more preferable under 170° C.

Advantageously, melt flow rate, MFR, of the matrix material MTX1 is under 1000 g/10 min (230° C., 2.16 kg defined by ISO 1133, valid 2011), more preferable 0.1-200 g/10 min, most preferable 0.3-150 g/10 min. Advantageously, melt flow rate, MFR, of the matrix material MTX1 is over 0.1 g/10 min (230° C., 2.16 kg defined by ISO 1133, valid 2011), more preferable over 1 g/10 min, most preferable over 3 g/10 min.

Organic Natural Fiber FIB1 Material

An organic natural fiber FIB1 based material comprises organic natural fiber FIB1 material. An organic natural fiber FIB1 based material further comprises regenerated organic natural fiber FIB1 material. In at least some/all embodiments organic natural fiber FIB1 material refers to material that contains cellulose. The organic natural fiber FIB1 material may comprise mechanically treated and/or chemically treated fibers and/or fiber-like particles. The treated particles used may comprise at least 30 wt-% or at least 40 wt-%, more preferably at least 50 wt-% or at least 60 wt-%, and most preferably at least 80 wt-% or at least 90 wt-% of mechanically treated organic natural fiber FIB1 material.

Mechanically treated may refer to organic natural fiber material, which is isolated from any organic natural raw material comprising cellulose by a mechanical pulping process. The mechanical pulping process could be preceded by a chemical pretreatment, producing chemimechanical pulp. The mechanically treated organic natural fiber FIB1 material may be, for example, ground, refined and/or powdered from the source used. In other words, a mechanical force has been used to treat the source of the organic natural fiber FIB1 material. The mechanically treated organic natural fiber FIB1 material may comprise, among other things, wood flour, saw dust, chip material, and/or mechanical pulp such as thermo mechanical pulp (TMP), groundwood pulp (GW), stone groundwood pulp (SGW), pressure groundwood pulp (PGW), refiner mechanical pulp (RMP), and/or chemithermomechanical pulp (CTMP). The mechanically treated organic natural fiber FIB1 material preferably comprise or consist of wood-based material, such as wood-based fibers, but they may also comprise or consist of non-wood material. The mechanically treated organic natural fiber FIB1 material may comprise recycled and/or virgin material, such as fibers or fiber-like particles. For example, at least 30 wt-% or at least 40 wt-%, more preferably at least 60 wt-%, and most preferably at least 80 wt-%, or most preferably at least 90 wt-% of the organic natural fiber FIB1 material used may be virgin material. In an example, 100 wt-% of the organic natural fiber FIB1 material comprises virgin material. For example, mechanically treated organic natural fiber FIB1 may comprise the saw dust or at least other mechanically treated wood or plant particles as main organic natural fiber FIB1 material. Mechanically treated organic natural fiber FIB1 material typically comprises lignin. In mechanically treated organic natural fiber FIB1 material, such as cellulose based fibers, lignin is present in various amounts, but typically in higher amounts than in chemically treated organic natural fiber FIB1 material. Lignin is a highly polymeric material, able to crosslink and may act as a water repellent in a cellulose based fiber plastic composite. For example in wood cells the presence of lignin limits the penetration of water into the wood cells, which makes the structure very compact. Organic natural fiber FIB1 material comprising lignin, however, is prone to decompose more easily at relatively low extrusion or injection molding temperatures, like 100-150° C., than fiber material free of lignin. Furthermore, the presence of lignin in a composite product may lead to a product comprising odours. Depending of the end use, the presence of odours in a product may be undesired.

The chemically treated organic natural fiber FIB1 material preferably comprises chemical wood based pulp. The chemical pulp may be, for example, from kraft process or sulfite process, but also other chemical processes may be used, such as a soda pulping process. Preferably, the chemical pulp is from the kraft process. The chemically treated organic natural fiber FIB1 material preferably comprises or consists of wood based cellulose, but it may also be non-wood material. The chemically treated organic natural fiber FIB1 material may comprise recycled and/or virgin fibers and/or fiber-like particles. Advantageously, at least 30 wt-% or at least 40 wt-%, more preferably at least 50 wt-% or at least 60 wt-%, and most preferably at least 80 wt-% or at least 90 wt-% of the organic natural fiber FIB1 material is chemically treated. According to an example 100 wt-% of the organic natural fiber FIB1 material is chemically treated. Advantageously, at least 30 wt-% or at least 40 wt-%, more preferably at least 50 wt-% or at least 60 wt-%, and most preferably at least 80 wt-% or at least 90 wt-%, or at least 95 wt-% of the chemically treated organic natural fiber FIB1 material originates from a kraft process. Advantageously, the pulp production method for organic natural fiber FIB1 material comprising cellulose is based on sulfate cooking, also called as kraft cooking or pulping. Advantageously, lignin content of the chemically treated pulp is 0.01-15.00 wt-%, preferably 0.01-10.00 wt-% or 0.01-5.00 wt-%, more preferably 0.01-3.00 wt-%, 0.01-2.00 wt-% or 0.01-1.00 wt-% and most preferably 0.01-0.50 wt-%. Preferably, the alfa cellulose content of the chemically treated pulp is above 50 wt-%, preferably above 60 wt-%, more preferably above 70 wt-% and most preferably above 72 wt-% or above 75 wt-%. Advantageously, the alfa cellulose content of the chemically treated pulp is below 99 wt-%, preferable below 90 wt-%, more preferably below 85 wt-% and most preferably below 80 wt-%.

The wood material can be softwood trees, such as spruce, pine, fir, larch, douglas-fir or hemlock, or hardwood trees, such as birch, aspen, poplar, alder, eucalyptus, or acacia, or a mixture of softwoods and hardwoods. In an advantageous example, at least 30 wt-% or at least 40 wt-%, more preferably at least 50 wt-% or at least 60 wt-%, and most preferably at least 80 wt-% or at least 90 wt-% of organic natural fiber FIB1 material of a composite is wood based material. In an example 100 wt-% of organic natural fiber FIB1 material of a composite is wood based material.

Non-wood material can be agricultural residues, grasses or other plant substances such as straw, coconut, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo, or reed. The organic natural fiber FIB1 material may be, at least partly, in the form of paper sheet or web, board sheet or web or pulp sheet or web, or compacted fiber matrix or pieces of compacted fibers and their combinations.

A regenerated organic natural fiber FIB1 material is comprised in the organic natural fiber FIB1 based material according to the embodiments of the invention. A regenerated organic fiber material may be used to produce materials for manufacturing of polymer composites. A regenerated organic natural fiber FIB1 material preferably comprises dissolving pulp. Viscose, which can be manufactured from dissolving pulp, is an example of a regenerated organic natural fiber FIB1 based material. Fibers made of cellulose carbamate or fibers regenerated at least partly of organic natural fiber FIB1 material from the carbamate and containing silicon dioxide in their structure may be used in similar applications as viscose. These regenerated fibers may further be modified, for example by chemical treatment. The regenerated organic natural fiber FIB1 based material may refer to man-made fibers.

The amount of the organic natural fiber FIB1 material is calculated as the total amount of the untreated and/or in the above-mentioned way mechanically treated, and/or in the above-mentioned way chemically treated organic natural fiber FIB1 material in a system or a product. The amount of the organic natural fiber FIB1 based material is calculated as the total amount of the untreated and/or in the above-mentioned way mechanically treated, and/or in the above-mentioned way chemically treated, and/or in the above mentioned way regenerated organic natural fiber FIB1 material in a system or a product.

The organic natural fiber FIB1 material may comprise recycled material, for example raw material pulp of recycle streams of wood materials. The recycled material may comprise recycled paper material. The organic natural fiber FIB1 material may be, at least partly, in the form of large fiber or fiber bundles, paper chaff, pulp chaff, crushed pulp material, derivatives thereof and their combinations.

Organic natural fiber FIB1 based material may comprise wood-based cellulose pulp fibers. In at least some/all embodiments organic natural fiber FIB1 material refers to material, such as fibers or fiber-like particles, that contain cellulose. The organic natural fiber FIB1 material may originate from any plant material that contains cellulose. At least one of, or both, wood material and non-wood material may be comprised in the organic natural fiber FIB1 material.

The organic natural fiber FIB1 material may be, at least mostly, in the form of fibers, such as floccules, single fibers, or parts of single fibers, or the organic natural fiber FIB1 material may be in the form of fiber-like particles, such as saw dust or grinded material, where the material does not have exactly spherical form. At least in some embodiments the longest dimension of the particle is less than 5 times longer than the smallest dimension. Preferably the organic natural fiber FIB1 material is, at least partly, in the form of fibers. Preferably at least 40 wt-% or at least 50 wt-%, more preferably at least 60 wt-% or at least 70 wt-% and most preferably at least 80 wt-% of the organic natural fiber FIB1 material is in the form of fibers. According to an example 100 wt-% of the organic natural fiber FIB1 material is in the form of fibers.

The organic natural fiber FIB1 material having a length of at least 0.1 mm, more preferably at least 0.2 mm and most preferably at least 0.3 mm may be called fibers, and smaller particles than those mentioned above may be called powder or fiber-like particles. Preferably at least 70%, at least 80% or at least 90% of the organic natural fiber FIB1 material has a length weighted fiber length of under 4 mm, under 3 mm or under 2.5 mm, more preferably under 2.0 mm, under 1.5 mm, under 1.0 mm or under 0.5 mm. Preferably, at least 70 wt-%, at least 80 wt-%, or at least 90 wt-% of the organic natural fiber FIB1 material has a length weighted fiber length of at least 0.1 mm or at least 0.2 mm, more preferably at least 0.3 mm or at least 0.4 mm. Advantageously, the fiber has a shape ratio relating to the ratio of the fiber length to the fiber thickness being at least 5, preferably at least 10, more preferably at least 25 and most preferably at least 40. In addition or alternatively, the fiber has a shape ratio relating to the ratio of the fiber length to the fiber thickness being preferably 1500 at the most, more preferably 1000 at the most, and most preferably 500 at the most. High shape ratio relates to reinforcing component with higher stiffness and impact strength for the same organic natural fiber FIB1 material content. This can be described by modulus, for example Young's modulus or elastic modulus, which is a measure of the stiffness of a material and is used to characterize materials. The organic natural fiber FIB1 material may form reinforcing components in the structure.

Figures 2A, 2B:
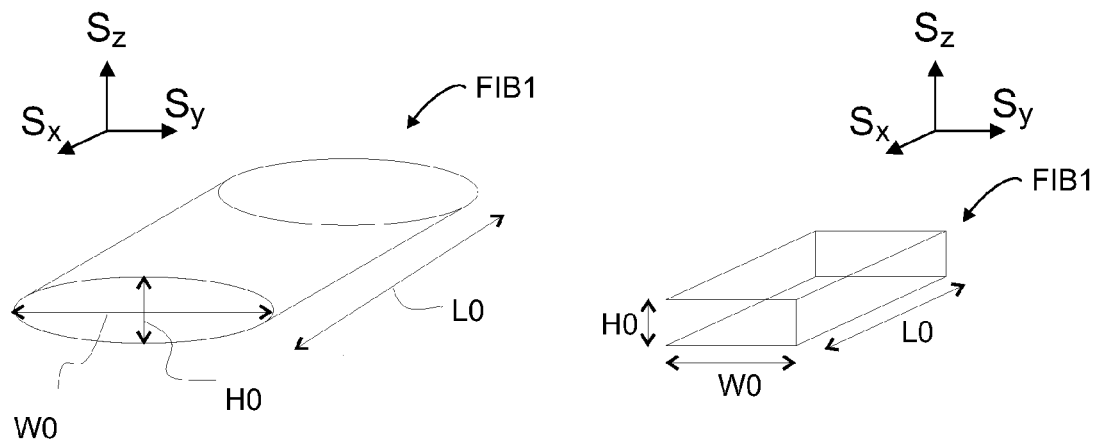
FIGS. 2a and 2b illustrate an example of organic natural fiber material.

Advantageously, the organic natural fiber FIB1 material comprises fibers in a flake form. FIGS. 2a and 2b illustrates an example of organic natural fiber FIB1 material in a form of a flake. The flake of FIG. 2 comprises width W and thickness T, wherein the width is larger than the thickness. The flake of FIG. 2 comprises length L, which may be its widest dimension. The width W and thickness T may illustrate a cross section dimensions of the face of the flake. The face may be shaped oval-like or rectangular-like, as illustrated in FIG. 2, or the face of the flake may comprise a random shape. A random shape of the flake may continue along the flake length L. According to an embodiment cellulose fibers of the microstructure of a flake have been oriented along the length direction of the flake. Flakes may have a width that is 2-10 times larger than the thickness of the fibers. Advantageously, the width of the flake is at least 2, preferably at least 2.5, and more preferable at least 3 times the thickness of the flake. Preferably, the flakes have a thickness between 1 micron and 30 micrometers and more preferably the thickness of flakes varies from 2 microns to 20 micrometers. Most preferably the thickness of flakes is 2-15 μm, more preferable 2-10 μm and most preferable 2-7 μm. In an embodiment, the width of the flake is 20-500 μm, preferably 20-200 μm, and more preferable 20-50 μm. Preferably, an aspect ratio relating to the ratio of the length to the width is between 10 and 100. Preferably, an aspect ratio relating to the ratio of the length to the thickness is 25-1500 or 25-1000, more preferable 25-500 and most preferably between 25 and 300. In an embodiment, the length of the flake is at least 10 times the width of the flake. In an embodiment the flake has a tubular shape. In one embodiment the flake has a platy shape. In one embodiment, the organic natural fiber FIB1 material comprises flake form fiber material at least 30 dry wt-%, preferably at least 50 dry wt-%, or more preferably at least 70 dry wt-%, or most preferably at least 80 dry wt-% of the total amount of the organic natural fiber FIB1 material. According to an example the organic natural fiber FIB1 material contains flake-form fiber material 98 dry wt-%, or 100 dry wt-% of the total amount of the organic natural fiber FIB1 material.

Figure 3:
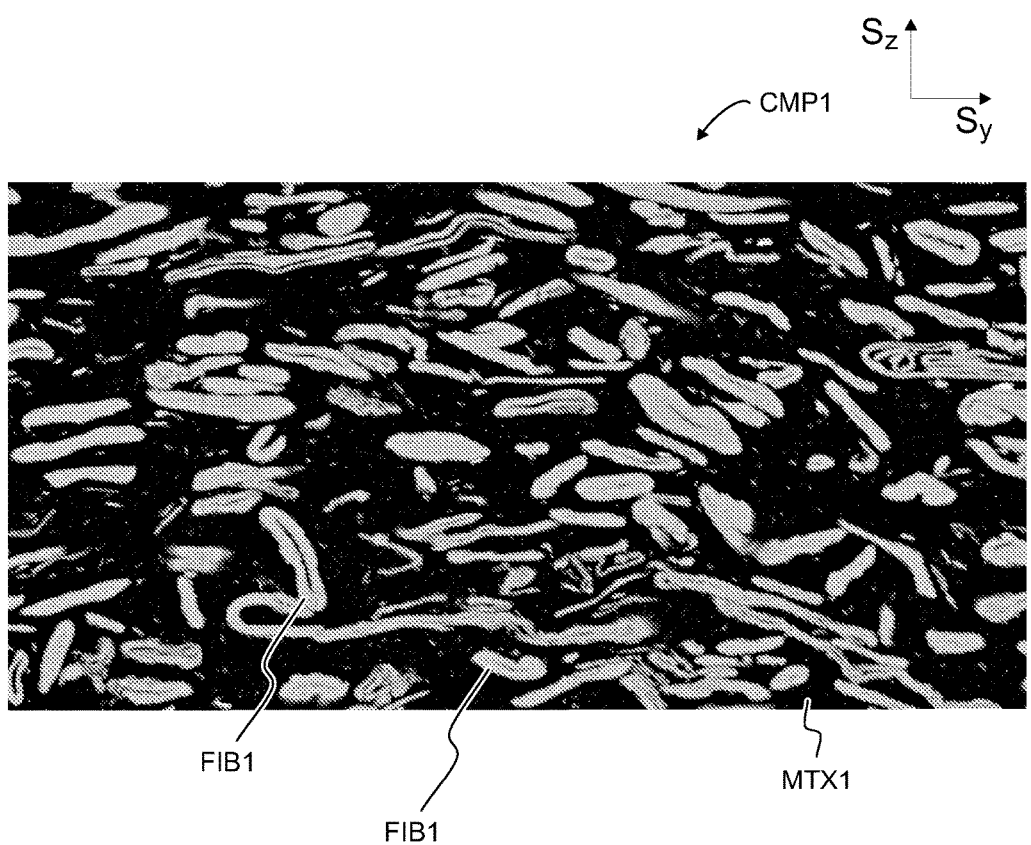
FIG. 3 illustrates an example of 500 times magnified cross-sectional view of a composite manufactured by injection moulding.

FIG. 3 illustrates a 500 times magnified cross-sectional view of a composite CMP1 manufactured by injection moulding according to an embodiment of the invention. FIG. 3 has been captured using an electron microscope on a back-scattered electron (BSE) mode. The cross-sectional view of FIG. 3 comprises melt flow direction towards the image plane and at least most of the organic natural fiber FIB1 material are oriented accordingly. Lengthwise direction of the organic natural fiber FIB1 material is, at least approximately, orthogonal to the image plane. Organic natural fiber FIB1 material have tubular shape in lengthwise direction. Organic natural fiber FIB1 material have also tubular cross-section, as shown in FIG. 3. Instead of round cross-section, the cross-section of organic natural fiber FIB1 material is flattened towards platy shape. The cross-section of tubular organic natural fiber FIB1 material comprises a hollow interior. Advantageously, the hollow interior comprises platy shape, outlined by the tubular organic natural fiber FIB1 material. Cross-sectional profile, shape and/or volume of a hollow interior of an organic natural fiber FIB1 material may change across the fiber length. The hollow interior of a tubular organic natural fiber FIB1 material may comprise at least some water vapour, entrained air, gases, volatile components or matrix material MTX1, for example. According to an example, a tubular organic natural fiber FIB1 material is arranged to outline a hollow interior comprising air. The hollow interior may mean that the internal surface of the organic natural fiber FIB1 material remains at least in most parts untouched to itself. In a hollow structure interior walls of the organic natural fiber FIB1 material may contact with each other only loosely, if at all. An organic natural fiber FIB1 material may comprise slot or opening outlined by interior surface of the organic natural fiber FIB1 material. Form and dimensions of a hollow interior may differ among fibers and among composites CMP1. For example manufacturing method and adjustable parameters of it, like speed of extrusion or injection, temperature, pressure, may have effect on hollow structure of the organic natural fiber FIB1 material. Advantageously, at least 10-30 wt-%, or preferably at least 10-50 wt-%, or more preferably at least 10-70 wt-% of organic natural fiber FIB1 material comprise hollow interior outlined by organic natural fiber FIB1 material.

The dry weight of organic natural fiber FIB1 based material in the mixture may be denoted as $m_{org}$. The weight of the mixture may be denoted as $m_{tot}$. The amount of organic natural fiber FIB1 based material in the mixture may be expressed as a ratio $m_{org}/m_{tot}$.

According to an embodiment $m_{org}$ may be at least 5 wt. % or at least 10 wt. % or at least 20 wt. % of $m_{tot}$, advantageously at least 30 wt. % or at least 35 wt. % or at least at least 40 wt. % or at least 50 wt. % of $m_{tot}$, or at least 60 wt. % or at least 70 wt. % or at least 80 wt. % or up to 90 wt. % of $m_{tot}$.

The ratio $m_{org}/m_{tot}$ may be in the range of 0.05 to 0.9, e.g. in the range of 0.1 to 0.8 or in the range of 0.15 to 0.7, for example between 0.2 and 0.6 or 0.2 and 0.5. The ratio $m_{org}/m_{tot}$ may be selected based on the desired properties of the composite item. In particular, by selecting the $m_{org}/m_{tot}$ ratio, the behavior of the mixture may be controlled when manufacturing the composite CMP1 item. Advantageously, for a mixture comprising melt flow properties closer to a matrix material MTX1, a lower $m_{org}/m_{tot}$ ratio, such as between 0.05 and 0.5 or as 0.1 and 0.4. may be used.

At least partly hollow organic natural fiber FIB1 material may provide elastic and/or flexible micro- or nanoscale portions to a composite. The hollow, possibly flattened, organic natural fiber FIB1 material component may not have straight lengthwise profile, but it may comprise bend, turned and/or twisted fiber portions. At least internal zone(s) of a composite CMP1 (compared to surface zones) may comprise organic natural fiber FIB1 material having indirect lengthwise orientation. Orientation of organic natural fiber FIB1 material may be controlled, at least at surface zone(s) of a composite CMP1. Organic natural fiber FIB1 material may comprise some linear stretch, whereas for example glass fibers mostly maintain their directions and/or dimensions during manufacturing phase of a composite.

Additives

A composite CMP1 may optionally comprise one or more additives. An additive may be comprised in a component and/or it may be combined to a component of a composite CMP1. For example, an additive may be bonded to a matrix material MTX1.

An additive may have effect of adjusting properties of the composite CMP1. An additive may comprise chain extenders, plasticizers, heat modifiers, impact modifiers, dispersion agents, coupling agents, lubrication agents and/or inorganic fillers, for example. The additives may comprise flow control additives, UV absorbers, fillers, metal particles, deglossing agents, pigments, antioxidants, flame retardants, diluents, stabilizers, monomers, prepolymers, flexibility improvers, processing aids and lubricants, fluoropolymer-based processing aids, mineral oils and waxes, nucleating agents, fiber strands, polymers, glass, ceramic and polymeric bubbles, metal particles, micro and nanofillers, core-shell particles, elastomeric micro and nanoparticles, magnetic and dielectric nanocrystals, carbon nanotubes, carbon nanofibers, nanographite, nanoclays, nanosilica, nanoalumina, zirconia and titania nanoparticles, noble metal and conductive nanoparticles, nanofibers and nanostrands or a combination thereof. Amount of additive(s) in a composite CMP1 according to embodiments may be 0.1-30.0 wt-%. The amount is dependent on materials, application and desired properties. Preferable amounts of additive(s) of a composite may comprise 0.1-10.0 wt-%, or 0.1-5.0 wt-%, or 0.1-1.0 wt-%; or 0.5-30.0 wt-%, or 1.0-20.0. wt-%, or 5.0-15.0 wt-%.

Chain extenders may have effect of providing mechanical strength and melt strength to a structure. Melt strength may be advantageous during manufacturing and processing, for example enabling more stable processing. Chain extenders may enable recycling and re-use of composite. Examples of chain extenders are aromatic diols, aliphatic diols, carbon linear diols and carbon cyclic diols Melted chain extender may be added to preheated polymer matrix and mixed using high-speed mixer. After processing the mixture is arranged to a mold, where the mixture is heated, compression molded and optionally cured. Effect of chain extender may be improved hysteresis properties. This indicates that energy absorption is low and material will recover upon stretching. Another effect may be better hydrophobicity due to longer chains (CH2) and more crystalline hard segments. Elastomers may exhibit crystalline transitions at appr. 50° C., that is an important feature in hot melt adhesive applications. Carbon linear and cyclic diols used in thermoplastic polyurethanes (TPU) may have effect of increasing hardness of a composite CMP1, providing higher modulus and/or enhanced water resistance. Effects of chain extenders may comprise improved heat resistance, resilience and improved moisture resistance. Effect of cyclic chain extenders may be providing soft materials with a high softening temperature. Products with higher hardness comprise higher modulus and compressive strength accordingly. Mechanical properties of polyurethane elastomers may be enhanced by use of chain extenders.

Plasticizers are additives that increase the plasticity or fluidity of a material. Plasticizers embed themselves between the chains of polymers, spacing the polymers apart. This way free volume in the structure is increased. The glass transition temperature of the material decreases and the material becomes softer. Increase in amount of plasticizer in a material decreases cold flex temperature of the material. Due to this, the material becomes more flexible and its durability increases. Plasticizer may comprise esters, which may include sebacates, adipates, terephthlates, dibenzoates, gluterates, phthalates, azelates, and other specialty blends. Plasticizer may be based on esters of polycarboxylic acids with linear or branched aliphatic alcohols, typically with moderate chain length. The chain length of a plasticizer may be for example less than 5000 monomer units, or less than 1000 monomer units, such as less than 800 monomer units or less than 500 monomer units. Alternatively, a plasticizer may comprise monomers or dimers or a chain length larger than in a dimer, such as more than 10 or 50 or 100 or 400 monomer units. Example plasticizers comprise phthalate esters of straight-chain and branched-chain alkyl alcohols. Plasticizers may be chosen based on low toxity, compatibility with the host material, non-volatility and expense, for example. Examples of biodegradable plasticizers comprise alkyl citrates, like triethyl citrate (TEC), acetyl triethyl citrate (AATEC), tributyl citrate (TBC), acetyl tributyl citrate (ATBC), trioctyl citrate (TOC), acetyl trioctyl citrate (ATOC), trihexyl citrate (THC), acetyl trihexyl citrare (ATHC), butyryl trihexyl citrate (BTHC), trimethyl citrate (TMC). Phthalate-based plasticizers may provide good resistance to water. Examples of phthalate plasticizers comprise Diisooctyl phthalate (DIOP), Diethyl phthalate (DEP), Diisobutyl phthalate (DIBP), Butyl benzyl phthalate (BBzP), Di-n-butyl phthalate (DnBP, DBP). Plasticizers may have effect of adjusting flexibility, hardness and/or brittleness, and/or have positive effect on processing.

Heat modifier may be based on alpha methyl styrene (AMS) or polyphenylene ether (PPE). Heat modifier may have effect on heat distortion temperature. For example, poly-D-lactide homopolymer may be used to increase heat distortion temperature of poly-(L-lactic) acid. Heat modifiers may have effect of improving electrical and dimensional properties, toughness and/or flame resistance.

Polymer may be impact modified in order to satisfy end-use requirements for rigid applications. Impact modification may be implemented by adding rubber domains to the material. Polymers having substantially low stiffness and higher strength may be utilized. Examples of such polymers comprise at least one or more of thermoplastic olefin (TPO), thermoplastic elastomer (TPE), (poly-)styrene-ethylene butylene-styrene (SEBS), maleic-anhydride-grafted styrene-ethylene butylene-styrene (SEBS-MA), high impact polystyrene (HIPS), methyl methacrylate butadiene styrene (MBS)-based impact modifiers, acrylonitrile butadiene styrene (ABS)-based impact modifiers, ethylene vinyl acetate (EVA), ethylene butyl acetate (EBA) and their maleated terpolymers.

Dispersion agents may have effect of facilitating and/or stabilizing the dispersion of solid compounding materials, such as fillers or pigments, in a polymeric matrix. Dispersion agent may comprise surfactants, and/or be a non-surface active polymer or a surface active substance. Example of a dispersion agent is a silane. Dispersion agent may be added to a mixture, like suspension or colloid. Dispersion agents may have effect of improving separation of particles and/or preventing settling or clumping. Better dispersion has positive effect on processability and material properties.

A coupling agent or a compatibilizer refers to a compound that tends to promote dispersion and/or compatibilization of the organic natural fiber FIB1 material and the matrix material MTX1, when said matrix material MTX1 is polymer matrix. A coupling agent may comprise polymer material and a part, which is arranged to react with the organic natural fiber FIB1 material. The polymer material of the coupling agent is comprised as part of the matrix material MTX1 of the composite CMP1, although the matrix material MTX1 of the coupling agent may not comprise pure polymer matrix. A coupling agent may be an amphiphilic component having effect of promoting and maintaining intimate contact between polar and non-polar components in a mixture. In other words, the coupling agent may be used to enhance the even dispersion of the organic natural fiber FIB1 material to the matrix material MTX1, and to improve the interfacial adhesion between the non-polar polymer matrix and the polar organic natural fiber FIB1 material during processing. The coupling agent may be employed as a grafted polymer surfactant, wherein a polymer backbone is modified to comprise at least one functional group that may be used for coupling a non-polar polymer matrix to polar organic natural fiber FIB1 material. A modified polymer may have been obtained, for example, by attaching a functional group into the polymer backbone. For example, a maleic anhydride may be an example of a compound suitable to be attached as a functional group into the polymer backbone, whereby maleic anhydride grafted polymer may be obtained. The coupling agent may comprise unsaturated carboxylic acids or unsaturated carboxylic acid anhydrides. For example, derivatives of unsaturated carboxylic acids, and mixtures thereof, or maleic anhydride may be used. Examples of such acids and anhydrides are mono-, di- or polycarboxylic acids such as acrylic acids, methacrylic acid, maleic acid, fumaric acid, itaconic acid, crotonic acid, itatonic anhydride, maleic anhydride and substituted maleic anhydride, e.g., dimethyl maleic anhydride or citrotonic anhydride, nadic anhydride, nadic methyl anhydride and tetrahydrophtahlic anhydride.

A coupling agent may have two functional domains; a first domain to form entanglements with the polymer matrix and a second domain to strongly interact with the organic natural fiber FIB1 material. These interactions increase the interface adhesion between the polymer matrix and the organic natural fiber FIB1 material. In other words, the composite may have been formed through a first coupling, such as covalent ester bonding, formed between the organic natural fiber FIB1 material and the coupling agent and a second coupling, such as hydrogen bonding, formed between the coupling agent and the polymer matrix. Said coupling may, in addition to the covalent and hydrogen bonding, take a form of an entangled structure, where organic natural fibers are dispersed to a coupling agent. In other words, in addition to a chemical reaction taking place in the coupling, organic natural fiber FIB1 material may be physically attached to a coupling agent that comprises an entangled polymer matrix. Said physical attachment may facilitate the forming of a stable structure. Coupling may occur also between a coupling agent that comprises a grafted thermoplastic polymer, such as a maleic anhydride grafted polymer, and a polymer matrix. Said coupling takes place through van der Waals-interactions and entanglements that are formed between the coupling agent and the polymer matrix. This type of bonding may have effect on providing a higher tensile strength of the composite CMP1.

The coupling agent may comprise a grafted thermoplastic polymer. Alternatively, the polymer matrix may comprise a grafted thermoplastic polymer. In addition, the coupling agent may comprise the polymer matrix. In other words, if the coupling agent comprises a thermoplastic polymer it may be used to replace the polymer matrix. As an example, the coupling agent may comprise maleic anhydride, also known as 2,5-furandione, dihydro-2,5-dioxofuran, toxilic anhydride or cis-butenedioic anhydride. Maleic anhydride may be provided to the process as a grafted polymer. The grafted polymer comprising a functional group, such as a maleic anhydride in the polymer backbone may be inactive unless sufficient amount of energy for the coupling between the coupling agent and the fibers to commence is provided. This can be done, for example, by heating to the material to an activation temperature where the coupling may begin. The coupling may be a chemical reaction, such as a covalent bonding. In other words, in order for the coupling agent to be activated a certain activation energy level may have to be reached, which is achieved by introducing sufficient amount of heat into the system. Once the activation energy level has been reached, coupling may be formed via a covalent bonding between a grafted polymer and an organic natural fiber FIB1 material, to form a stable and durable structure.

Alternatively, the coupling agent may be formed by arranging an unsaturated carboxylic acid or an anhydride compound to react with a polymer to form a grafted compound through covalent bonding in the process of manufacturing organic natural fiber FIB1 material comprising composite CMP1.

Melt flow index for a coupling agent may be more than 0.1, or 0.1-2000, preferably 1.0-500, more preferably 2-200, most preferably 5-100, according to ISO 1133 (T 230° C., 2.16 kg). A composite CMP1 according to embodiments may comprise 0.5-10.0 wt-%, or preferably 1.5-5.0 wt-%, or more preferably 2-3 wt-% of coupling agent. In an advantageous embodiment, the coupling agent comprises maleic anhydride based coupling agent. Amount of a maleic anhydride acid may be 0.2-8.0 wt-%, or preferably 1-3 wt-% of the coupling agent.

Coupling agents may have effect of providing bonding, or more stable bonding, between initially nonbonding and/or incompatible surfaces. For reinforced and filled plastics, the bonding between fibrous or other inorganic component and organic matrix polymer has effect on composite strength and/or its operating life. Further the coupling agent may have effect on mechanical properties of a composite, like stiffness.

Lubricants are additives that may be used in production of organic natural fiber FIB1 material comprising composite CMP1 structures in order to control and increase output rate. The lubricants may be called as a process aids, release agents or slip agents. The lubricants may be for example metal ion comprising substances, such as stearic acid salts (stearates), or synthetic waxes, which are free of metal ions. Lubrication and release properties, as well as water repellence, are characteristics of metallic stearates. The special effects of these properties are determined by the cation (metal ion), the chain length of the fatty acid and certain other properties, such as the water of crystallisation content, of the respective metallic stearate. Metal ions suitable for stearates can be, for example, but not limited to, zinc, calcium, magnesium, barium, natrium, kalium or aluminium. Stearates may also contain a combination of one or more of these metal ions or similar ones. Carboxylic acid esters or ethers may be preferred as lubricants for a composite CMP1 comprising organic natural fiber FIB1 material, since stearates may interfere coupling agents in the composite CMP1.

The lubricants used in production of polymer composites CMP1 comprising organic natural fiber FIB1 material may be distinguished as either internal or external lubricants. Internal lubricants reduce the internal friction, improve the flow properties and the homogeneity of the melt, make fibers slip and the mixture form more easily. They may be soluble or partially soluble in a polymer and may settle on the interface of agglomerates, pigments or polymer chains. A non-limiting example listing of internal lubricants comprises fatty acids, esters of long-chain fatty acids, polyethylene waxes and white oils. External lubricants reduce the friction of the material in contact with the wall of the processing machine, reduce the friction of the particles among themselves and the adhesion of the polymer melt on the tool. Because of its insoluble properties in plastics the external lubricant may migrate to the surface during the processing action, accumulate there and act as a lubricant, which may additionally increase the smoothness and the gloss of the surface of the end product. A non-limiting example listing of external lubricants comprises metal stearates, fatty acid amide esters, silicon oils, paraffin oils, and glycols.

The lubricant to be used may be a blend of compounds, for example aliphatic carboxylic acid salts and mono and diamines. The preferred amounts to produce desired effects may contain lubricant equal to or less than 5.0 wt-%, such as 4.0 wt-%, 3.0 wt-%, 2.0 wt-%, 1.0 wt-%, 0.5 wt-% or 0.3 wt-% of the composite. Preferably lubricant may be added 0.01-5.00 wt-%, preferably 0.05-3.00 wt-% of the composite CMP1.

Inorganic fillers may have effect of increasing stiffness properties of a product. Inorganic fillers are optional part of the composite CMP1. Use depends on application and properties, among others. The amount of the inorganic fillers in the composite CMP1 comprising organic natural fiber FIB1 material may be between 0 and 40 wt-% or preferably 1-20 wt-%. The inorganic fillers may comprise talc, mica, kaolin, calcium carbonate, fly ash, mica, glass fibers, carbon fibers, titanium dioxide (TiO2). According to at least some embodiments, at least 50 wt-% of the fillers comprise one or more inorganic fillers. In addition, other organic fillers, like any suitable polymeric fiber, may be used. The composite CMP1 comprising organic natural fiber FIB1 material may be coloured, for example, by using pigments. Inorganic fillers of a composite according to embodiments may comprise potassium carbonate (CaCO3) and/or talc. The composite CMP1 may comprise talc and/or potassium carbonate 1-40 wt-%, or preferably 1-20 wt-%.

As an example, carbon fibers and glass fiber may be used as an additive in order to enhance mechanical properties of a composite CMP1. Aramid fiber may be used as an additive in order to enhance wear resistance of a composite CMP1. Graphite powder may be used as an additive in order to enhance moisture resistance of a composite CMP1. Molybdenum sulphide (MoS2) may be used as an additive in order to harden the surface of a composite CMP1.

Minor amounts of thermosetting resins or other residues may be present in the polymer compositions without sacrificing the thermoplastic properties.

Composites comprising thermosetting polymers may be perceived as difficult to recycle, which favours the use of thermoplastic polymers in manufacturing polymer composites CMP1 comprising organic natural fiber FIB1 material. However, the ease of use and properties of the thermosetting polymers may be beneficial when manufacturing large volumes of products for some applications, such as for the automotive industry.

Advantageously, the matrix material MTX1 comprises thermoplastic polymer based matrix material and/or thermoplastic oligomer based matrix material. Thermoplastic polymers are often solid at low temperatures and they form viscose polymer melt at elevated temperatures. The low and the elevated temperatures may be defined based on the melting points $T_m$ of matrix material MTX1. A low temperature is a temperature below the melting point $T_m$ of the matrix material MTX1. In a low temperature the matrix material MTX1 in general is in a solid form. In elevated temperatures above the melting point $T_m$ of the matrix material MTX1 the matrix material MTX1 begins to melt. Typically the viscosity of these polymer decreases when temperature is increased, and the polymers flow and wet the surfaces more easily. When thermoplastic composites are produced, polymer is heated in order to melt the polymer, and other components of the composites are mixed with the polymer melt. Often it is easy to mix these other components into polymer when the viscosity of the polymer is low, meaning that the temperature of the polymer melt is high. In addition to the melting point $T_m$, a polymer may have a glass transition temperature $T_g$. Furthermore, some polymers may have a glass transition temperature $T_g$ but not a melting point $T_m$. In general, when a polymer has a glass transition temperature $T_g$ and a melting point $T_m$, the melting point $T_m$ is a higher temperature than glass transition temperature $T_g$.

When heating a matrix material MTX1 or a composite comprising matrix material MTX1 to a melt form, the matrix material is, at least partly, in melt form, when the organic natural material can adhere to the matrix material MTX1, and/or the melt flow index of the material can be measured (according to standard ISO 1133 (valid in 2011)), and/or the organic natural fiber FIB1 material can adhere to the surfaces of matrix material particles.

Moisture Absorbance from Exposed Composite Surface

Desired properties may be achieved for variety of applications by selecting the raw materials and their properties. For example moisture absorbance may be selected. In an embodiment a composite CMP1 product comprises 60-80 wt-% of organic natural fiber based material FIB1, and a dry composite CMP1 product absorbs moisture under 1.9% of the weight of the composite CMP1 product in 30 hours (50% RH and 22° C. atmosphere). When the composite CMP1 product comprises 60-80 wt-% of the organic natural fiber based material FIB1, and a dry composite CMP1 product absorbs moisture under 1.9%, preferably under 1.5%, and more preferable under 1.0% of the weight of the composite CMP1 product in 30 hours (50% RH and 22° C. atmosphere).

In another embodiment a composite CMP1 product comprising 40-60 wt-% of organic natural fiber based material FIB1, and a dry composite CMP1 product absorbs moisture under 1.5% of the weight of the composite CMP1 product in 30 hours (50% RH and 22° C. atmosphere). When the composite CMP1 product comprises 40-60 wt-% the organic natural fiber based material FIB1, a dry composite CMP1 product absorbs moisture under 1.5%, preferably under 1.0%. and more preferably under 0.8 of the weight of the composite CMP1 product in 30 hours (50% RH and 22° C. atmosphere).

In yet another embodiment a composite CMP1 product comprises 20-40 wt-% of organic natural fiber based material FIB1, and a dry composite CMP1 product absorbs moisture under 1.3% of the weight of the composite CMP1 product in 30 hours (50% RH and 22° C. atmosphere). When the composite CMP1 product comprises 20-40 wt-% of the organic natural fiber based material FIB1, a dry composite CMP1 product absorbs moisture under 1.3%, preferably under 0.8, and more preferably under 0.5 of the weight of the composite CMP1 product in 30 hours (50% RH and 22° C. atmosphere).

In still another embodiment a composite CMP1 product comprises 10-20 wt-% of organic natural fiber based material FIB1, and a dry composite CMP1 product absorbs moisture under 1.2% of the weight of the composite product in 30 hours (50% RH and 22° C. atmosphere). When the composite CMP1 product comprises 10-20 wt-% of the organic natural fiber based material FIB1, a dry composite CMP1 product absorbs moisture under 1.1%, preferably under 0.7, and more preferably under 0.4 from the weight of the composite CMP1 product in 30 hours (50% RH and 22° C. atmosphere).

In an embodiment moisture uptake from the atmosphere can be measured from the dry composite CMP1 products. Before the measurement the composite CMP1 products is dried. The composite CMP1 product should be dried at temperature of 120° C. for 48 hours before the measurement. In most cases the drying temperature should be at least 10° C. lower than a glass transition temperature or a melting temperature of the polymer. If the drying temperature is lower than 110° C., drying temperature shall be as high as possible, drying preferably accomplished at a vacuum oven (vacuum level preferable below 0.01 mbar), and using drying time of 48 hours. For a moisture uptake measurement at least 10 grams of products will be placed on a plate. There should be only one granulate layer on the plate. The moisture uptake is then measured as a weight increase compared to the weight of dry products. If the weight of a dry composite CMP1 product is increased from 10.0 g to 10.1 g, the result is 1.0%. The measurements are accomplished in conditions of 22° C. temperature and 50% RH air moisture. Different measurement times may be used.

Thermal Expansion

Thermal expansion is a feature specific to materials. Each material has a specific thermal expansion coefficient, which determines how much the dimensions of the material may change as a function of temperature. Thermal expansion coefficient may be anisotropic property of a composite CMP1. The composite may have different properties to a melt flow direction and to a direction perpendicular to the melt flow direction, so called cross direction. The fibers may be oriented to a melt flow direction, at least on surface zones of the composite CMP1. Thermal expansion coefficient may be larger in the cross direction compared to the melt flow direction. Thermal expansion coefficient to the melt flow direction may be at least 10%, or at least 20%, or at least 30% smaller than the thermal expansion coefficient to the cross direction. Thermal expansion coefficient may depend on matrix material MTX1 of a composite CMP1. Thermal expansion coefficient to the melt flow direction may be 1-50%, or 1-40%, or 1-30%, or 1-20%, or 1-10% smaller than the thermal expansion coefficient to the cross direction. In an embodiment the thermal expansion coefficient to the melt flow direction corresponds to the thermal expansion coefficient to the cross direction. In an example, the thermal expansion coefficient in the melt flow and cross direction are the same.

The presented relations of thermal expansion coefficients are percentage values, not weight percentages. Thermal expansion coefficients of a composite CMP1 are in melt flow direction, if nothing else is explicitly stated.

In general the thermal expansion of wood may be smaller than the thermal expansion of metal. For example, the thermal expansion coefficient may be for a wood $3\text{-}6\cdot10^{-6}/°$ C. depending on wood material; for aluminium $23\cdot10^{-6}/°$ C., for silver $19\cdot10^{-6}/°$ C., for iron $12\cdot10^{-6}/°$ C. In general the thermal expansion of plastic may be larger than the thermal expansion of metal. For example, the thermal expansion coefficient may be for polystyrene $70\cdot10^{-6}/°$ C., for polypropylene $100\text{-}200\cdot10^{-6}/°$ C., for polyethylene $200\cdot10^{-6}/°$ C., for polyester $124\cdot10^{-6}/°$ C., for polyamide $110\cdot10^{-6}/°$ C., for ABS $74\cdot10^{-6}/°$ C., for polycarbonate $70\cdot10^{-6}/°$ C. By selecting the ratio of matrix material MTX1 and organic natural fiber FIB1 based material of a composite CMP1, the composite CMP1 may be designed with a specific thermal expansion coefficient.

A thermal expansion coefficient of a composite CMP1 comprising matrix material MTX1 and organic natural fiber FIB1 based material may be smaller than a thermal expansion coefficient of a composite CMP1 comprising the matrix material MTX1 without organic natural fiber FIB1 based material. A composite CMP1 comprising matrix material MTX1 and organic natural fiber FIB1 based material may comprise thermal expansion coefficient less than 20%, or less than 40%, or less than 60% smaller than the thermal expansion coefficient of a composite CMP1 comprising the matrix material MTX1 without organic natural fiber FIB1 based material. The thermal expansion coefficient of a composite CMP1 comprising matrix material MTX1 and organic natural fiber FIB1 based material may comprise 40-80%, or 50-80%, or 60-80% of the thermal expansion coefficient of the matrix material MTX1 without organic natural fiber FIB1 based material. The thermal expansion coefficient of a composite CMP1 comprising polypropylene matrix material and organic natural fiber FIB1 based material may comprise 40-80%, or 50-80%, or 60-80% of the thermal expansion coefficient of a polypropylene matrix material without organic natural fiber FIB1 based material.

Generally composite CMP1 comprising matrix material and organic natural fiber FIB1 based material has lower thermal expansion coefficient compared to the matrix material MTX1. According to an example thermal expansion coefficient for a plastic matrix is $100\text{-}200\cdot10^{-6}/°$ C., whereas the plastic matrix comprising 40 wt-% of organic natural fiber FIB1 based material may comprise thermal expansion coefficient of $90\text{-}120\cdot10^{-6}/°$ C., and the plastic matrix comprising 50 wt-% of organic natural fiber FIB1 based material comprises thermal expansion coefficient of $60\text{-}90\cdot10^{-6}/°$ C.

In an example, linear thermal expansion coefficient is measured according to ISO 11359-1/2 (ppm/K) in longitudinal and transverse direction. A composite CMP1 comprising polypropylene matrix and 40 wt-% of organic natural fiber FIB1 based material comprises cross direction linear thermal expansion coefficient of 118 ppm/K, and flow (longitudinal) direction linear thermal expansion coefficient of 51 ppm/K. A composite CMP1 comprising polypropylene matrix and 50 wt-% of organic natural fiber FIB1 based material comprises cross direction linear thermal expansion coefficient of 79 ppm/K, and flow direction linear thermal expansion coefficient of 76 ppm/K. For the latter composite CMP1 the values show almost symmetric properties of thermal expansion. This may be desired for certain applications.

The thermal expansion coefficient may be selected to have a value equal to, or close to, or compatible with another material. Such material could be, for example, a metal or another composite. Advantageously, this may be used to match the thermal expansion coefficients of different materials in a product. The matrix material and the organic natural fiber FIB1 based material components for the composition may be selected to obtain a desired density and thermal expansion for the composite CMP1 material. Also composite CMP1 production parameters have effect on thermal expansion properties of the composite CMP1, which is direction dependent. Orientation of organic natural fibers may have effect on anisotropic variables. For example, heat expansion in a composite CMP1 structure comprising 40 wt-% of organic natural fiber FIB1 based material may have a larger thermal expansion than a composite CMP1 structure comprising 50 wt-% of organic natural fiber FIB1 based material. Therefore, the dimensional stability of a composite CMP1 structure comprising 50 wt-% of organic natural fiber FIB1 based material may be improved compared to a composite CMP1 structure comprising less organic natural fiber FIB1 based material.

Surface Roughness and Micro Contoured Surface Layer

The articles made of composite CMP1 material comprising organic natural fiber FIB1 based material may comprise, for example, moulded products, profiles or sheets. In particular, the articles made of composite CMP1 material comprising organic natural fiber FIB1 based material may comprise injection moulded products, thermoformed products, compression moulded products, rotation moulded products, granulates or pellets. Depending of the shape of the article, methods such as thermoforming, moulding or extrusion may be used for the manufacture process. The selected method of manufacturing may depend of the desired shape or characteristics of the micro contoured surface layer to be obtained. The manufacturing method may further comprise a combination of any of the methods. For example, a composite CMP1 product may be obtained by a extrusion method, and be further processed into another shape by thermoforming.

A composite CMP1 product surface may comprise a micro contoured surface layer. The micro contoured surface layer may cover at least part of the surface of the composite CMP1 product. The composite CMP1 product surface may comprise a micro contoured surface layer for example in the range of 2% to 100%, such as in the range of 5% to 100% on in the range of 10% to 100% or in the range of 20% to 100% or in the range of 50% to 100% or in the range of 75% to 100%. Less than 100% of the surface of the composite CMP1 product may be covered by the micro contoured surface layer, such as less than 98% or less than 95% or less than 90%, for example less than 80% or less than 70%. In particular, at least a certain percentage of the surface area of the composite CMP1 product may be covered by a micro contoured surface layer. For example, at least 2%, more preferably at least 5%, most preferably at least 10% of the surface of the composite CMP1 product may comprise a micro contoured surface layer. The surface area covered by micro contoured surface layer may have an effect on the surface properties, such as heat conductivity, surface roughness, printability, surface tension, paintability, attachment of a glue, gloss, colour, colour uniformity, surface friction or adhesive properties. By modifying the percentage of surface area covered by the micro contoured surface layer the behaviour of the surface may be improved for selected applications. This may be advantageous, for example, when adhesives or coatings are used on the surface of the composite CMP1 product. The micro contoured surface layer may enhance the grip of an adhesive. Adhesive labels may be used in this manner to improve the attachment of a label to the surface. In addition, the micro contoured surface layer may be used to improve the attachment of a surface coating. This may in addition improve the printability of the surface The composite CMP1 product may be, for example, coated or painted, and the micro contoured surface layer on the surface may enhance the fixing of the coating or paint. Furthermore, micro contoured surface layer may alter the surface tension of a composite CMP1 product surface, which may have an effect on the frictional properties of the surface. A composite CMP1 product may be used in different conditions, where friction may have an impact on the functionality of the product. In some embodiments the micro contoured surface layer may be used to improve the attachment of a label to the surface. The micro contoured surface layer may comprise a non-visible size range; however, the characteristics and effects of the micro contoured surface layer may be measured for example by AFM, profilometer with contact, gloss meter, skid tester for friction or a refractometer for colour uniformity such as in CIELab color space specified by the International Commission on Illumination. In general, the micro contoured surface layer at the composite surface layer may alter the light scattering from the surface, thereby having also an effect on lightness and colour values as well as density of the colour.

The properties of a composite CMP1 surface may be measured from a product. A product refers to a composite CMP1 product in various forms, for example as a component of a product or an intermediate product, such as a pellet or granulate intended to be formed into a shaped composite CMP1 object or film or sheet to be thermoformed into shaped composite CMP1 product. The product may be a part of a larger apparatus or a system, for example a machine or a device. Furthermore, the properties of a composite CMP1 surface may be measured in various states. The properties of a composite product may be determined from a first state and a second state. The first state and the second state may refer to, for example states before or after a treatment, or to states having a first and second parameter value, said parameter being for example temperature, velocity, colour, fibre content and/or surface roughness. Examples of treatments are for example absorbency treatments, where water or a colouring ink may be added on a surface of the composite CMP1 product. Alternatively, or in addition, the properties of a composite product may be determined as an averaged value of multiple measurements. Multiple measurements may be performed to a single composite product having multiple surface portions or locations. Alternatively, or in addition, multiple measurements may be performed on one or more composite products.

Surface Roughness Measurements

Depending of the manufacturing method, various processing parameters may have an effect on the surface roughness and micro contoured surface layer of the composite CMP1 product. Roughness parameters to describe surface structure are defined in standard ISO 4287. ISO 25178 standard may be used to determine roughness parameters for a surface. In particular, area roughness may be measured by many topographical instruments, such as contact and non-contact 3D profilometers, interferometric and confocal microscopes, structured light projectors, or optical measurement instruments such as a stereoscopic microscope. Surface roughness and micro contoured surface layer may be measured by roughness amplitude parameters, for example by a roughness average $R_a$, which is the average deviation of points roughness profile from a mean line over the evaluation length.

In addition, the following standards refer to determination of surface roughness: ASME B46.1-1995, ASME B46.1-1985, ISO 4287-1997 and ISO 4287/1-1997. A roughness value of a product can be determined for a profile or for a surface.

A workpiece surface may comprise a first roughness level, which may be copied to at least some extent to the surface of a composite product. The composite CMP1 surface 101 may comprise a second roughness level equal to the first roughness level. Furthermore, during manufacturing a third roughness level referred to as micro contoured surface layer may be provided to the composite CMP1 surface 101, wherein the third roughness level may be less than the first roughness level. In this application, the general roughness level of a workpiece surface, which may be imprinted to the composite product surface, refers to establishes Ra and SPI standards of the Society of the Plastics Industry (SPI) for the United States plastics industry. The SPI standards comprise a method for defining the degree of polish on the inner surfaces of the molds used to form plastic products. The SPI standards specify 12 grades of mold finish ranging from mirror-perfect to dull. The SPI incorporated the SPE grades in its new finishing standards. SPE #1 corresponds to SPI Grade A-1, SPE #2 to SPI A-2, SPE #3 to SPI B-3, SPE #4 to SPI C-3, SPE #5 to SPI D-2 and SPE #6 to SPI D-3.

The composite CMP1 surface roughness may be determined optically using reflective light imaging and a laser scanning confocal microscope (LSCM), such as a Zeiss LSM 5 PASCAL. When determining composite CMP1 surface roughness values according to the examples and embodiments in this application, the following measurement parameters were used:

Image Frame Size 512×512 pixels
Laser wavelength 488 nm
Transmission 11.1%

Figure 4:
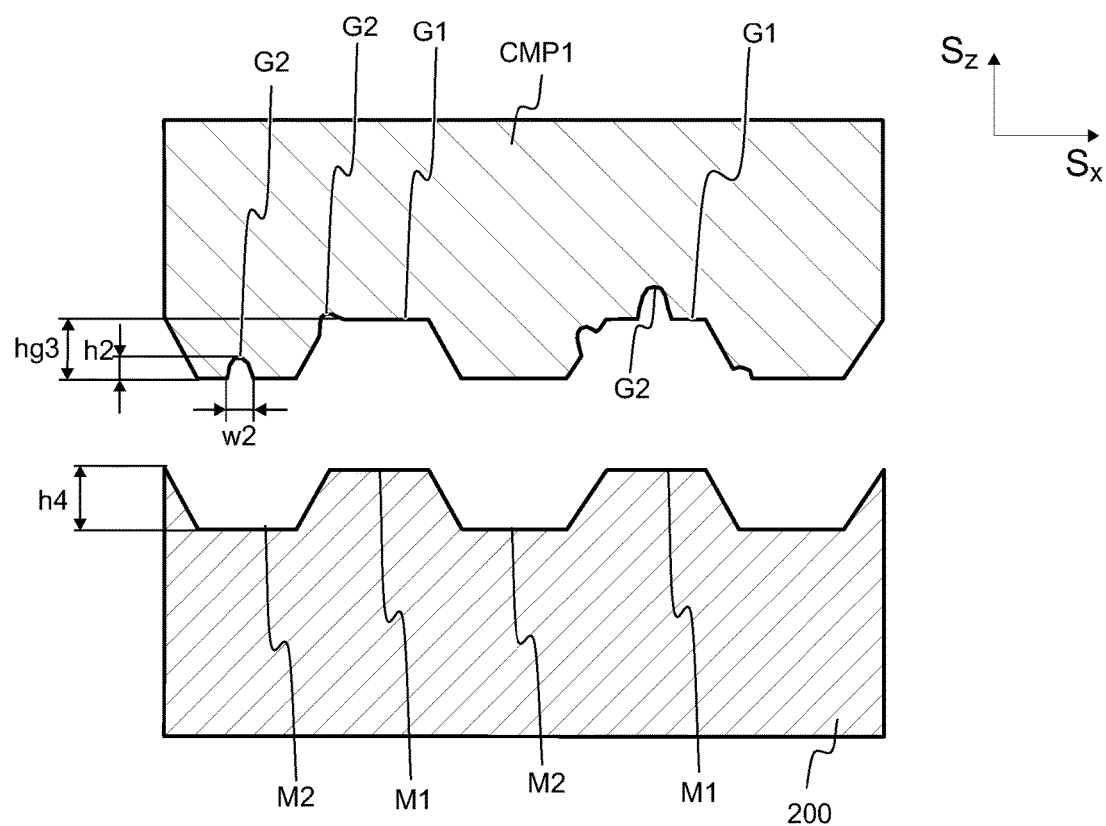
FIG. 4 represents an example of a composite surface having micro contours.

The imaging comprises a z-stacking, referring to focusing on a composite surface and capturing a series of ten sub-images (IMG1, IMG2, IMG3, IMG4, IMG5, IMG6, IMG7, IMG8, IMG9, IMG10) referred to as slices from a surface portion POR1 in a vertical direction $S_z$, wherein adjacent slices overlap in the vertical direction $S_z$. The extent of the overlap may be determined by the thickness of the slice and interval between two slices, wherein higher objective magnification reduces the thickness of the slice. The z-stacking is performed from top to bottom in a vertical direction $-S_z$, the top of the surface representing the highest vertical point of the surface and the bottom of the surface representing the lowest vertical point of the surface, or a depression mark G1, as shown in FIG. 4. An image IMG1 comprising extended depth of focus from the surface portion POR1 may be formed by combining the focused subimages with the LSM5 PASCAL software. Using the image IMG1 comprising extended depth of focus, the LSM5 PASCAL software determines the roughness level of the surface portion POR1. The imaging may be done alternatively with a 10× or 20× magnifying optics. Preferably, the 20× magnifying optics is used due to enhanced resolution. Depending of the selected optics, one of the following settings may be used:

Objective 20×: Epiplan-Neofluar 20×/0.5DIC, Pinhole 1 airy unit, Optical Slice 3.8 um, Interval 1.92 um The measured area on 20× objective or Objective 10×: Epiplan-Neofluar 10×/0.25DIC, Pinhole 1 airy unit, Optical Slice 15.7 um, Interval 7.83 um, wherein the objective and pinhole defines the resolution, the optical slice is the depth of focus in a vertical direction $S_z$, interval is the distance traveled between capturing two adjacent images, each optical slice having a defined thickness in vertical direction $S_z$. said thickness depending of the objective.

When imaging using said 20× objective, the roughness level of the surface may be measured from a surface portion POR1 corresponding to an area in a single image of 0.2025 square millimeters ($mm^2$) consisting of 450 micrometer (μm)×450 micrometer (μm) sides. When imaging ten such non-overlapping surface portions POR1, POR2, POR3, POR4, POR5, POR6, POR7, POR8, POR9, POR10, the roughness level of the surface may be measured from imaged surface area of 2.025 square millimeters ($mm^2$), which is ten times larger than in a single image.

When imaging using said 20× objective, the roughness level of the surface may be measured from a surface portion POR1 corresponding to an area in a single image of 0.81 square millimeters ($mm^2$) consisting of 900 micrometer (μm)×900 micrometer (μm) sides. When imaging ten such non-overlapping surface portions POR1, POR2, POR3, POR4, POR5, POR6, POR7, POR8, POR9, POR10, the roughness level of the surface may be measured from imaged surface area of 8.1 square millimeters ($mm^2$), which is ten times larger than in a single image.

FIG. 4 represents an example, where a composite CMP1 surface comprises depression marks G1 having a height hg3, which are repetitive impressions of workpiece 200, such as a mould or a extruder die, having a surface roughness level Ra. The workpiece 200 surface roughness may comprise peaks M1 and grooves M2 having a height h4, which refers to the difference in surface level in direction $S_z$ between the groove M2 and the peak M1. However, the composite CMP1 surface may further comprise micro contoured surface layer, comprising micro contours G2 having a height h2 and a width w2. The height h2 of the micro contours G2 is less than the height hg3 of the depression marks G1, and is not an impression of the mould surface peaks M1. In particular, the micro contours G2 on an exposed surface of a composite CMP1 comprising organic natural fiber FIB1 based material may represent the manufacturing conditions and ratio $m_{org}/m_{tot}$ of the organic natural fiber FIB1 based material used in manufacturing the composite CMP1 product.

Figure 5A:
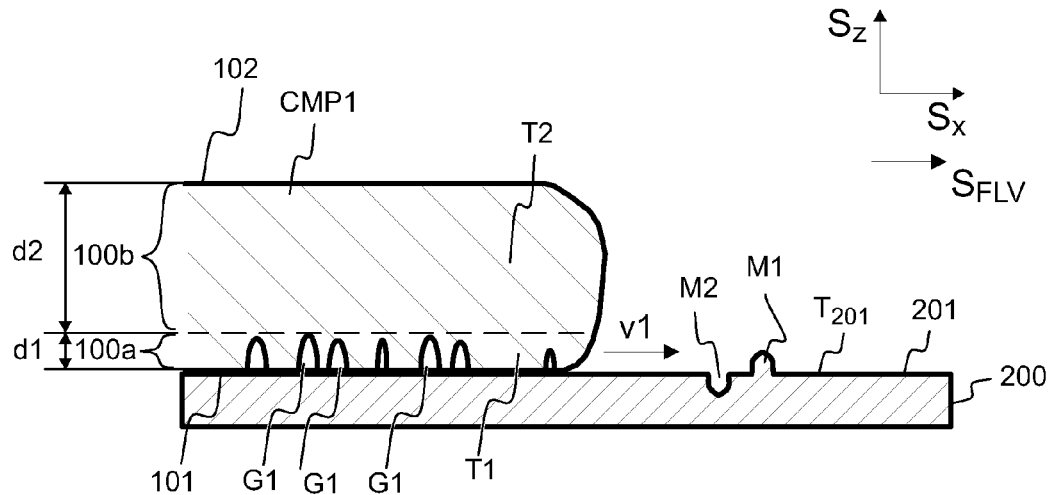
FIGS. 5a and 5b and 5c illustrate examples of providing a composite having a micro contoured surface layer
Figure 5B:
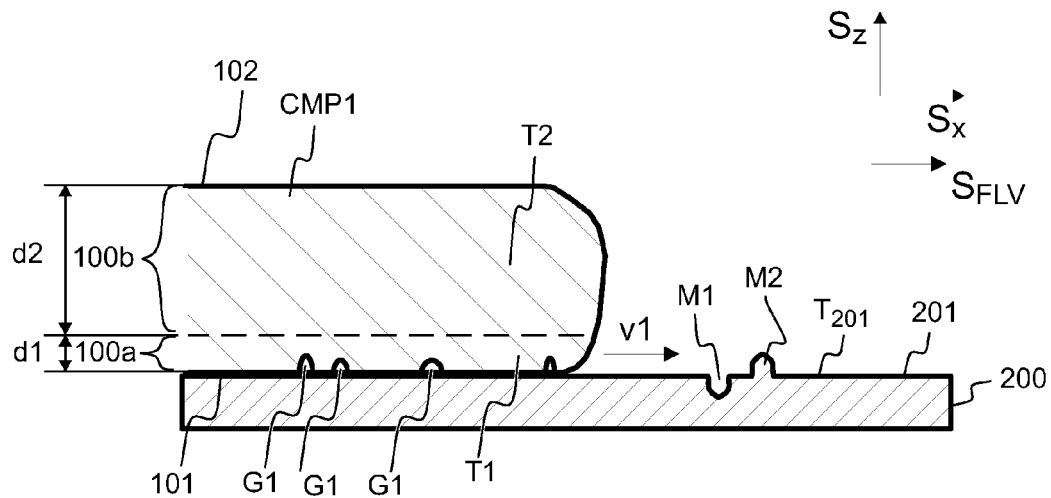
Figure 5C:
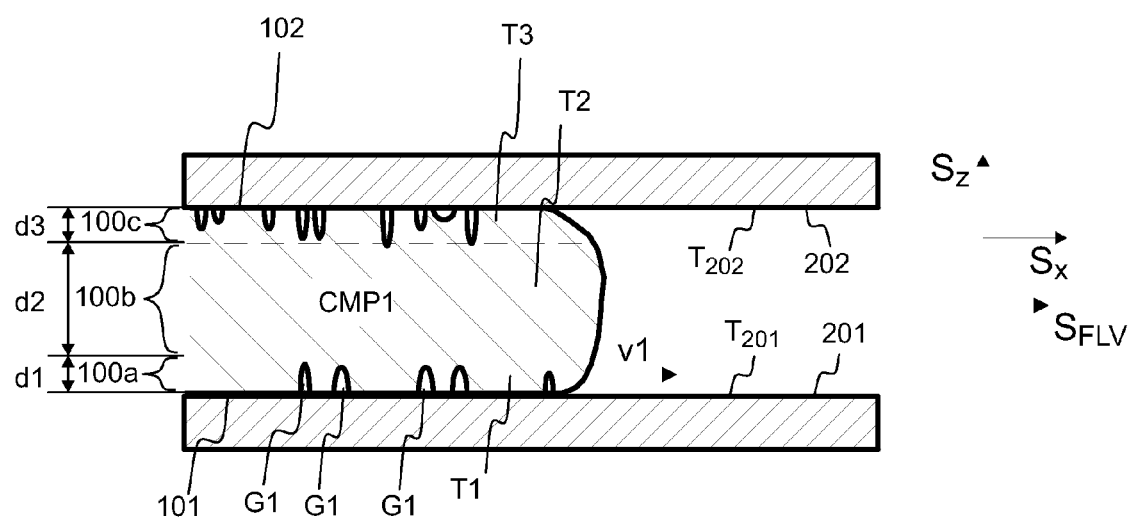

FIGS. 5a and 5b and 5c illustrate examples of providing a composite CMP1 having a micro contoured surface layer according to an embodiment of the invention. When providing a composite CMP1 material, a composite melt comprising matrix material MTX1 and organic natural fiber FIB1 based material may be introduced on a workpiece 200 having a surface 201. The workpiece surface 201 may be the interior surface of a die on an extruder. Alternatively, the surface 201 may be the interior of a mould for the composite CMP1 to be shaped. Moulding may comprise for example injection molding, blow molding, rotational molding or compression moulding. Moulding in general comprises a method, where the melt is introduced to a mold. The mould may provide a surface 201 which may comprise a shape and surface roughness in the form of peaks M1 and grooves M2, which roughness in the form of peaks M1 and grooves M2 may be copied to the composite CMP1 surface 101, 102 formed against the mould surface 201. In molding, granular composite CMP1 material comprising matrix material MTX1 and organic natural fiber FIB1 based material may be introduced on a workpiece 200 surface 201, for example from a hopper into a heated barrel. As the granules are slowly moved forward, for example by a screw-type plunger, the composite CMP1 material is heated and melted. The composite CMP1 melt may comprise a surface layer 100a having a first surface 101, a thickness d1 and a first temperature T1 and an interior layer 100b having a second thickness d2 and a second temperature T2. The first temperature T1 at the surface layer 100a of the composite CMP1 in general may be lower than the second temperature T2 in the interior layer 100b of the composite CMP1. The workpiece 200 may comprise a second surface 202, and the composite CMP1 may comprise a second surface layer 100c having a second surface 102, a third thickness d3 and a third temperature T3.

Figure 6A:
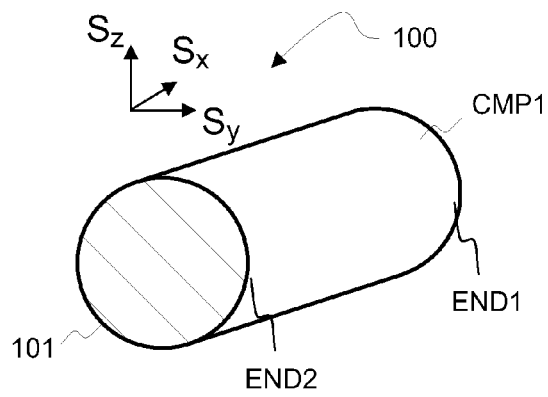
FIGS. 6a, 6b, 6c, 6d and 6e illustrate examples of composite products.
Figure 6B:
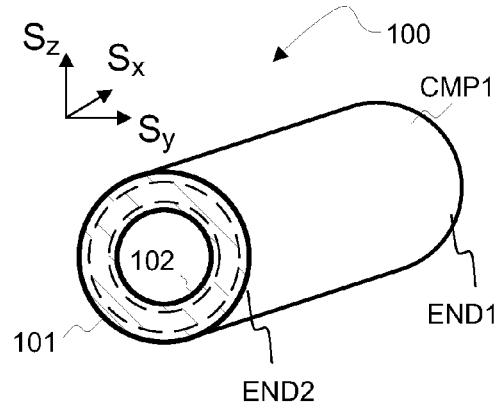
Figure 6C:
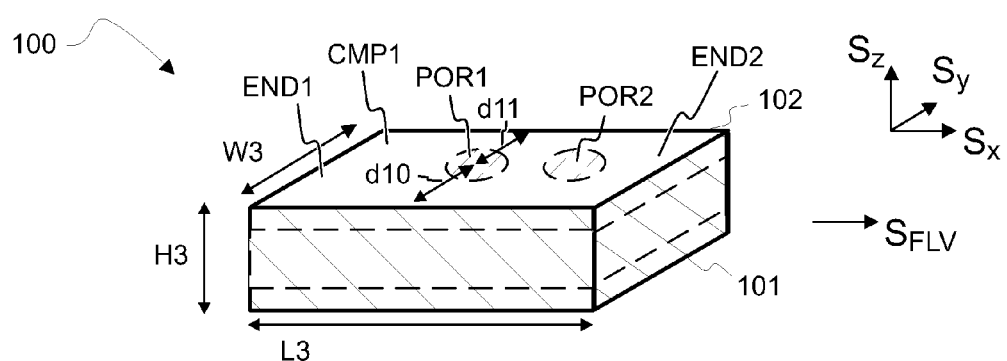
Figure 6D:
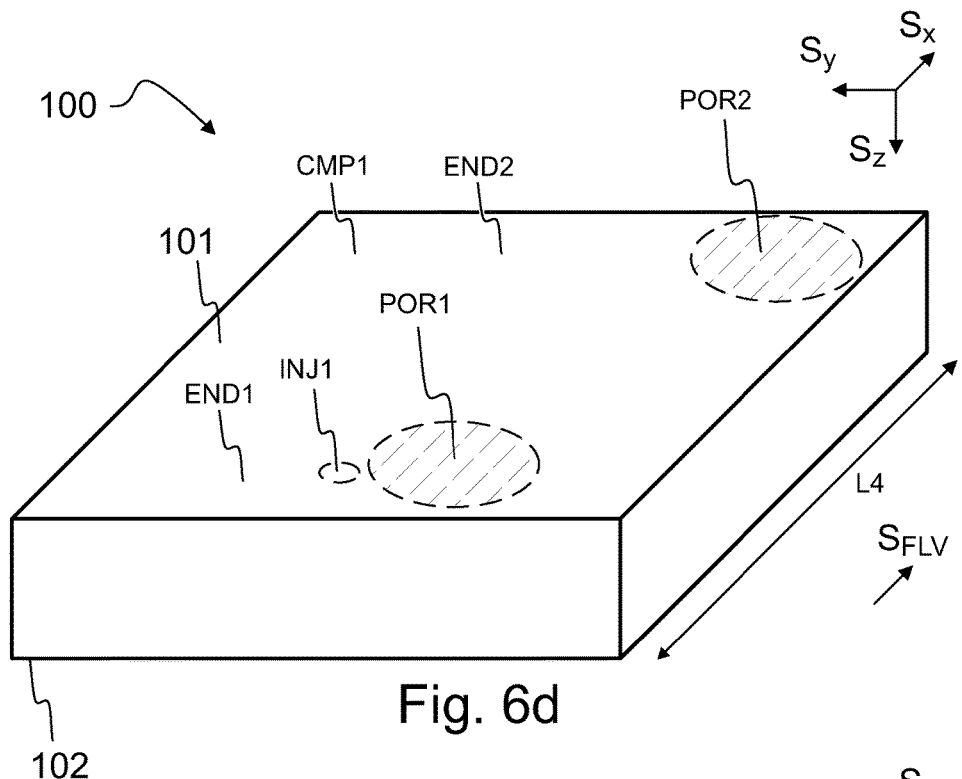
Figure 6E:
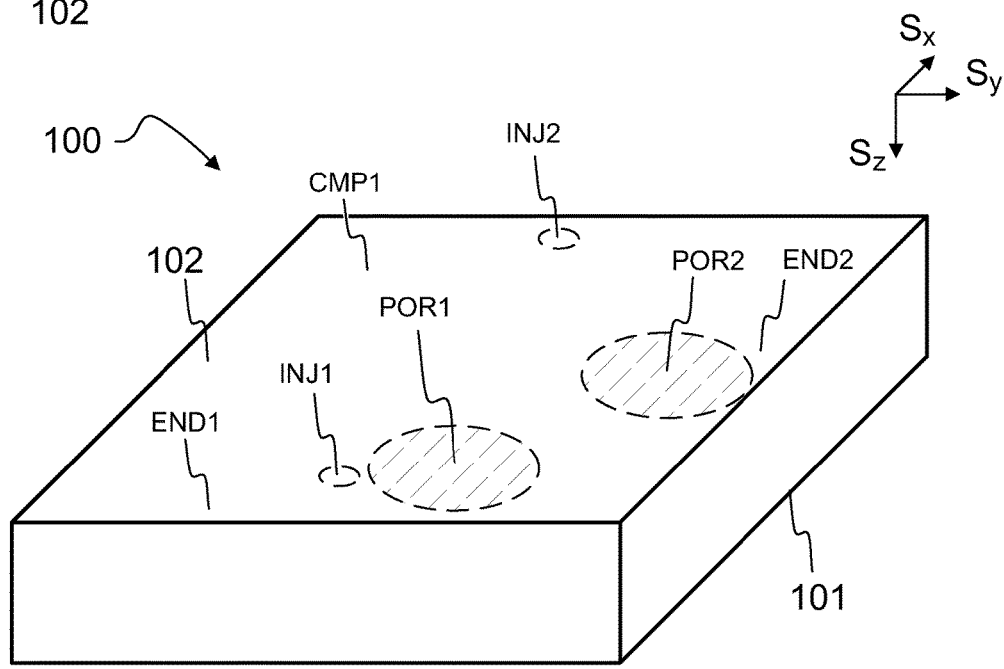

FIGS. 6a, 6b, 6c, 6d and 6e illustrate examples of composite CMP1 products 100 comprising one or more surfaces and a first end END1 and a second end END2. In FIG. 6a, an example is shown of a solid tubular composite CMP1 product 100 comprising a first surface 101 enveloping the exterior of the solid product and a first end END1 and a second end END2 defining the longest dimension L1 parallel to the longitudinal axis of the product. In FIG. 6b, an example is shown of a hollow tubular composite CMP1 product 100 comprising a first surface 101 having a larger surface area on the outside of the product and a second surface 102 having a smaller surface area on the inside of the hollow product. The first end END1 and the second end END2 defining the longest dimension L2 parallel to the longitudinal axis of the product may be located on either the first surface 101 or on the second surface 102. In FIG. 6c, an example is shown of a rectangular composite CMP1 product 100 with length L3, width W3, height H3 and comprising a first side having a first surface 101 and a second side having a second surface 102. The first end END1 and the second end END2 defining the longest dimension L3 parallel to the longitudinal axis of the product may be located on either the first surface 101 or on the second surface 102. In FIG. 6d an example is shown of an injection moulded rectangular composite CMP1 product 100 with length L4 parallel to the melt flow direction $S_{FLV}$, said product 100 comprising a first side having a first surface 101 and a second side having a second surface 102. The first end END1 of the composite CMP1 product on the first surface 101 may comprise an injection point INJ1 and a first surface portion POR1. The second end END2 of the composite CMP1 product on the first surface 101 may comprise a second surface portion POR2. Alternatively, as shown in FIG. 6e, the second surface portion POR2 may be on the second surface 102 of the composite CMP1 product 100. There may be more than one injection point INJ1, INJ2. In general, when more than one injection point INJ1, INJ2 exist on a surface 101, the second end END2 may be defined as the farthest distance from all of the injection points on the surface 101. Further, when more than one injection point INJ1, INJ2 exist such that a first injection points INJ1 is on a first surface 101, while a second injection point INJ2 in on a second surface 102, the second end END2 may be defined as the surface portion POR1 having the longest distance from all of the injection points INJ1, INJ2 on either the first surface 101 or on the second surface 102, wherein the longest distance is essentially parallel to the surface 101 and/or 102.

The melt may be introduced at an introduction velocity v1 as shown in FIGS. 5a and 5b. A higher introduction velocity v1 results to a reduced filling time. The workpiece 200 may comprise a first surface 201 having a temperature $T_{201}$. In addition, the workpiece 200 may comprise a second surface 202 having a second temperature $T_{202}$. The second workpiece temperature $T_{202}$ may be different from the first workpiece temperature $T_{201}$. The temperatures $T_{201}$, $T_{202}$ may be selected and controlled, such that when thermoplastic materials are used in the matrix material MTX1, the workpiece surface temperature $T_{201}$, $T_{202}$ may be used to cool down the composite CMP1 material. To cool down the composite surface 101, the mould surface temperature $T_{201}$, $T_{202}$ in general is lower than the first temperature T1 or the second temperature T2 of the composite CMP1. In particular, the workpiece surface temperature $T_{201}$, $T_{202}$ may be cooled during the manufacturing, to alter the behavior of the surface layer 100a of the composite CMP1. When the temperature difference between the workpiece surface temperature $T_{201}$ and the composite CMP1 surface layer temperature T1 is larger, a higher micro contoured surface layer comprising more micro contours G2 may be obtained. The workpiece surface temperature $T_{201}$ may be reduced, for example, by using cooling lines for circulating water or oil having a lower temperature than the surface temperature $T_{201}$ of the mold. Once a defined composite CMP1 surface temperature T1 has been achieved, the mold may be opened and the composite CMP1 product may be demoulded. The workpiece surface 201 may comprise a surface roughness $R_a$. In general, a workpiece surface 201 may be polished, sparking machined or sanded to a given roughness range, which roughness may be impressed on the surface 101 of the composite CMP1 adjacent to the workpiece surface 201. The impression may be either positive surface deviation, such as the surface peaks M1 or negative surface deviation, such as the grooves M2, and form a congruent imprint of the surface 101 of the composite CMP1 product.

The micro contours G2 are located on the surface 101 of the product, and may extend in a first surface layer 100a to a depth d1 towards the interior of the composite CMP1. The depth d1 may be equal to the height h2 of a micro contours G2, wherein the micro contours G2 and depression marks G1 define a contour line representing the exposed composite surfaces 101, 102.

A method to manufacture a composite CMP1 product 100 having a micro contoured surface may comprise;
  providing a composite CMP1 melt comprising matrix material MTX1, said composite CMP1 melt having a surface temperature T1,
  providing an amount of organic natural fiber FIB1 based material to said composite CMP1 melt
  introducing the composite CMP1 melt to a workpiece 200 surface 201 having a surface temperature $T_{201}$ and a first roughness level,
  providing said micro contoured surface by cooling the composite CMP1 melt to form a hardened composite CMP1 surface 101 comprising a second roughness level and a third roughness level; wherein the second roughness level is equal to the first roughness level and the third roughness level is equal to or less than the second roughness level.

In particular, the addition of an amount of organic natural fiber FIB1 based material to a composite CMP1 melt may be used to provide the micro contours G2. The amount of organic natural fiber FIB1 based material may be in a range of 10 to 90 wt-%, preferably 10 to 70 wt-%, and most preferably 20 to 50 wt-%, wherein the wt-% refers to percentage by weight of the composite CMP1 melt comprising matrix material MTX1 and organic natural fiber FIB1 based material.

Preferably, selecting the surface temperature $T_{201}$ to be less than the composite CMP1 melt surface temperature T1 may be used to adjust the rate of the cooling of the composite CMP1 melt to a hardened composite CMP1 surface 101, 102.

The method may comprise the surface temperature $T_{201}$ in the range of 20° C. to 100° C., preferably in the range of 30° C. to 80° C., most preferably in the range of 50° C. to 80° C. These temperatures may be used to cool down a composite melt having a temperature T1, T2, T3 higher than the surface temperature $T_{201}$ to a hardened composite CMP1 surface 101, 102, when intending to reduce the temperature of the melt T1, T2, T3.

The method may further comprise providing the introduction velocity v1 to flow said composite (CMP1) melt in a direction SFLV. The velocity v1 may be in a range of 5 to 400 mm/s, preferably 10 to 300 mm/s, most preferably 20 to 250 mm/s, such as in a range of 25 to 220 mm/s, or in the range of 50 to 220 mm/s to control the filling or extrusion of the composite CMP1. In injection moulding the introduction velocity v1 refers to the time for the melt to propagate a defined distance in the direction of the melt flow $S_{FLV}$. In extrusion the introduction velocity v1 refers to the propagation velocity of the melt from the extrusion die in the direction of the melt flow $S_{FLV}$.

A specific surface roughness level of a composite CMP1 surface 101, 102 may further be provided with a micro contoured surface layer having a defined roughness level during the manufacturing process by process parameters. For example, the following parameters may be used to adjusting the third roughness level in manufacturing:

selecting the amount of organic natural fiber FIB1 based material $m_{org}/m_{tot}$ ratio and/or selecting the introduction velocity v1 and/or selecting the surface temperature $T_{201}$ of the workpiece 200 and/or selecting the matrix material MTX1 and/or additives like lubricants and/or melt flow improvers, such as plasticizers and/or controlling parameters providing high shear forces.

The formation of the third roughness level in manufacturing may be adjusted by selecting the method of manufacturing. Moulding methods comprising a workpiece 200 such as a mould may be used to provide a mould surface roughness, which during moulding may be imprinted on the composite surface. The adjustment of the micro contoured surface layer may be provided by moulding specific process parameters, such as injection velocity, shot volume and filling times, which are convenient parameters to control. Moulding further is a convenient method to provide products having larger spatial dimensions, irregular shapes or surface curvature. Extrusion methods comprising a workpiece 200 such as a die may be used to provide planar products such as sheets or blocks, which in general comprise a thickness ranging from film thicknesses to composite sheets in the range of 0.05 millimeters to several millimeters. The introduction velocity v1 of the extrusion may be selected and controlled, which enables adjusting the adjustment of the micro contoured surface layer in the direction of the melt flow $S_{FLV}$. Furthermore, by processing the extruded composite CMP1 melt, the forming first and second composite surfaces 101, 102 may be arranged to obtain a different micro contoured surface layer. This may have an effect, for example on the gloss, friction, colour or other functional feature of the surface.

Furthermore, a method to enhance the surface roughness of a composite CMP1 product 100 may comprise;

providing a composite CMP1 product 100 comprising matrix material MTX1 and organic natural fiber FIB1 based material having a primary surface layer with a primary surface roughness softening said primary surface 101, 102 layer of said composite CMP1 material by heating providing a secondary surface 101, 102 layer of said composite CMP1 material surface with a secondary surface roughness by cooling said softened surface layer.

In particular, the roughness level of the micro contoured surface may be increased after providing a composite CMP1 product 100 such that the shape of the product is preserved. The primary surface roughness may be less than or equal to 90% of the secondary surface roughness.

By selecting the manufacturing method and the process parameters, such as the process conditions and materials used in the manufacturing process for example, a desired roughness level of the micro contoured surface layer on the composite CMP1 product surface may be selected. The micro contoured surface refers to the exposed surface of the composite CMP1 product after manufacturing of the composite CMP1 product. The exposed surface of the composite CMP1 product may further processed to comprise a coating layer.

A method to adjusting the third roughness level in manufacturing may comprise, for example, selecting the amount of organic natural fiber FIB1 based material and/or selecting the introduction velocity v1 and/or selecting the surface temperature T201 of the workpiece 200 and/or selecting the matrix material MTX1. Furthermore adjusting the formation of the third roughness level in manufacturing may be done by selecting the method of manufacturing.

A higher micro contouring, or the third roughness level, on a surface 101 may be provided, for example by increasing the amount of organic natural fiber FIB1 based material and/or decreasing the introduction velocity v1 and/or decreasing the surface temperature $T_{201}$ of the workpiece 200.

A lower micro contouring, or the third roughness level, on a surface 101 may be provided, for example by decreasing the amount of organic natural fiber FIB1 based material and/or increasing the introduction velocity v1 and/or increasing the surface temperature $T_{201}$ of the workpiece 200

Tables 1, 2 and 3 below are an example of injection moulded composite CMP1 products at a slow injection time and high injection time. Sample 1 and sample 2 were composite CMP1 products comprising 40-wt % of organic natural fiber FIB1 based material and matrix material MTX1, each sample having a planar surface 101 and dimension of (W3, L3, H3) of 35×65×1 mm. Sample 1 had an injection time of 0.2 s, sample 2 had an injection time of 1.7 s. The organic natural fiber FIB1 based material comprised cellulose and the matrix material MTX1 comprised polypropylene. The difference in the introduction velocity v1 has an effect on the level of micro contoured surface layer, as shown by CIELab colour, colour difference $\Delta E_2$, colour variation $\Delta E_1$, and surface roughness Ra.

TABLE 1

Influence of different injection time on CIELab colour values, colour variance $\Delta E_1$ and color difference $\Delta E_2$ between a stained and unstained surface.

|  | average | max | min | StDev |
|---|---|---|---|---|
| Sample 1, fast injection time: 0.2 s | | | | |
| CIE L | 60.4 | 60.9 | 59.8 | 0.4 |
| CIE a | 3.79 | 4.11 | 3.41 | 0.30 |

TABLE 1-continued

Influence of different injection time on CIELab colour values, colour variance $\Delta E_1$ and color difference $\Delta E_2$ between a stained and unstained surface.

|  | average | max | min | StDev |
|---|---|---|---|---|
| CIE b | 27.37 | 28.21 | 26.27 | 0.69 |
| $\Delta E_1$ |  |  |  | 0.86 |
| $\Delta E_2$ | 3.5 |  |  |  |
| Sample 2, slow injection time: 1.7 s | | | | |
| CIE L | 60.8 | 61.1 | 60.4 | 0.2 |
| CIE a | 3.06 | 3.29 | 2.72 | 0.25 |
| CIE b | 23.36 | 24.31 | 21.98 | 0.92 |
| $\Delta E_1$ |  |  |  | 0.98 |
| $\Delta E_2$ | 4.4 |  |  |  |

Sample 1 had an injection time of 0.2 s and a colour difference $\Delta E_2$ value of 3.5, whereas sample 2 had an injection time of 1.7 s and a colour difference $\Delta E_2$ value of 4.4. As shown by the colour measurements between the samples 1 and 2, the colour difference $\Delta E_2$ between a stained and unstained surface is higher on a composite CMP1 surface (sample 2) having a longer the injection time.

TABLE 2

Influence of different injection time on ink absorbency - Spectrolino after NP ink treatment

|  | average | max | min |
|---|---|---|---|
| Sample 1: injection time: 0.2 s | | | |
| CIE L | 59.2 | 59.9 | 58.8 | 0.5 |
| CIE a | 2.84 | 3.16 | 2.57 | 0.22 |
| CIE b | 24.18 | 24.79 | 23.61 | 0.50 |
| $\Delta E_1$ |  |  |  | 0.71 |
| Sample 2: injection time: 1.7 s | | | |
| CIE L | 57.7 | 60.1 | 54.6 | 2.0 |
| CIE a | 2.13 | 2.66 | 1.45 | 0.52 |
| CIE b | 20.47 | 22.41 | 17.90 | 1.81 |
| $\Delta E_1$ |  |  |  | 2.75 |

Sample 1 had an injection time of 0.2 s and a colour variation $\Delta E_1$ value of stained surface 0.71, whereas sample 2 had an injection time of 1.7 s and a colour variation $\Delta E_1$ value of stained surface 2.75. As shown by the colour measurements between the samples 1 and 2, the colour variation $\Delta E_1$ in a stained surface is higher on a composite CMP1 surface (sample 2) having a longer the injection time.

TABLE 3

Influence of different injection time on surface roughness $R_a$ determined with a LSCM.

|  |  | Sample 1: Fast injection (0.2 s) | | Sample 2: Slow injection (1.7 s) | |
|---|---|---|---|---|---|
|  |  | Average | STDEV | Average | STDEV |
| $R_a$ | μm | 0.96 | 0.11 | 2.55 | 0.36 |
| $R_q$ | μm | 2.32 | 0.25 | 4.41 | 0.49 |
| $R_z$ | μm | 22.55 | 0.84 | 27.68 | 1.61 |
| $R_{max}$ | μm | 31.41 | 0.31 | 32.59 | 0.95 |

Sample 1 had an injection time of 0.2 s and an average surface roughness Ra value of 0.96, whereas sample 2 had an injection time of 1.7 s and an average surface roughness Ra value of 2.55. As shown by the surface roughness measurements between the samples 1 and 2, the surface roughness Ra is higher on a composite CMP1 surface (sample 2) having a longer the injection time. Table 3 illustrates, that the arithmetical mean height of the surface and the mean square height of the surface are higher in the samples having a lower introduction velocity v1. Also the maximum height of the surface and the maximum roughness of the surface is larger in the samples having a lower introduction velocity v1. Consequently, the introduction velocity v1 may be used to control the formation of micro contoured surface layer on the surface 101, 102 of a composite CMP1 product.

Tables 4 and 5 below are another examples of injection moulded composite CMP1 products comprising matrix material MTX1 at a slow injection and high injection velocity v1. Sample 3 and sample 4 were composite CMP1 products comprising 40-wt % and sample 5 and sample 6 were composite CMP1 products comprising 20 wt-% of organic natural fiber FIB1 based material, each sample having a planar surface 101 and dimension based of standard ISO 527 test specimen type 1A. Samples 3 and 5 had an injection velocity of 23 cm³/s, samples 4 and 6 had an injection velocity of 250 cm³/s. The organic natural fiber FIB1 based material comprised cellulose and the matrix material MTX1 comprised polypropylene. The difference in the introduction velocity v1 has an effect on the level of micro contoured surface layer, as shown by CIELab colour, colour difference $\Delta E_2$ and colour variation $\Delta E_1$.

TABLE 4

Influence of different injection speeds on color measured by ink absorbency test on a composite CMP1 comprising 40-wt % of organic natural fiber FIB1 based material.

|  | average | max | min | StDev | average | max | min | StDev |
|---|---|---|---|---|---|---|---|---|
|  | Sample 3: CMP1 FIB1 40-wt % 23 cm3/s | | | | Sample 3: after NP ink treatment | | | |
| CIE L | 54.8 | 58.4 | 51.4 | 2.5 | 38.5 | 40.6 | 34.6 | 2.3 |
| CIE a | 4.85 | 5.47 | 3.96 | 0.60 | 3.64 | 5.44 | 1.59 | 1.46 |
| CIE b | 14.04 | 16.15 | 11.99 | 1.46 | 10.35 | 15.52 | 4.21 | 4.34 |
| $\Delta E_1$ |  |  |  | 2.95 |  |  |  | 5.14 |
| $\Delta E_2$ |  |  |  |  | 16.7 |  |  |  |
|  | Sample 4: CMP1 FIB1 40-wt % 250 cm3/s | | | | Sample 4: after NP ink treatment | | | |
| CIE L | 46.4 | 46.9 | 45.8 | 0.5 | 42.7 | 43.5 | 42.2 | 0.5 |
| CIE a | 6.93 | 7.15 | 6.69 | 0.20 | 6.25 | 6.77 | 6.04 | 0.26 |
| CIE b | 20.77 | 22.39 | 19.82 | 1.01 | 18.15 | 20.13 | 16.95 | 1.11 |
| $\Delta E_1$ |  |  |  | 1.15 |  |  |  | 1.24 |
| $\Delta E_2$ |  |  |  |  | 4.6 |  |  |  |

Sample 3 had an injection velocity of 23 cm³/s, stained colour variation $\Delta E_1$ value of 5.14 and colour difference $\Delta E_2$ value of 16.7. Sample 4 had an injection velocity of 250 cm³/s, stained colour variation $\Delta E_1$ value of 1.24 and colour difference $\Delta E_2$ value of 4.6. As shown by the colour measurements between the samples 3 and 4, the colour variation $\Delta E_1$ and the colour difference $\Delta E_2$ in a stained surface is lower on a composite CMP1 surface (sample 4) having a higher injection velocity v1.

TABLE 5

Influence of different injection speeds on color measured by ink absorbency test on a composite CMP1 comprising 20-wt % of organic natural fiber FIB1 based material.

|  | average | max | min | StdDev | average | max | min | StdDev |
|---|---|---|---|---|---|---|---|---|
|  | Sample 5: CMP1 FIB1 20-wt % 23 cm3/s | | | | Sample 5: after NP ink treatment | | | |
| CIE L | 56.3 | 57.6 | 55.6 | 0.7 | 48.6 | 49.3 | 47.8 | 0.7 |
| CIE a | −0.22 | 0.11 | −0.41 | 0.20 | −1.14 | −1.03 | −1.27 | 0.08 |
| CIE b | 10.09 | 11.68 | 8.63 | 1.22 | 6.53 | 8.53 | 4.85 | 1.27 |
| $\Delta E_1$ |  |  |  | 1.44 |  |  |  | 1.45 |
| $\Delta E_2$ |  |  |  |  | 8.5 |  |  |  |
|  | Sample 6 CMP1 FIB1 20-wt % 250 cm3/s | | | | Sample 6: after NP ink treatment | | | |
| CIE L | 52.58 | 52.83 | 52.20 | 0.26 | 49.18 | 49.43 | 48.43 | 0.37 |
| CIE a | 0.49 | 0.56 | 0.43 | 0.05 | −0.02 | 0.15 | −0.39 | 0.20 |
| CIE b | 13.86 | 14.10 | 13.51 | 0.22 | 12.51 | 13.17 | 10.96 | 0.88 |
| $\Delta E_1$ |  |  |  | 0.34 |  |  |  | 0.98 |
| $\Delta E_2$ |  |  |  |  | 3.7 |  |  |  |

Sample 5 had an injection velocity of 23 cm³/s, stained colour variation $\Delta E_1$ value of 1.45 and colour difference $\Delta E_2$ value of 8.5. Sample 6 had an injection velocity of 250 cm³/s, stained colour variation $\Delta E_1$ value of 0.98 and colour difference $\Delta E_2$ value of 3.7. As shown by the colour measurements between the samples 5 and 6, the colour variation $\Delta E_1$ and the colour difference $\Delta E_2$ in a stained surface is lower on a composite CMP1 surface (sample 6) having a higher injection velocity v1. Furthermore, tables 4 and 5 show that composite CMP1 products comprising higher amounts of organic natural fiber FIB1 based material have higher stained and unstained colour variation $\Delta E_1$ and colour difference $\Delta E_2$ values. Therefore, addition of the amount organic natural fiber FIB1 based material has an effect on the micro contoured surface layer.

Table 6 below is another example of injection moulded composite CMP1 products at a lower mould temperature of 25° C. and at a higher mould temperature of 75° C. Sample 7 and sample 8 were composite CMP1 products comprising 40-wt % of organic natural fiber FIB1 based material and matrix material MTX1, each sample having a planar surface 101 and dimension based of standard ISO 527 test specimen type 1A. The organic natural fiber FIB1 based material comprised cellulose and the matrix material MTX1 comprised polypropylene. The difference in the mould temperature $T_{201}$ has an effect on the level of micro contoured surface layer, as shown by CIELab colour, colour difference $\Delta E_2$ and colour variation $\Delta E_1$.

TABLE 6

Influences of different mould temperatures on a composite CMP1 product comprising 40-wt % of organic natural fiber FIB1 based material.

|  | average | StdDev | average | StdDev |
|---|---|---|---|---|
|  | Sample 7: mould temperature: 25° C. | | Sample 7: after NP ink treatment | |
| CIE L | 47.64 | 0.61 | 43.41 | 3.04 |
| CIE a | 6.35 | 0.23 | 6.34 | 0.82 |
| CIE b | 20.63 | 0.48 | 18.97 | 2.87 |
| $\Delta E_1$ |  | 0.81 |  | 4.26 |
| $\Delta E_2$ |  |  | 4.6 |  |
|  | Sample 8: mould | | Sample 8: after | |

TABLE 6-continued

Influences of different mould temperatures on a composite CMP1 product comprising 40-wt % of organic natural fiber FIB1 based material.

|  | average | StdDev | average | StdDev |
|---|---|---|---|---|
|  | temperature: 75° C. | | NP ink treatment | |
| CIE L | 46.28 | 0.24 | 43.58 | 1.02 |
| CIE a | 7.18 | 0.28 | 7.95 | 0.25 |
| CIE b | 21.85 | 0.56 | 22.84 | 1.00 |
| $\Delta E_1$ |  | 0.67 |  | 1.45 |
| $\Delta E_2$ |  |  | 3.0 |  |

Sample 7 had a mould temperature of 25° C., stained colour variation $\Delta E_1$ value of 4.26 and colour difference $\Delta E_2$ value of 4.6. Sample 8 had a mould temperature of 75° C., stained colour variation $\Delta E_1$ value of 1.45 and colour difference $\Delta E_2$ value of 3.0. As shown by the colour measurements between the samples 7 and 8, the colour difference $\Delta E_2$ in a stained surface is lower on a composite CMP1 surface (sample 8) having a higher mould temperature $T_{201}$. Furthermore, at a higher mould temperature $T_{201}$ the stained colour variation $\Delta E_1$ has a lower value.

Figure 17:
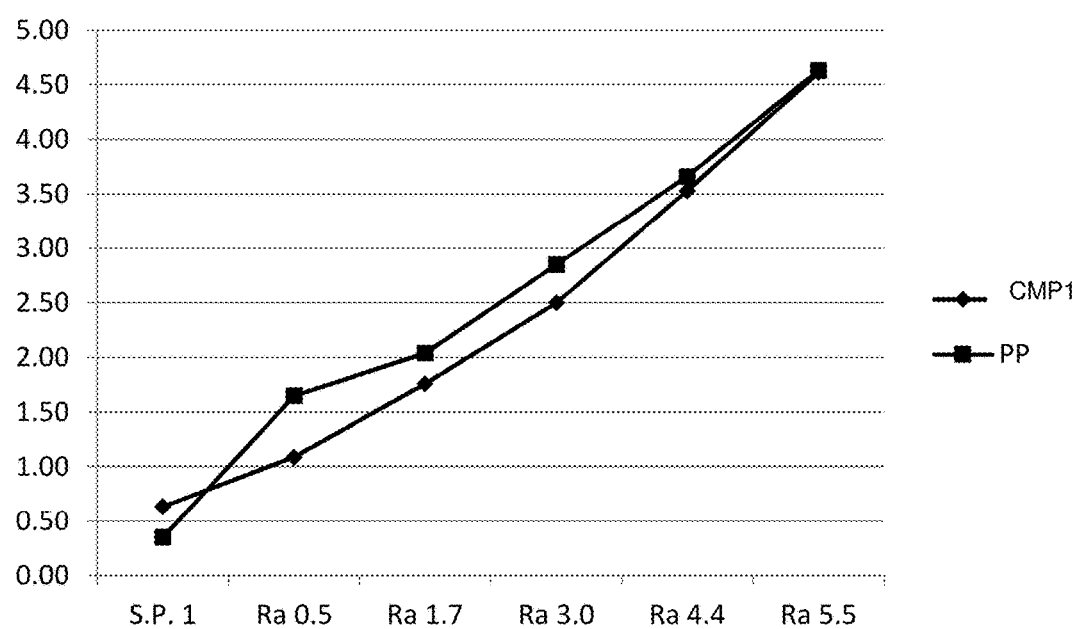
FIG. 17 shows roughness comparison of polypropylene (PP) and composite CMP1 comprising 40 wt-% of organic natural fiber FIB1 based material. The x-axis represents a roughness grade of mould surface (S.P.I or $R_a$) and the y-axis represents the measured roughness in micrometers.

FIG. 17 and table 7 below is an example of injection moulded composite CMP1 surface roughness in micrometers at various mould surface roughness levels. Roughness of a product surface comprising solely polypropylene polymer was compared to the roughness of a composite CMP1 comprising comprising 40 wt-% of organic natural fiber FIB1 based material.

TABLE 7

Average surface roughness values from 10 surface portions (POR1 to POR10) of a composite CMP1 and polypropylene at various mould surface roughness levels, measured using 20x objective.

| Description |  | S.P. 1 | Ra 0.5 | Ra 1.7 | Ra 3.0 | Ra 4.4 | Ra 5.5 |
|---|---|---|---|---|---|---|---|
| Sample |  | CMP1 FIB1 40-wt % | | | | | |
| CLSM, roughness, Ra | μm | 0.63 | 1.09 | 1.76 | 2.50 | 3.53 | 4.61 |
| CLSM, roughness, Rq | μm | 0.85 | 1.40 | 2.23 | 3.14 | 4.38 | 5.77 |
| CLSM, roughness, Rz | μm | 7.80 | 10.12 | 13.61 | 16.29 | 17.83 | 20.45 |
| CLSM, roughness, Rmax | μm | 14.94 | 15.14 | 20.29 | 25.78 | 29.83 | 35.45 |
| Sample |  | polypropylene | | | | | |
| CLSM, roughness, Ra | μm | 0.35 | 1.65 | 2.04 | 2.85 | 3.66 | 4.63 |
| CLSM, roughness, Rq | μm | 0.46 | 2.14 | 2.60 | 3.55 | 4.58 | 5.73 |
| CLSM, roughness, Rz | μm | 3.05 | 16.03 | 15.23 | 16.89 | 18.18 | 20.16 |
| CLSM, roughness, Rmax | μm | 7.68 | 23.53 | 23.18 | 26.64 | 29.29 | 34.17 |

The experimental data above shows, that an injection moulded product surface 101 manufactured using a workpiece surfaces 201 made of a polymer having a mirror gloss finish may have a lower surface roughness than a composite CMP1. However, the addition of organic natural fiber FIB1 based material to a composite CMP1 comprising matrix material MTX1 provides a higher micro contour surface layer resulting in a surface 101 having a mirror gloss finish in higher roughness $R_a$ value. The roughness level of the micro contour surface is on a smaller level than the mould surface roughness, when the mould surface 201 comprises a clear texture. The micro contour surface level may be measured by, for example, ink absorbency test as CIELab colour difference or variation, or as a surface gloss.

Figure 7A:
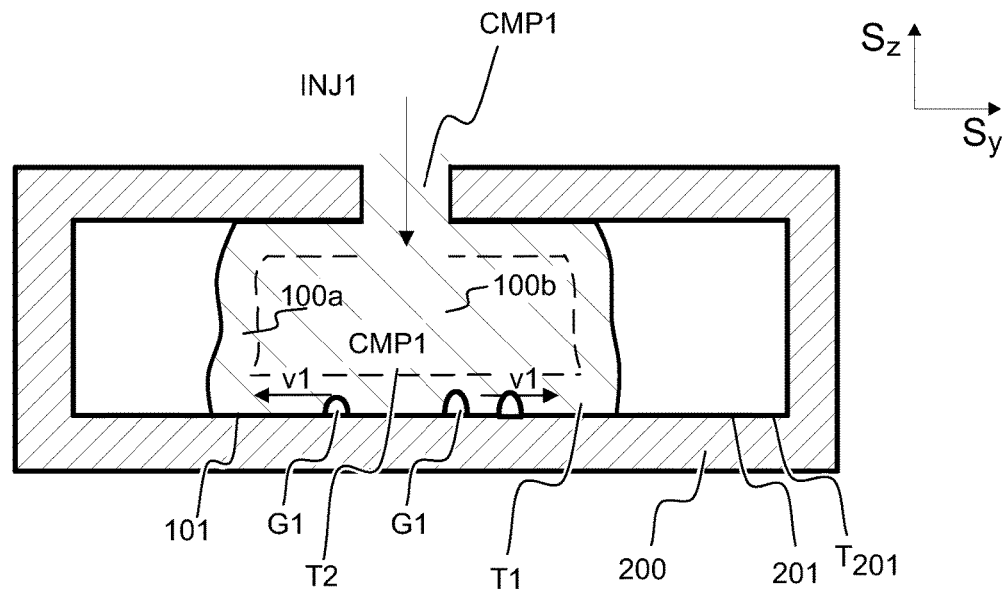
FIGS. 7a and 7b show an example of providing a composite product by injection moulding.
Figure 7B:
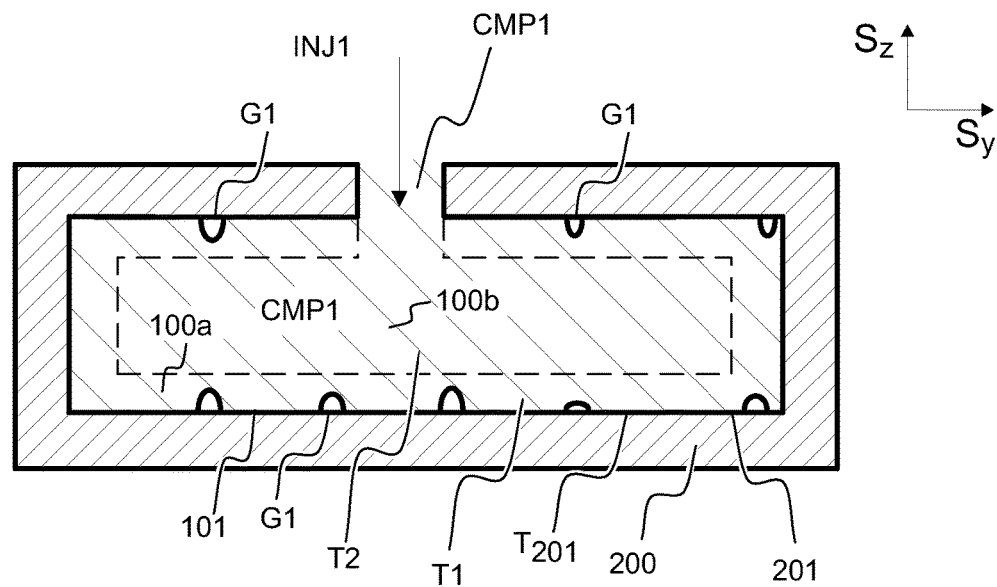

FIGS. 7*a* and 7*b* show an example of providing a composite CMP1 product by injection moulding. The injection moulding process in general has a cycle comprising different operations. The workpiece 200 may comprise more than one parts which first are closed, followed by injection of the composite CMP1 material into the workpiece 200 cavity, for example with a reciprocating screw. The melted composite CMP1 may be introduced into the interior of the workpiece 200 (mold) through an injection point INJ1, such as a nozzle, which allows the composite CMP1 material to enter the workpiece 200 and propagate in the workpiece 200 to fill the workpiece 200. The injection point INJ1 may be positioned in the vicinity of an end of a workpiece 200. There may be more than one injection points INJ1. When the injection point INJ1 is in the vicinity of an end of a workpiece 200, said end of a workpiece 200 is filled first by the melted composite CMP1. Said end of a composite CMP1 product refers to the first end END1 of a composite CMP1 product. When the melted composite CMP1 introduced at a velocity v1 propagates in the workpiece 200 in the direction of the melt flow $S_{FLV}$, the other end of the workpiece 200 farthest from the injection point INJ1 is filled last, in particular when the composite CMP1 has a melt flow resistance equal in all directions. The melt flow in general is fastest in areas where the flow resistance is the lowest. Thus the end END2 may be a ultimate point, wherein the melt flow may cease, in other words, the END2 may be the point which is filled last. This end refers to the second end END2 of a composite CMP1 product. Alternatively, when the injection point is in the central portion of the workpiece 200, the composite CMP1 material in general propagates radially in the workpiece 200, such that the central portion of the workpiece 200 is filled first, forming the first end END1 of a composite CMP1 product, and the peripheral surface 201 of the workpiece 200 is filled last. The peripheral surface 201 may thereby form the boundary of the composite CMP1 product farthest from the injection point INJ1, referred to as the second end END2 of a composite CMP1 product. Depending of the mould design, there may be one or more injection points INJ1. When multiple injection points INJ1 are used, a surface portion POR1 having the longest distance to any of the injection points INJ1 on the product surface 101 may be defined as the second end END2 of a composite CMP1 product, while any of the injection points INJ1, preferably the one farthest away from the second end END2, may be defined as the first end END1 of a composite CMP1 product. While methods such as extrusion and rotation moulding do not comprise an injection point INJ1, the first end END1 of a composite CMP1 product and the second end END2 of a composite CMP1 product are defined to be opposite ends of a products on the same surface, as shown in FIGS. 6*a*, 6*b* and 6*c*, 6*d* and 6*e*. When measuring such products 100, the surface portions POR1, POR2 from which the measurements are performed may preferably be selected from both ends END1, END2 of the product. When manufacturing an extrusion product 100, the surface 101 comprising the END1 and END2 may refer to the surface having the longest contact time with a calendaring roll or a nip roll. When measuring such extrusion products 100, the surface portions POR1, POR2 from which the measurements are performed may preferably be selected from both ends END1, END2 of the product. Once the workpiece 200 cavity is completely filled, a holding pressure may be maintained to compensate for any material shrinkage. In the next step, a screw may retract to allow the next amount of composite CMP1 melt, referred to as a 'shot', to be fed to the screw. When the composite CMP1 product has cooled to a solid state, the mold may be opened and the part ejected. The injection time may vary, for example in the range of less than a second to several seconds. For small volumes of injection moulded material, for example when the shot volume is less than 26 cubic centimeters ($cm^3$), an injection time less than 1 second, such as in the range of 0.1 to 0.4 seconds, may be referred to as fast injection. For larger volumes of injection moulded material, for example when the shot volume is equal to or more than 1000 cubic centimeters ($cm^3$), an injection time equal to or more than 1 second, such as in the range of 1 to 5 seconds, can be referred as fast injection, and for example 6 to 10 seconds or more, may be referred to as slow injection.

Table 8 below shows the relationship between injection volume ($cm^3$) and injection time (s). The definition of injection time may be defined by using a first threshold Timepoint 1 and a second threshold Timepoint 2. Injection times equal to or below the first threshold Timepoint 1 value may be defined as fast injection, injection times more than the first threshold Timepoint 1 value and less than the second threshold Timepoint 2 value may be defined as intermediate injection times, and injection times equal to or more than the second threshold Timepoint 2 value may be defined as slow injection times. the maximum injection time for a fast injection time, an intermediate injection time and a slow injection time depends on the volume of the product 100 or products 100 produced during one shot. When the volume of the product 100 or one shot is equal or below 5 cm3, the injection time for the fast injection is 0.1 seconds or below and the injection time for the intermediate injection is above 0.1 seconds, but equal or below 0.2 seconds and the injection time for the slow injection is above 0.2 seconds. When the volume of the product 100 or one shot is above 5 cm3, but equal or below 10 cm3, the injection time for the fast injection is 0.15 seconds or below and the injection time for the intermediate injection is above 0.15 seconds, but equal or below 0.3 seconds and the injection time for the slow injection is above 0.3 seconds.

When the volume of the product 100 or one shot is above 10 cm3, but equal or below 20 cm3, the injection time for the fast injection is 0.25 seconds or below and the injection time for the intermediate injection is above 0.25 seconds, but equal or below 0.4 seconds and the injection time for the slow injection is above 0.4 seconds.

When the volume of the product 100 or one shot is above 20 cm3, but equal or below 50 cm3, the injection time for the fast injection is 0.4 seconds or below and the injection time for the intermediate injection is above 0.4 seconds, but equal or below 0.6 seconds and the injection time for the slow injection is above 0.6 seconds.

When the volume of the product 100 or one shot is above 50 cm3, but equal or below 100 cm3, the injection time for the fast injection is 0.6 seconds or below and the injection time for the intermediate injection is above 0.6 seconds, but equal or below 1.0 seconds and the injection time for the slow injection is above 1.0 seconds.

When the volume of the product 100 or one shot is above 100 cm3, but equal or below 250 cm3, the injection time for the fast injection is 1.0 seconds or below and the injection time for the intermediate injection is above 1.0 seconds, but equal or below 1.2 seconds and the injection time for the slow injection is above 1.2 seconds.

When the volume of the product 100 or one shot is above 250 cm3, but equal or below 500 cm3, the injection time for the fast injection is 1.2 seconds or below and the injection time for the intermediate injection is above 1.2 seconds, but equal or below 2.0 seconds and the injection time for the slow injection is above 2.0 seconds.

When the volume of the product 100 or one shot is above 500 cm3, but equal or below 1000 cm3, the injection time for the fast injection is 2.0 seconds or below and the injection time for the intermediate injection is above 2.0 seconds, but equal or below 3.0 seconds and the injection time for the slow injection is above 3.0 seconds.

When the volume of the product 100 or one shot is above 1000 cm3, but equal or below 2000 cm3, the injection time for the fast injection is 3.0 seconds or below and the injection time for the intermediate injection is above 3.0 seconds, but equal or below 4.0 seconds and the injection time for the slow injection is above 4.0 seconds.

When the volume of the product 100 or one shot is above 2000 cm3, but equal or below 4000 cm3, the injection time for the fast injection is 4.0 seconds or below and the injection time for the intermediate injection is above 4.0 seconds, but equal or below 5.0 seconds and the injection time for the slow injection is above 5.0 seconds.

When the volume of the product 100 or one shot is above 4000 cm3, the injection time for the fast injection is 4.5 seconds or below and the injection time for the intermediate injection is above 4.5 seconds, but equal or below 6.0 seconds and the injection time for the slow injection is above 6.0 seconds.

TABLE 8

Relationship between injection volume (cm³) and injection time (s).

| Volume of product or one shot cm³ | Timepoint 1 s | Timepoint 2 s |
|---|---|---|
| 0-5 | 0.1 | 0.2 |
| 5-10 | 0.15 | 0.3 |
| 10-20 | 0.25 | 0.4 |
| 20-50 | 0.4 | 0.6 |
| 50-100 | 0.6 | 1.0 |
| 100-250 | 1 | 1.2 |
| 250-500 | 1.2 | 2 |
| 500-1000 | 2 | 3 |
| 1000-2000 | 3 | 4 |
| 2000-4000 | 4 | 5 |
| above 4000 | 4.5 | 6 |

Table 9 shows examples of injection moulding parameters for composite CMP1 comprising matrix material MTX1 and organic natural fiber FIB1 based material. In the examples, the matrix material MTX1 comprised polypropylene and the organic natural fiber FIB1 based material comprised 40 wt-% of cellulose fibre. The injection moulding was performed by using a commercially available injection moulding machine Fanuc Roboshot a-100iA, where the screw diameter was 36 mm, the maximum shot volume was 140 g and the shot volume used in each example was 26 g. In the process, moisture content of raw material was less than 0.1%, delay time in screw in the range of 3 minutes and the melt flow index of the matrix material MTX1 was 45 g/10 min (230° C./2.16 kg).

TABLE 9

An example of parameter values for injection moulding. The velocity v1 and/or mould surface temperature $T_{201}$ have been selected between samples to provide differences in surface micro contour layer levels.

|  | TP1 | TP2 | TP5 | TP6 |
|---|---|---|---|---|
| Injection velocity, mm/s | 100 | 100 | 220 | 25 |
| Mould surface temperature, ° C. | 30 | 80 | 80 | 80 |
| Plastification, rpm | 80 | 80 | 80 | 80 |
| Barrel temp. beginning, ° C. | 170 | 170 | 170 | 170 |
| Barrel temperature middle, ° C. | 180 | 180 | 180 | 180 |
| Barrel temperature end, ° C. | 190 | 190 | 190 | 190 |
| Barrel temperature nozzle, ° C. | 190 | 190 | 190 | 190 |
| Holding pressure, bar | 440 | 440 | 550 | 360 |
| Maximum pressure in injection, bar | 1100 | 1077 | 1300 | 912 |
| Cushion, mm | 4.07 | 4.07 | 4.1 | 4.84 |
| Injection time, s | 0.39 | 0.39 | 0.22 | 1.34 |
| Holding time, s | 14 | 14 | 14 | 14 |
| Cooling time, s | 10 | 10 | 10 | 10 |
| Cycle time, s | 31.3 | 31.6 | 31.1 | 32.2 |
| Plastification time, s | 4.9 | 5.2 | 4.8 | 4.9 |
| Backing pressure, bar | 25 | 25 | 25 | 25 |

According to the present application, the injection speed may range from 5 to 400 mm/s, preferably 10 to 300 mm/s, most preferably 25 to 250 mm/s, such as 25, 100 or 220 mm/s. The mould surface temperature $T_{201}$, which may be lower than the melting point $T_m$ of the matrix material, may range from 25° C. to 280° C. When introducing material into the workpiece 200, the mould temperature $T_{201}$ may during the introduction be high, such as in the range of 100° C. to 280° C., to enable a higher introduction velocity v1. A mould may, for example, be briefly induction heated to a high temperature to reduce the formation of micro contouring. A brief induction heating may comprise a temperature in the range of 100° C. to 400° C., and a heating time in the range of 0.1 seconds to 2 seconds, preferably 0.5 to 1.5 seconds. After the composite melt has been introduced, the mould temperature may preferably be in the range of 25° C. to 200° C., most preferably in the range of 30° C. to 100° C., such as 30° C. or 80° C., depending on the used matrix material MTX1. The parameters shown in the tables are intended to provide a teaching for a person skilled in the art that the values and direction of change will lead to expected results, i.e. using higher injection speed and/or higher temperature leads to less micro contouring of the composite CMP1 surface 101, 102.

Figure 8A:
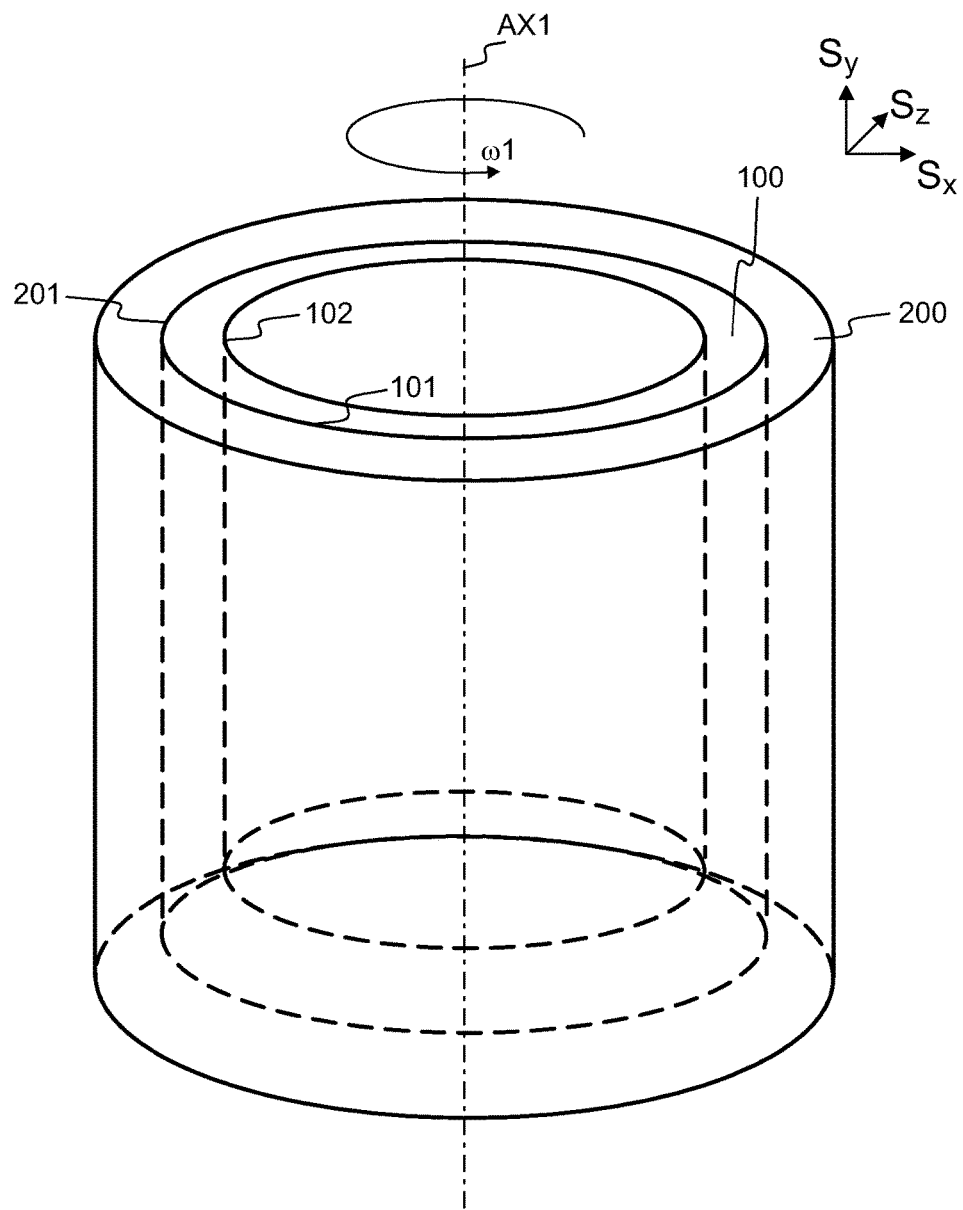
FIGS. 8a and 8b represent an example of providing a composite product by rotation moulding.
Figure 8B:
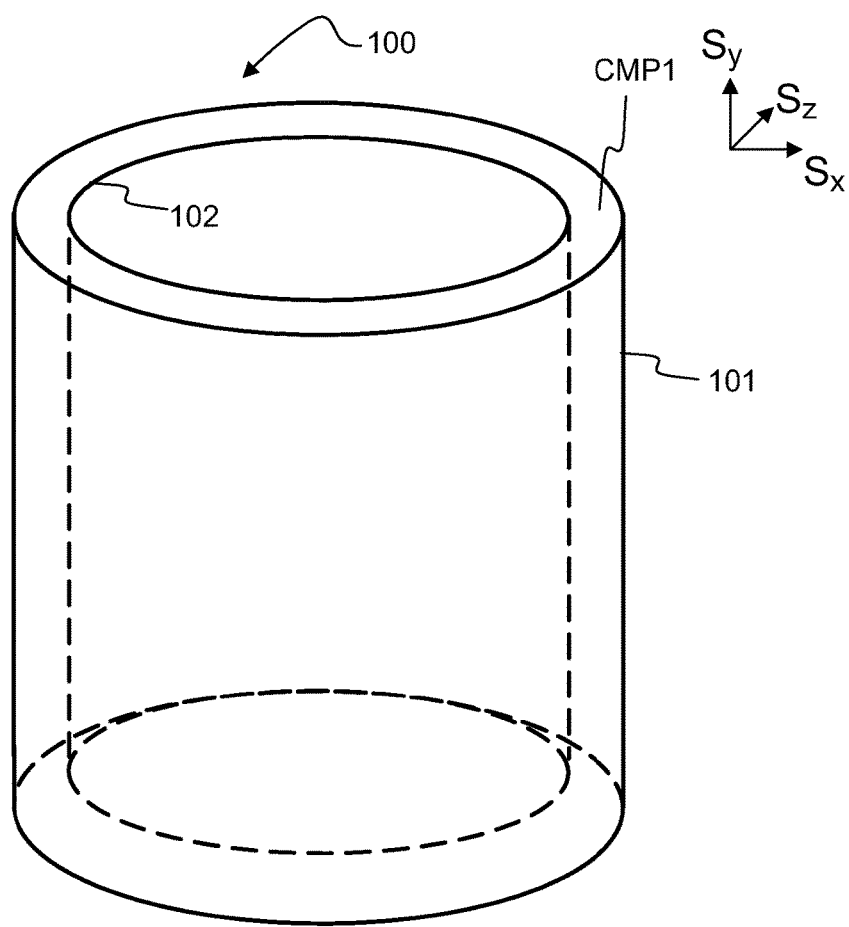

FIGS. 8a and 8b represent an example of providing a composite CMP1 product 100 by rotation moulding. In rotation moulding a shot of composite CMP1 material may be introduced into a heated workpiece 200 cavity as powder. In rotation moulding, the workpiece surface 201 may thus in the beginning of the manufacturing process comprise a surface temperature $T_{201}$ higher than the composite T1, T2, T3. During manufacturing the workpiece 200 is heating the composite CMP1 material to a melt. By heating the workpiece surface 201 and rotating the workpiece 200 slowly around a perpendicular axis AX1 at an angular speed ω1, advantageously also around other axises perpendicular axis AX1, the softened composite CMP1 material may disperse and stick to the surface 291 of the workpiece 200 and form a composite product 100 having a first surface 101 adjacent to the workpiece surface 201 and a second surface 102, which has not been pressed against a workpiece surface 201. The workpiece temperature $T_{201}$ may then be reduced by cooling, to enable the hardening of the composite melt to a product surface 101, 102. The second surface 102 may comprise a roughness value $R_a$ that is different from the first surface. To reduce thickness variation of the composite CMP1 product, the workpiece 200 may continue to rotate during the heating phase and the cooling phase. Moulding methods are cost-effective for production of large series of congruent object. Furthermore, the surface 201 of the workpiece 200 may be selected to comprise a roughness value $R_a$ to be transferred as a mirror image on the surface of the composite CMP1 product. Further still, the second surface 102 may be provided without any workpiece 200 impression marks G1.

Figure 9:
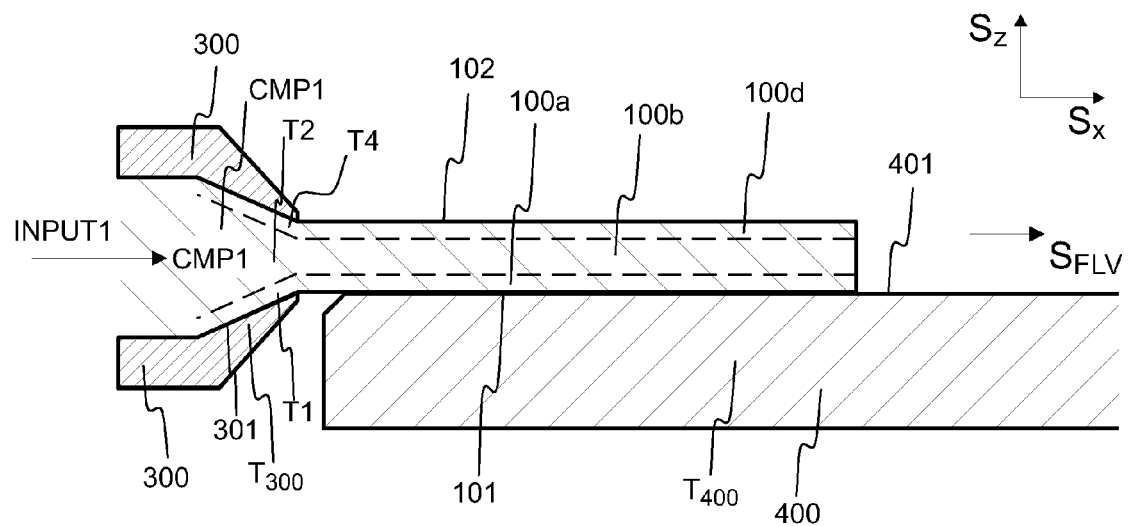
FIG. 9 represents an example of providing a composite product by extrusion.

FIG. 9a represents an example of providing a composite CMP1 product 100 by extrusion. The extrusion may comprise for example sheet extrusion, foam extrusion, wire and cable extrusion, fibre, filament and tape extrusion, pipe extrusion or extrusion method comprising casting or coating. The extrusion may be a single layer or multi-layer extrusion method. When a composite CMP1 product comprises a maximum thickness of a few millimeters, such as in the range of 30 micrometers to ten millimeters, for example in the range of 30 micrometers to 120 micrometers, or in the range of 100 micrometers to 10000 micrometers, or in the range of 400 micrometers to 10000 micrometers, preferably in the range of 400 micrometers to 8000 micrometers, most preferably in the range of 400 micrometers to 6000 micrometers, the extrusion method may comprise film extrusion methods such as BOPP, blown or cast film extrusion. The composite CMP1 may be pressed by a screw INPUT1 towards a die 300. The die 300 may comprise a nozzle 301, such as a shaped tip, having a desired profile for shaping the composite CMP1. At the nozzle 301 of die 300 the composite may be expelled through the die 300 having a temperature $T_{300}$ in the direction of the melt flow $S_{FLV}$. The extruded composite CMP1 may comprise a first surface layer 100a having a first surface 101 and a first temperature T1 and an interior layer 100b having a second temperature T2. The first temperature T1 at the surface layer 100a of the composite CMP1 in general may be lower than the second temperature T2 in the interior layer 100b of the composite CMP1. The extruded composite CMP1 may further comprise a second surface 202, and the extruded composite CMP1 may comprise a top surface layer 100d having a second surface 102, a having a temperature T4. The top surface layer 100d differs from the first surface layer 100a, as the second surface 102 may be provided without any workpiece 200 impression marks G1. The first surface layer 100a may be cooled down by a conveyer unit 400 having a surface 401 and a temperature $T_{400}$, which may be less than the temperature T1 of the first surface layer 100a.

Figure 10A:
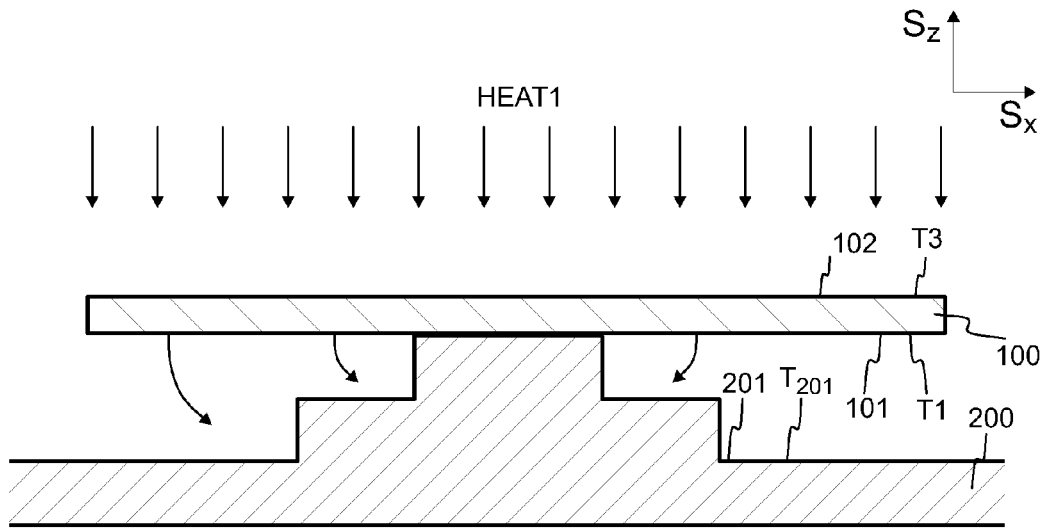
FIGS. 10a, 10b and 10c represents an example of providing a composite product by thermoforming.
Figure 10B:
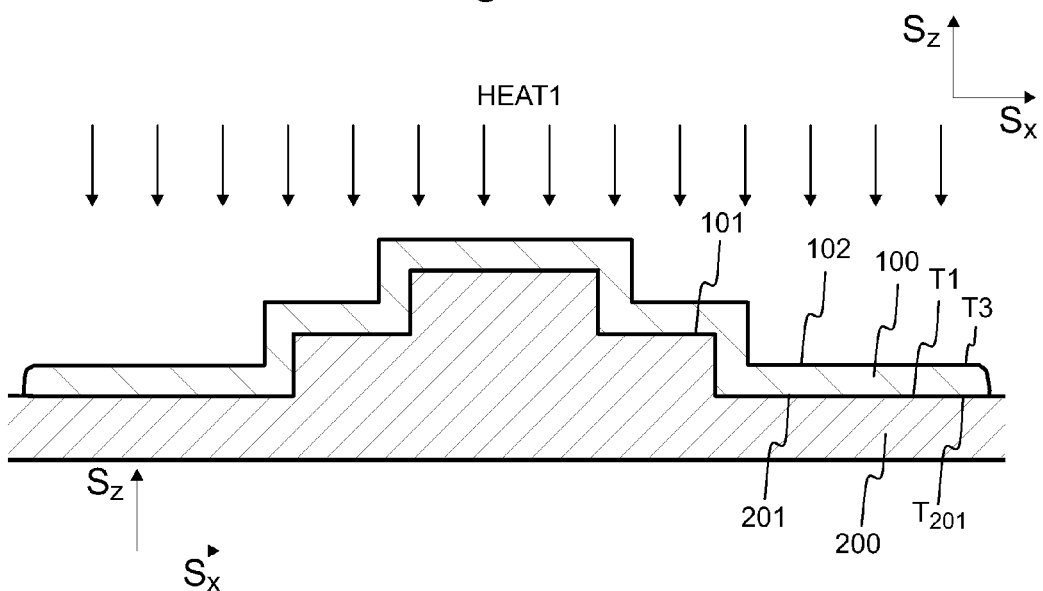
Figure 10C:
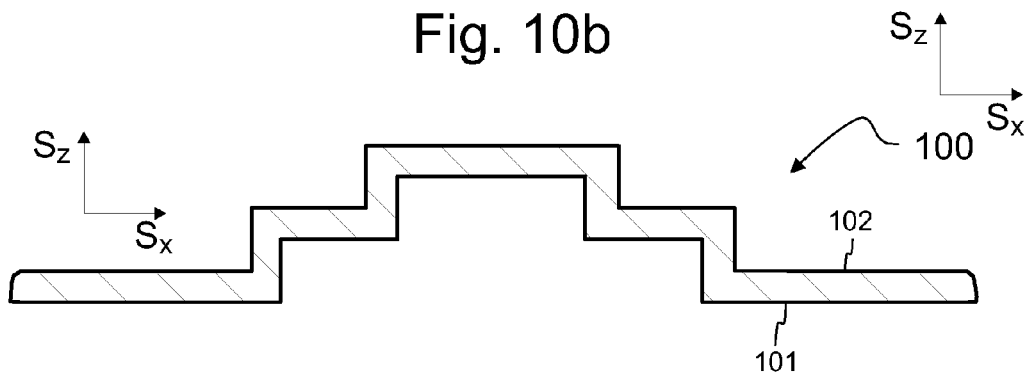
Figure 11A:
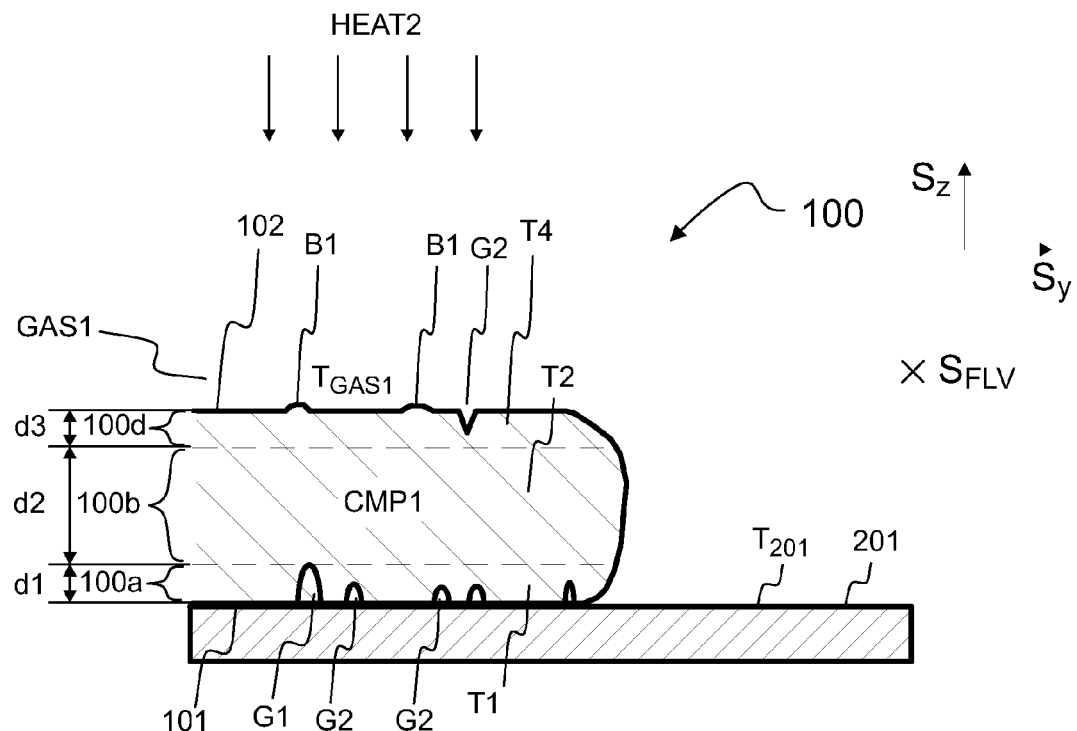
FIGS. 11a, 11b, 11c and 11d provide examples how thermoforming or heating of a composite product surface may be used to alter the surface properties of the composite surface.
Figure 11B:
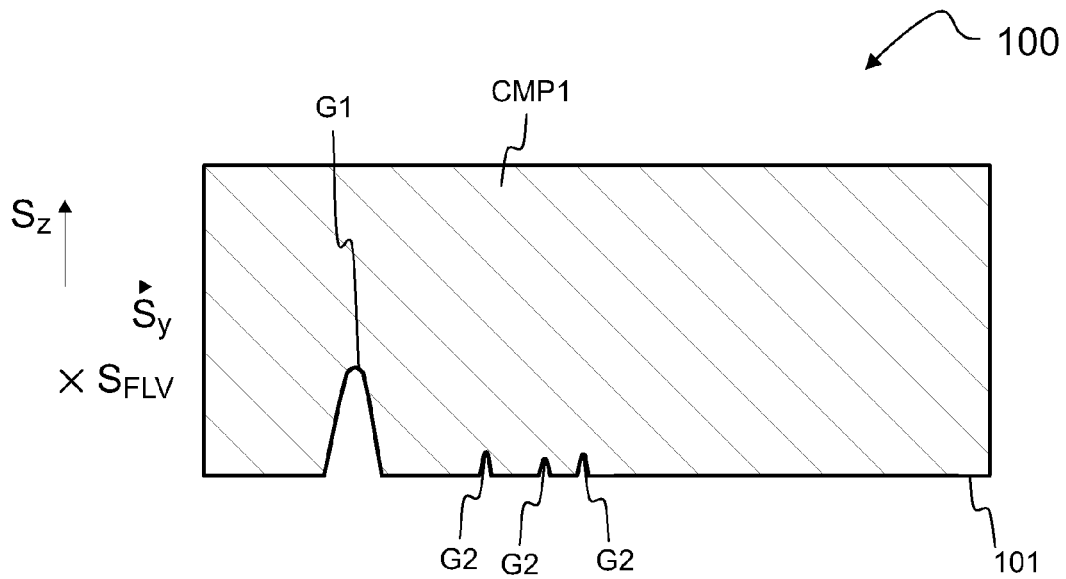
Figure 11C:
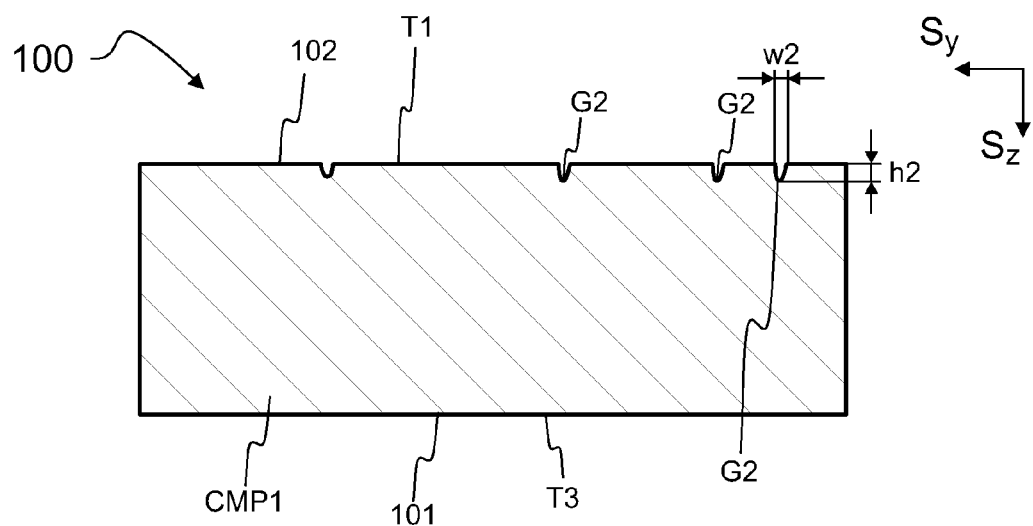
Figure 11D:
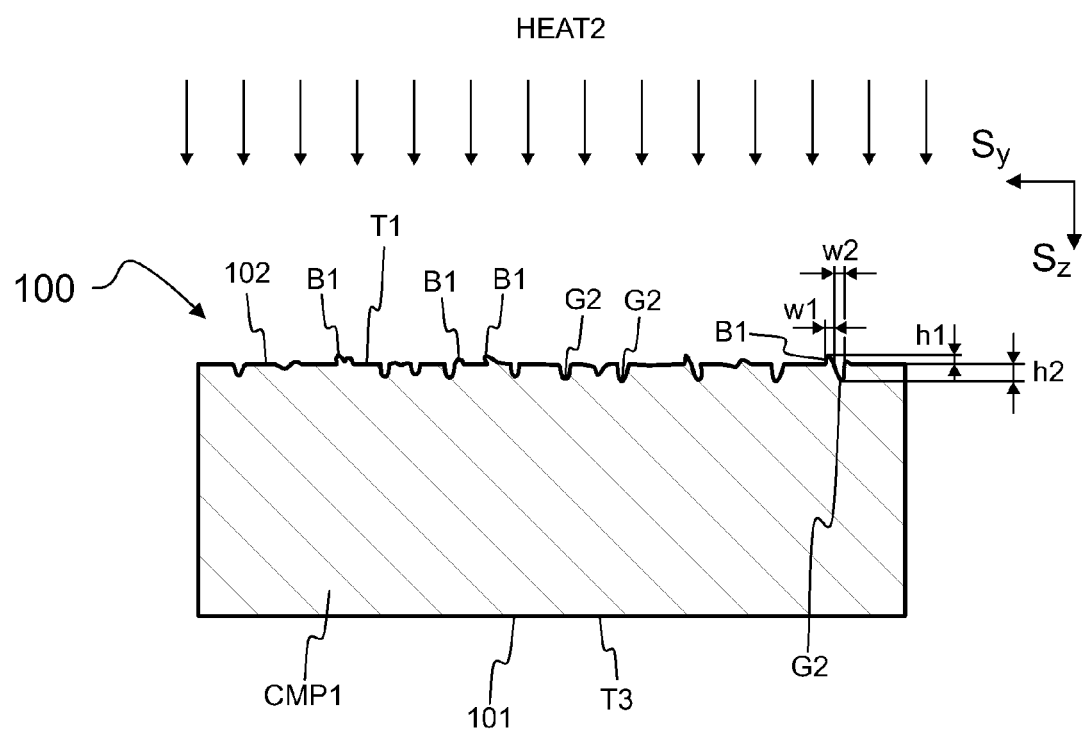

FIGS. 10a, 10b and 10c represents an example of providing a composite CMP1 product 100 by thermoforming. Thermoforming may comprise thin-, medium- or thick-gauge thermoforming, depending of the thickness of the composite CMP1 product to be manufactured and of the thickness of the composite sheet to be formed. In general, thermoforming may comprise the forming of a heated composite CMP1 product 100, such as a sheet, over a mold 200. In thermoforming, the composite CMP1 product 100 may comprise a thickness up to a few millimeters, such as in the range of 30 micrometers to 10 millimeters, for example in the range of 30 micrometers to 120 micrometers, or in the range of 100 micrometers to 10000 micrometers, or in the range of 400 micrometers to 10000 micrometers, preferably in the range of 400 micrometers to 7500 micrometers, most preferably in the range of 400 micrometers to 6000 micrometers. The shaping of the composite CMP1 product 100 may be implemented by introducing a vacuum to a first surface 101 of a composite CMP1 product 100 to hold the first surface 101 of the product against the surface 201 of the workpiece 200. By providing heat HEAT1 to the second surface 102 of the composite CMP1 product 100, the temperature T1, T3, of the composite CMP1 product 100 may be raised such that the composite CMP1 product 100 may be softened, as shown in FIG. 10a. The heat HEAT1 may be provided to both the first surface 101 and the second surface 102 to soften the composite CMP1 material. A convenient way to provide heat HEAT1 to both surfaces 101, 102 of the product 100 may be, for example, by infrared radiation. After having provided heat HEAT1 to the first and/or second surface 101, 102 of the composite CMP1 product 100, the first and/or second surface 101, 102 may be cooled by the workpiece 200 having a surface temperature $T_{201}$ lower than the surface temperatures T1, T3 of the composite CMP1 product 100. The softened composite CMP1 product 100 comprises conformability and formed a mirror image of the workpiece 200, as shown in FIG. 10b. The temperature $T_{201}$ of the workpiece 200 may be selected and controlled, such that when thermoplastic materials are used, the workpiece surface temperature $T_{201}$ may be lower than the temperature T1,T3 of the product 100 to cool down the composite CMP1 material. After the product 100 has cooled down to a solid state, it may be removed from the workpiece 200. Alternatively, in thermoforming, the workpiece surface 201 may in the beginning of the manufacturing process comprise a surface temperature $T_{201}$ higher than the composite product temperature T1, T3. Instead of providing heat HEAT1 to the second surface 102, for example by heated air or a heated surface, the heat HEAT1 may be provided to both the first surface 101 and the second surface 102 to soften the composite CMP1 material. A convenient way to provide heat HEAT1 to both surfaces 101, 102 of the product 100 may be, for example, by infrared radiation. After having provided heat HEAT1 to the first and/or second surface 101, 102 of the composite CMP1 product 100, the first and/or second surface 101, 102 may be cooled by the workpiece 200 having a surface temperature $T_{201}$ lower than the surface temperatures T1, T3 of the composite CMP1 product 100. When the heating is reduced and/or the composite is cooled down to a solid state, it may be removed from the workpiece 200. Alternatively, or in addition the shaping of the composite CMP1 sheet may be implemented by introducing pressure on a first surface 101 and/or second surface 102 of a composite CMP1 product 100, such as air pressure, to help the forming process. Thermoforming may be used, for example, to manufacture containers such as cups, lids, trays, blisters, clamshells or other similar products for the food, medical, and general retail industries. Further, thermoforming may comprise the manufacture of enclosures for various devices, such as medical imaging and diagnostic equipment, mobile phones, electronic instruments, musical instruments or toys. In addition, the items may be covers such as vehicle door and dash panels, refrigerator liners, utility vehicle beds or plastic pallets to name a few.

A method to enhance a surface roughness of a composite CMP1 100 may therefore comprise;
  providing a composite CMP1 comprising matrix material MTX1 and organic natural fiber FIB1 based material having a primary surface layer with a primary surface roughness level, a primary gloss value and a primary friction coefficient softening said primary surface layer 101, 102 of said composite CMP1 material by heating, providing a secondary surface layer 101, 102 of said composite CMP1 material surface with a secondary surface roughness level, a secondary gloss value and a secondary friction coefficient by cooling said softened surface layer, wherein the secondary surface roughness level is different from the primary surface roughness level and/or a secondary gloss value different is from the primary gloss value and/or a secondary kinetic friction coefficient value is different from the primary kinetic friction coefficient value.

In particular, a composite CMP1 may comprise thermoplastic matrix material MTX1 and organic natural fiber FIB1 based material having a primary surface 101, 102 layer having a primary surface roughness level, a primary gloss value and a primary friction coefficient value. The composite CMP1 may comprise a composition arranged such that the primary surface 101, 102 layer will be converted into a secondary surface 101, 102 layer when softened by heating and cooling said composite CMP1, the secondary surface 101, 102 layer having a secondary surface roughness level different from the primary surface roughness level and/or a secondary gloss value different from the primary gloss value and/or a secondary friction coefficient value different from the primary friction coefficient value.

The conversion of the composite CMP1 primary surface 101, 102 layer into the secondary surface 101, 102 layer having a secondary surface roughness level, a secondary gloss value or a secondary friction coefficient value different from the primary friction coefficient value may be obtained, for example by heating said composite CMP1 primary surface 101, 102 layer in the range of 2 to 6 minutes, preferably in the range of 4 to 6 minutes in a temperature below 280° C. but at least 20° C., preferably at least 30° C. above a temperature $T_{heat}$, where the temperature $T_{heat}$ may be selected from the melting point $T_m$ or the glass transition temperature $T_g$ of the thermoplastic matrix material MTX1, whichever of the temperatures $T_g$, $T_m$ is higher. In composite CMP1 where no melting point exists, the glass transition temperature $T_g$ may be selected. The temperature $T_{heat}$ is a temperature enabling the softening or melting of at least the primary surface layer 101, 102, such that the surface layer 101, 102 properties may be altered in the process. The alteration of surface properties by heating may be used, for example in automotive dash board panels. The panels may reflect sunlight and therefore have a high gloss. By reheating a selected part of the dash board surface, the gloss may be reduced and the reflection diminished. Alternatively, or in addition, the friction on the dashboard surface may be increased by reheating a selected part of the dash board surface, to prevent or reduce the sliding of materials or objects, such as parking tickets, papers or sheets, left on the dashboard.

FIGS. 11*a*, 11*b*, 11*c* and 11*d* provide an example according to an embodiment of the invention how thermoforming or heating of a composite CMP1 product 100 surface may be used to alter the surface properties of said composite CMP1 surface. In particular, thermoforming or heating of a composite CMP1 product surface 102 exposed to gas GAS1 having a temperature $T_{GAS1}$ may be used to provide the surface 102 with micro contours G2 comprising negative surface deviation and second micro contours B1 comprising positive surface deviation. Advantageously, the enhanced micro contoured surface roughness may be obtained on a selected surface 101, 102 and by preserving the shape of the product. Further still, by providing heat only to a surface portion POR1, a part of the surface 101, 102 may be affected, while preserving the primary surface roughness on the rest of the product. The micro contours G2 comprising negative surface deviation may have a depth h2 and width w2. The micro contours B1 may have a height h1 and width w1. In particular, the surface 102 properties may be altered by providing heat HEAT2 only to the top surface layer 100*d*, for example with heated gas, such as air, having a temperature $T_{GAS1}$ higher than the melting point $T_m$ temperature of the matrix material MTX1 and softening said layer 100*d*, or by infrared radiation, thus providing micro contours G2, B1 on the product surface 102. Further, by heating only a surface layer 100*d*, the geometric shape of the composite CMP1 product 100 may be preserved. The method may comprise providing a composite CMP1 comprising matrix material MTX1 and organic natural fiber FIB1 based material having a primary surface layer 102 with a primary surface roughness, softening said primary surface layer 102 of said composite material by heating, providing a secondary surface layer 102 of said composite material surface with a secondary surface roughness and by cooling said softened surface layer. The cooled secondary layer 102 may comprise a higher surface roughness value $R_a$ or surface friction coefficient value. The primary surface roughness may be less than or equal to 90% of the secondary surface roughness. The roughness value may be determined form a surface before and after thermoforming, for example by using a profilometer, such as a laser scanning confocal microscope (LSCM) or by using an ink absorbency testing method. The primary surface layer 101 and the secondary surface layer 101 may further have different frictional properties, which may be determined for example by using a skid tester device. The surface 101 pressed against a workpiece surface 201 may comprise micro contours G2 comprising negative surface deviation and impression marks G1. However, the workpiece surface 201 may prevent the formation of micro contours B1 comprising positive surface deviation. The orientation in the FIGS. 11*a* and 11*b* has been selected such, that the direction of the melt flow $S_{FLV}$ is to direction $S_x$ away from the viewer, to illustrate the difference in height of the impression mark G1 and the micro contours G2.

Figure 12A:
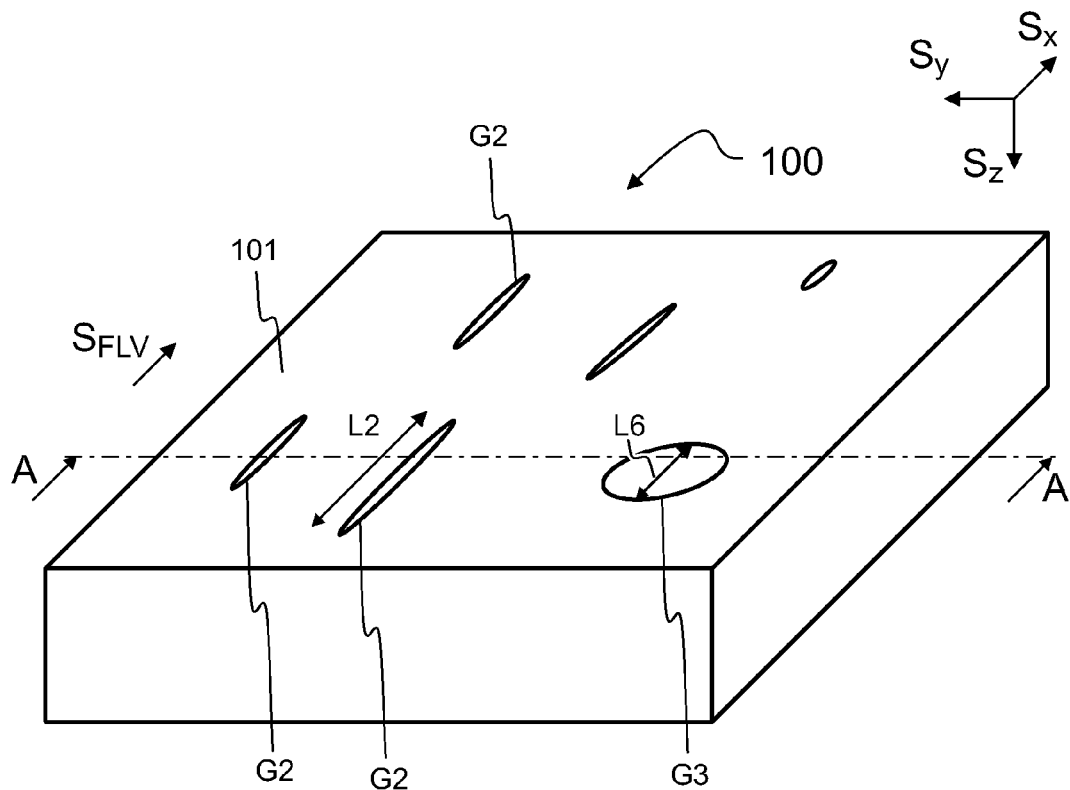
FIGS. 12a, 12b, 12c and 12d represents examples of the shapes of micro contours on a composite product.
Figure 12B:
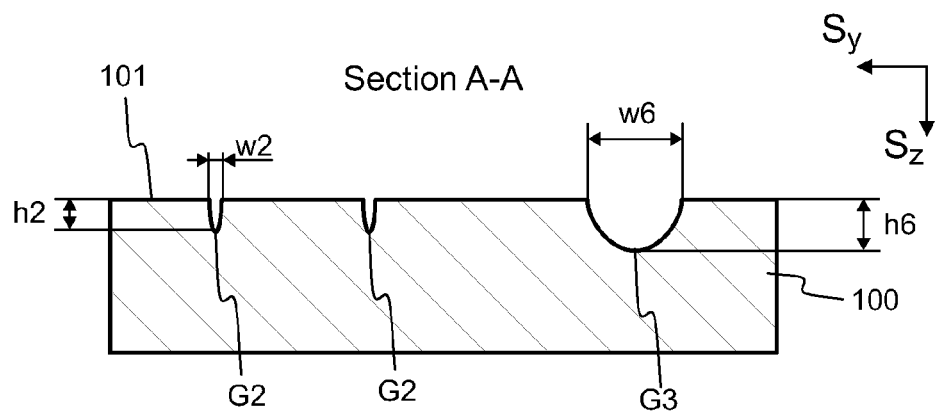
Figure 12C:
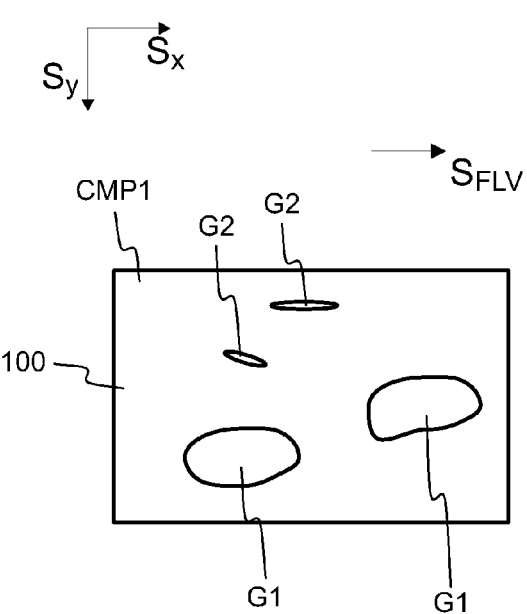
Figure 12D:
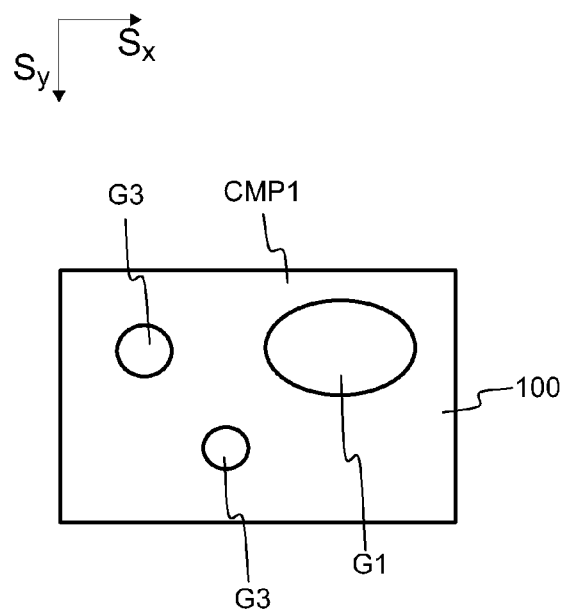

FIGS. 12*a*, 12*b*, 12*c* and 12*d* illustrate the shapes of micro contours G2, G3 on a composite CMP1 product 100. FIG. 12*a* shows a composite CMP1 product surface 101 comprising micro contours G2, G3. FIG. 12*b* shows a cross-dimensional section A-A of the composite CMP1 product 100. The micro contours G2, G3 may comprise various shapes depending of the manufacturing method of the product 100. For example, a method comprising extrusion or moulding of composite CMP1 melt may produce micro contours G2 having a depth h2, a width w2 and a length L2 and an elongated shape in the direction of the melt flow $S_{FLV}$. Alternatively, or in addition a method comprising thermoforming or heating of a composite CMP1 product 100 surface may produce micro contours G3 having a depth h6, a width w6 and a length L6. In general, the micro contours G2, G3 formed on the surface 101, 102 of a composite CMP1 product 100 may comprise an elongated or an elliptical shape where the longest dimension denotes the length L2, L6 of the micro contour G2, G3, and the width w2, w6 of the micro contour G2, G3 denotes the dimension perpendicular to the length L2, L6. In other words, the length L2, L6 of the micro contour G2, G3 may be larger than the width w2, w6. The shape of the micro contour G2, G3 may comprise irregularity.

The dimensions of micro contours G2, G3 may vary. The depth h2, h6 of the micro contour G2, G3 may be less than 40 µm, such as between 0.1 µm and 20 µm. Advantageously the depth h2, h6 of the micro contour G2, G3 may be equal to or less than 10 µm, such as between 0.1 µm and 10 µm.

The dimensions between micro contours G2, G3 on the surface 101 of the composite CMP1 product 100 may vary. For example, at least 10%, such as between 10% and 90% of the micro contours G2, G3 may have an width/height aspect ratio of at least 1 to 1 and/or an aspect ratio length/width of at least 1 to 1.

The micro contours G2, G3 may have an effect on the properties of the surface 101, 102 of the composite product 100. The micro contours G2, G3 may form crevices where a gaseous substance, such as air, may flow along the bottom of the micro contours G2, G3. This may be advantageous when the surface 101, 102 is touched. The micro contours G2, G3 may provide an increased specific surface area, which may, for example absorb moisture from a hand touching the surface 101, 102 such that the surface 101, 102 may have a more natural feeling when touched. In addition, the aspect ratio of the micro contours G2, G3 may change the surface tension of the surface 101, 102. By forming an uneven surface the surface tension may be increased, which may improve the spreading of a liquid on the surface 101, 102 of the composite CMP1 product 100.

The micro contoured surface layer provided on the composite CMP1 product contributes to the surface characteristics of the product. Particularly, the frictional properties of the product have been noticed to enhance. The frictional properties may benefit applications, where a product is used in contact with another product or a user. Many applications, where the composite CMP1 product may be exposed to moisture, for example water, may require that the product resists relative lateral motion of two solid surfaces in contact. This may be a safety feature, or it may enhance the functionality of the product. For example, when a handle or a surface retains a higher friction coefficient in a wet state, the gripping of the handle or stepping on a surface may reduce the risk of slipping. Furthermore, kinetic energy is converted to heat whenever motion with friction occurs, which combined with the micro contoured surface layer comprising micro contours G2 may contribute to a surface with a more natural sensation. For example, the user may experience the composite CMP1 product surface as a preferable option to other surfaces, such as surfaces comprising only plastic, for example.

Friction Measurement

The friction of a composite CMP1 product surface may be determined, for example by comparing the friction coefficient of the product surface. The friction coefficient may be a static or a kinetic friction coefficient. The properties of the composite surface may comprise different friction coefficient in different directions or in different states, such as in a wet or a dry state. The dry state refers to a state such as presented in the embodiment describing the moisture uptake from the atmosphere measured from the dry composite CMP1 products, where a sample of the composite CMP1 product from which the friction coefficient is determined, should be dried at temperature of 80° C. for 48 hours before the measurement. The wet state refers to said sample surface in a dry state sprayed with clean water, such as distilled water, to comprise moisture on the whole surface area being measured. The amount of water to be added for the measurement may be determined from the surface roughness of the composite CMP1.

When said composite (CMP1) surface (101) has a surface roughness Ra below 20 µm in a dry state, 30 g of water per square meter may be added on the surface.

When said composite (CMP1) surface (101) has a surface roughness Ra equal to or above 20 µm in a dry state, 120 g of water per square meter may be added on the surface.

Figure 13A:
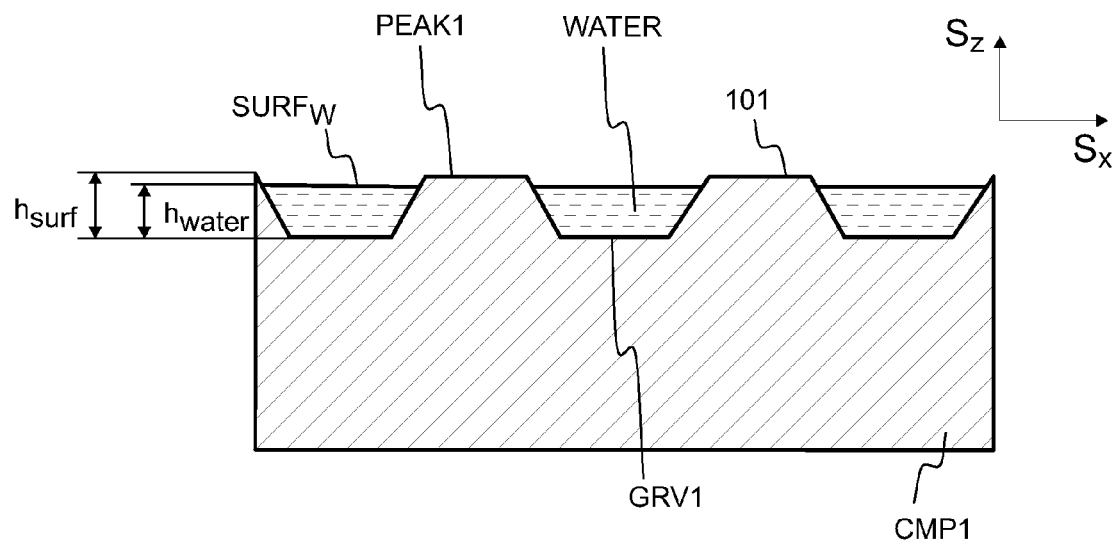
FIGS. 13a and 13b illustrate an example a surface of a composite product.
Figure 13B:
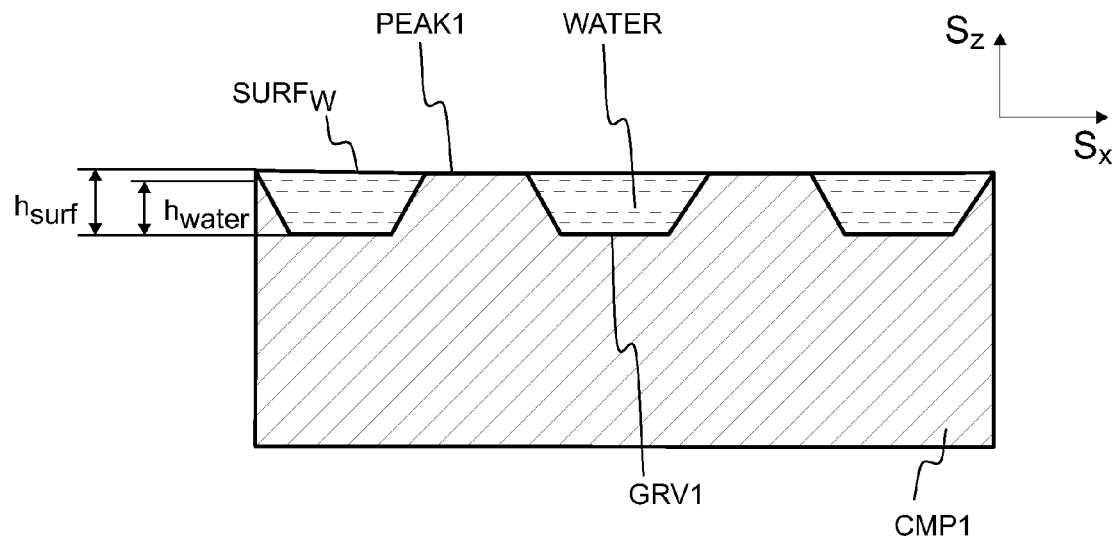

FIGS. 13a and 13b present a composite CMP1 provided with surface having grooves GRV1 and peaks PEAK1. An example of such composite CMP1 product is a decking board such as described in the Finnish patent application FI20115741. When the friction of such a composite CMP1 product surface is determined in a wet state, the amount of added water by spraying may be determined in relation to the difference in height $h_{surf}$ between the peaks PEAK1 and grooves GRV1. The height $h_{surf}$ between the peaks PEAK1 and grooves GRV1 may be equal to or more than of 0.5 mm, such as in the range of 0.5 mm to 2 mm. The amount of water WATER sprayed on the surface 101 of the composite CMP1 depends of the height $h_{surf}$. When the amount of water WATER is higher, the water surface (SURFW) level is closer to the top of the surface 101. When the water surface (SURFW) level has reached 90% of said height $h_{surf}$ the surface 101 is defined to be in a wet state. Therefore, when determining the kinetic friction coefficient in a wet and a dry state from a composite CMP1 surface 101 having a profile, the wet state refers to a state where water (WATER) has been sprayed on composite (CMP1) surface (101) comprising grooves (GRV1) having a height $h_{surf}$ of at least 0.5 mm such that the water surface (SURF$_W$) level in the grooves (GRV1) has reached 90% of said height $h_{surf}$.

The measurements to determine a kinetic friction coefficient may be performed for example on a Cooper Wessex Pendulum Skid Tester CRT-PENDULUM-SK1805 device. The composite CMP1 samples to be measured may preferably be at least 150×300×3.3 mm (length, width, thickness) plates, if available. Product surfaces comprising less area may be used for determining the kinetic friction coefficient, however, the samples should first be fastened to a support to enable the measurement. With Cooper Wessex Pendulum Skid Tester CRT-PENDULUM-SK1805 device kinetic friction is measured by measuring deceleration of a swinging arm comprising a rubber slider arranged to sweep the surface of the sample surface. Larger deceleration of the swinging arm correlates to a higher kinetic friction on the sample surface. The determination of the kinetic friction coefficient with the device may be performed as instructed in the user's manual (Cooper Wessex Pendulum Skid Tester CRT-PENDULUM-SK1805, Issue 1. 22.12.11). In addition, the following standard refers to determination of surface frictional properties: ASTM E303:93 Test Method for Measuring Surface Frictional Properties Using the British Pendulum Tester.

The kinetic friction coefficient values measured with the Cooper Wessex Pendulum Skid Tester CRT-PENDULUM-SK1805 device are given in the range of 0 or above, such that a higher value represents a higher kinetic friction. The value 0 represents a measurement, where the pendulum does not contact the surface of the sample surface during a sweep. Values above 0 and less than 25 represent surfaces having highest slip potential (lower kinetic friction), values in the range of 25 to 36 represent surfaces having a moderate slip potential and values above 36 represent surfaces having a lower slip potential (higher kinetic friction). The friction coefficient values of may be determined as an average of multiple measurements from a surface portion (POR1, POR2). This enables a numerical averaging of the measurement values and determination of a coefficient of variance. Further still, multiple measurements provide more information and may be used to enhance the representativeness of the measurement results.

For example, a composite CMP1 may be produced comprising matrix material MTX1 and organic natural fiber FIB1 based material,
the matrix material MTX1 comprising a thermoplastic polymer, and
a surface 101, 102 of said composite CMP1 having a reference kinetic friction coefficient value FR1, FR3, FR5, and
a surface 101, 102 of said composite CMP1 having a kinetic friction coefficient value FR2, FR4, FR6, wherein the reference kinetic friction coefficient value FR1, FR3, FR5, is different from the kinetic friction coefficient value FR2, FR4, FR6.

The composite CMP1 may comprise a first surface portion POR1 on a first composite CMP1 surface 101 having a first reference kinetic friction coefficient value FR1 in a dry state and a first kinetic friction coefficient value FR2 in a wet state. The composite CMP1 may further comprise a second reference kinetic friction coefficient value FR3 in a first direction parallel to the direction of the mass flow SFLV and a second kinetic friction coefficient value FR4 in a second direction perpendicular to the direction of the mass flow SFLV. The composite CMP1 may further comprise a first surface portion POR1 on a first surface 101 having a third reference kinetic friction coefficient value FR5 and a second surface portion POR2 on a second surface 102 having a third kinetic friction coefficient value FR6.

The first kinetic coefficient value FR2 may be different from the first reference kinetic friction coefficient value FR1. The first kinetic coefficient value FR2 may be for example in the range of 35% to 85%, preferably in the range of 40% to 80%, most preferably in the range of 45% to 75% of the first reference kinetic friction coefficient value FR1, The second reference kinetic friction coefficient value FR3 may be different from the second kinetic friction coefficient value FR4. The second reference kinetic friction coefficient value FR3 may be in the range of 35% to 95%, preferably in the range of 40% to 90%, most preferably in the range of 45% to 85% of the second kinetic friction coefficient value FR4.

The third reference kinetic coefficient value FR5 may be different from the third kinetic friction coefficient value FR6. The third kinetic coefficient value FR6 may be at least 5%, or preferably at least 10%, or more preferably at least 15% lower than the third reference kinetic friction coefficient value FR5. The third reference kinetic friction coefficient value FR5 may be in a direction parallel to the direction of the mass flow $S_{FLV}$. The third kinetic friction coefficient value FR6 may be in a direction parallel to the direction of the mass flow $S_{FLV}$. The third reference kinetic friction coefficient value FR5 may be in a direction perpendicular to the direction of the mass flow $S_{FLV}$. The third kinetic friction coefficient value FR6 may be in a direction perpendicular to the direction of the mass flow SFLV. The kinetic friction coefficient value FR2, FR4, FRF6 and the reference kinetic friction coefficient value FR1, FR3, FR5 may be averaged values.

In an example, kinetic friction coefficient was determined from a the surface of a first sample (sample 1), a second sample (sample 2), a third sample (sample 3), a fourth sample (sample 4), a fifth sample (sample 5) and a sixth sample (sample 6). The first sample was a polymer product comprising PLA polymer (poly(lactic acid)). The second sample was a composite CMP1 product comprising PLA polymer (poly(lactic acid)) as a matrix material MTX1 and 30 wt-% of organic natural fiber FIB1 based material. The third sample and the fifth sample were polymer product comprising PP polymer (polypropylene). The fourth sample and the sixth sample were composite CMP1 product comprising PP polymer (polypropylene) as a matrix material MTX1 and 40 wt-% of organic natural fiber FIB1 based material. All of the samples were measured in a dry state and in a wet state on separate measurements. Measurements for all of the samples were repeated, such that all of the samples were measured multiple times in a dry state and in a wet state. When repeating the measurements, the same surface portion POR1 was used for determining the kinetic friction coefficient. The samples were injection moulded samples. The results of the measurements are shown in table 10 below.

TABLE 10

Example measurement results of kinetic friction coefficient values.

| state | measurement | PLA sample 1 | PLA + 30 sample 2 | PP sample 3 | PP40 sample 4 | PP sample 5 | PP40 sample 6 |
|---|---|---|---|---|---|---|---|
| Dry | 1 | 65 | 62 | 70 | 70 | 66 | 68 |
| Dry | 2 | 63 | 62 | 68 | 66 | 68 | 66 |
| Dry | 3 | 63 | 64 | 67 | 63 | 69 | 62 |
| Dry | 4 | 64 | 62 | 66 | 62 | 70 | 60 |
| Dry | 5 | 64 | 64 | 66 | 62 | 70 | 60 |
| Dry | 6 | 64 | | 65 | 62 | 71 | 58 |
| Dry | 7 | | 71 | 65 | 61 | 70 | 58 |
| Dry | 8 | 58 | 71 | 64 | 59 | 72 | 57 |
| Dry | 9 | 57 | 71 | 64 | 61 | 70 | 58 |
| Dry | 10 | 58 | 70 | | | | |
| Dry | 11 | | 71 | | | | |
| Wet | 12 | 23 | 34 | 22 | 34 | 21 | 32 |
| Wet | 13 | 20 | 34 | 20 | 31 | 16 | 30 |
| Wet | 14 | 18 | 34 | 17 | 32 | 16 | 30 |
| Wet | 15 | | | 18 | 32 | 21 | 29 |
| Wet | 16 | | | 18 | 32 | 19 | 27 |
| Wet | 17 | | | 18 | 31 | 13 | 28 |
| Wet | 18 | | | 16 | 30 | 14 | |
| Wet | 19 | | | 18 | 33 | 15 | |
| Wet | 20 | | | | 31 | 12 | |

The example results show that a kinetic friction decreases less on a composite CMP1 surface comprising micro contoured surface layer, than on a pure polymer surface. The technical effect of a friction maintained in a wet state is, that on composite product surfaces in contact with moisture, such as in kitchen utensil or working tool handles, cutting boards or decking boards, the contact or grip to the composite surface is better maintained when said composite surface is in a wet state. For example, a decking board comprising a composite CMP1 having a first kinetic friction coefficient value FR1 in a dry state and a second kinetic friction coefficient value FR2 in a wet state, wherein the second kinetic coefficient value FR2 is in the range of 35% to 85%, preferably in the range of 40% to 80%, most preferably in the range of 45% to 75% of the first kinetic friction coefficient value FR1 functions to prevent slipping when the surface is in a wet state. Furthermore, the use of a composite comprising organic natural fiber FIB1 material, such as cellulose, is generally recognized as safe. Therefore, such materials may be used on kitchen utensils in contact with food or other consumer products.

Gloss Measurement

Surface gloss value, and in particular an averaged surface gloss value may be used to determine the level of micro contoured surface layer on a composite CMP1 surface. The amount of organic natural fiber FIB1 based material in the composite CMP1 material may have an effect of the micro contoured surface layer of the composite surface 101, 102 layers. In particular, the specific surface layer texture may be controlled by selecting the amount of organic natural fiber FIB1 based material in the composite CMP1. Furthermore, the selection of the manufacturing method(s) may be used to control the micro contoured surface layer on the composite surface 101, 102. In general, a higher amount of organic natural fiber FIB1 based material in a composite CMP1 correlates to a reduced surface 101, 102 gloss.

In an example, the surface gloss is measured using according to ISO standard 2813:1994, which may be used for a determination of specular gloss at 20 degrees, 60 degrees and 85 degrees. Composite CMP1 surface gloss properties may be measured using the said standard. A suitable apparatus for the measurement is for example a Elcometer 406 gloss meter device. The sample surface 101, 102 area to be measured may be an composite CMP1 product having a surface 101, 102 area according to the ISO standard 2813:1994. While the standard refers to a product having a thickness of at least 3 mm and dimensions of at least 150 mm×100 mm, on composite CMP1 samples objects having a thickness of at least 50 micrometers and dimensions of at least 10 mm×10 mm may be measured. The testing method presented in the standard ISO standard 2813:1994 may be modified such that the width of the illuminated area is essentially less than 10 mm, for example less than 1 mm. The measurements may be performed on multiple adjacent surface portions (POR1, POR2, POR3, POR4, POR5) and the measurement values may be numerically averaged to obtain a spatially averaged measurement value representing a value of a planar surface portion having a width of 10 mm. Such modified testing method may be used in situations where a planar measurement is not available, such as on surfaces comprising curvature. Furthermore, while the standard ISO 2813:1994 refers to a single measurement from a planar surface structure having an illuminated area of at least 10 mm, this may be implemented on composite CMP1 samples having surface curvature by providing multiple measurements from multiple surface portions (POR1, POR2, POR3, POR4, POR5) on a composite CMP1 surface 101, 102, such as one, two, three, four or preferably five or more non-overlapping surface portions (POR1, POR2, POR3, POR4, POR5) at a distance from each other. Preferably the distance is less than the width of the illuminated area. The number and position of the surface portions (POR1, POR2, POR3, POR4, POR5) may be selected based on the shape of the article, for example by using corners and center of the product surface 101, 102. Use of multiple surface portions (POR1, POR2, POR3, POR4, POR5) enables a numerical averaging of the measurement values and determination of a coefficient of variance, which provides the averaging over whole surface as referred to in the standard. Further still, multiple measurements provide more information and may be used to enhance the representativeness of the measurement results. When the measurement from different surface portions (POR1, POR2, POR3, POR4, POR5) on surface is not possible, multiple, preferably five, different samples from the same material may be measured. Prior to measuring of surface gloss the measuring device may be calibrated by determining a reference surface 101, 102 and defining a zero angle for the reference surface 101, 102. The zero angle refers to an angle substantially parallel with the surface 101, 102 normal, as referred to in the standard and/or device. By substantially parallel it is meant that the deviation from parallelism is less than 0.2°, preferably within 0.1°. The gloss measurements are made with angles deviating by either 60°±0.1°, 85°±0.1° or 20°±0.1° from the zero angle. According to the ISO standard 2813:1994, To define the specular-gloss scale, polished black glass with a refractive index of 1,567 is assigned the value of 100 for geometries of 20°, 60° and 85°. If the measurement made at 60° is greater than 70 gloss value, the measurement angle should be changed to 20° to optimize measurement accuracy. If the measurement made at 60° is smaller than 10 gloss value, the measurement angle should be changed to 85°. When the average gloss value is under 70, the measurement is performed using the angle of 60°. When the average gloss value is equal to or over 70, the measurement is performed using the angle of 20°. Gloss values are given in the range of 0 to 100, where the value 0 represents no detectable gloss, and the value 100 represents maximum detectable gloss according to the ISO standard 2813:1994. It should be noted, that the gloss values are measured from composite CMP1 surfaces 101,102 comprising surface roughness Ra. When comparing two values, the roughness Ra value of each surface 101, 102 should be on the same range, for example comprise the same spark surface level value.

In an example, the surface gloss was measured from composite CMP1 products according to the invention comprising polypropylene (PP) as matrix material MTX1 and organic natural fiber FIB1 based material in the range of 20 wt-%, 30 wt-%, 40 wt-%, and 50 wt-%. The surface gloss was further measured from products comprising polypropylene (PP), polypropylene (PP) and glass fibre (GF) either 20 wt-% or 30-wt-%, and from a product comprising polypropylene and 20 wt-% of talc. The surface gloss was measured from five different samples, from first and second end in each sample. In injection moulding, the first end refers to the end filled first in injection moulding, whereas the second end refers to the end filled last in injection moulding. The measured values show that composite CMP1 products comprising higher organic natural fiber FIB1 based material content have less surface gloss than composite CMP1 products comprising less organic natural fiber FIB1 based material. Furthermore, the presence of organic natural fiber FIB1 based material content according to the invention resulted to a gloss value lower than the gloss value of a product comprising only the polypropylene matrix material or a product comprising the polypropylene matrix material and glass fibre or talc. Variation between the gloss values measured from the first end and the second end did exist, with composite CMP1 products according to the invention comprising polypropylene (PP) as matrix material MTX1 and organic natural fiber FIB1 based material in the range of 20 wt-%, 30 wt-%, 40 wt-%, and 50 wt-% having a tendency to a smaller value in the second end. The same phenomenon was not present in the samples comprising polypropylene and glass fibre. The measured samples were manufactured according to the standard ISO 527-2 with 20×30 mm flat endings, said samples generally referred to as "dog bone test samples". The results of the example are given below in Table 11.

TABLE 11

Examples from surface gloss measurements from injection moulded products composite CMP1 products and polymer products.

| Product | Sample | First end | Second end |
|---|---|---|---|
| PP + 20 wt-% FIB1 | 1 | 16.1 | 16.4 |
|  | 2 | 16.3 | 15.8 |
|  | 3 | 15.7 | 14.8 |
|  | 4 | 19.5 | 17.7 |
|  | 5 |  |  |
|  | average | 16.9 | 16.2 |
| PP + 30 wt-% FIB1 | 1 | 12.8 | 11.5 |
|  | 2 | 14 | 10.8 |
|  | 3 | 11.2 | 9.6 |
|  | 4 | 15.1 | 10.9 |
|  | 5 | 11.2 | 11.1 |
|  | average | 12.9 | 10.8 |
| PP + 40 wt-% FIB1 | 1 | 11.3 | 10.2 |
|  | 2 | 8.7 | 10.2 |
|  | 3 | 9.7 | 9.5 |
|  | 4 | 10.3 | 11.4 |
|  | 5 | 12.5 | 8.8 |
|  | average | 10.5 | 10 |
| PP + 50 wt-% FIB1 | 1 | 9.4 | 6.6 |
|  | 2 | 9.3 | 5.5 |
|  | 3 | 7.7 | 7.1 |
|  | 4 | 8.3 | 6.6 |
|  | 5 | 7.6 | 5.9 |
|  | average | 8.4 | 6.3 |
| PP | 1 | 23.6 | 23.7 |
|  | 2 | 21.2 | 18.4 |
|  | 3 | 19.2 | 19.8 |
|  | 4 | 22.9 | 19.2 |
|  | 5 | 21.5 | 18.5 |
|  | average | 21.7 | 19.9 |
| PP + 20 wt-% GF | 1 | 31.6 | 32.1 |
|  | 2 | 30 | 31.5 |
|  | 3 | 30.4 | 32 |
|  | 4 | 24.9 | 31 |
|  | 5 | 25.3 | 32.8 |
|  | average | 28.5 | 31.9 |
| PP + 30 wt-% GF | 1 | 30.4 | 44.3 |
|  | 2 | 34.2 | 45 |
|  | 3 | 32.6 | 42.8 |
|  | 4 | 23.1 | 34.2 |
|  | 5 | 33.3 | 39.1 |
|  | average | 30.7 | 41.08 |
| PP + 20 wt-% Talc | 1 | 27 | 30 |
|  | 2 | 36.3 | 32.2 |
|  | 3 | 26.3 | 24.3 |
|  | 4 | 26.1 | 26.9 |
|  | 5 | 34.1 | 30.2 |
|  | average | 29.96 | 28.7 |

The averaged gloss values measured from a surface portion POR1 on the injection moulded composite CMP1 with respect to the same direction as the injected mass flow was higher than the gloss value measured from the same surface portion POR1 with respect to the direction perpendicular to the injected mass flow. According to the embodiment, the averaged gloss value of the composite CMP1 products comprising organic natural fiber FIB1 based material may be in the range of 0.1 to 19.5, more preferably in the range of 1 to 16.5, most preferably in the range of 6 to 15.5.

Therefore, a composite CMP1 comprising thermoplastic polymer matrix material MTX1 and organic natural fiber FIB1 based material may have a first averaged gloss value GV1 from a first group of non-overlapping surface portions POR1, POR2, POR3, POR4, POR5 on a surface 101, 102 of said composite CMP1 which is different from a second averaged gloss value GV2 from a second group of non-overlapping surface portions PORE, POR7, POR8, POR9, POR10 on a surface 101, 102 of said composite CMP1.

In another example, the surface gloss was measured from extruded composite CMP1 products according to the invention comprising high density polyethylene (HDPE) as matrix material MTX1 and organic natural fiber FIB1 based material in the range of 20 wt-%. The products were coloured either black or white. The composite products were in the form of sheets, each sheet having a thickness of 4 mm in the direction $S_z$. The gloss was measured both from the first surface 101 and the second surface 102. From each surface 101, 102 the gloss was measured to a first direction parallel to the extrusion direction and to a second direction perpendicular to the extrusion direction. The surface gloss was measured from five different surface portions (POR1, POR2, POR3, POR4, POR5) in each sample, representing the corners and the center of the sample. The measured gloss on second surface 102 of the composite CMP1 sheet was lower than the measured gloss on first surface 101 of the composite CMP1 sheet. Furthermore, the measured gloss on first surface 101 of the composite CMP1 sheet to the first direction parallel to the extrusion direction was higher than the measured gloss on first surface 101 of the composite CMP1 sheet to the second direction perpendicular to the extrusion direction. The results of the example are given below in Table 12.

TABLE 12

Examples from surface gloss measurements from extruded sheets.

| Sample | measurement | surface 101, dir. Parallel | surface 101, dir. Perpend | surface 102, dir. Parallel | surface 102, dir. Perpend |
|---|---|---|---|---|---|
| HDPE + 20 wt-% FIB1, Black | 1 | 26.7 | 24.6 | 4.8 | 5 |
|  | 2 | 26.8 | 24.2 | 5.8 | 5.9 |
|  | 3 | 26 | 24.5 | 5 | 4.9 |
|  | 4 | 25.5 | 22.9 | 5.1 | 4.5 |
|  | 5 | 25.8 | 21.8 | 5.4 | 5.3 |
| Average |  | 26.2 | 23.6 | 5.2 | 5.1 |
| HDPE + 20 wt-% FIB1, White | 1 | 23.5 | 19.8 | 4 | 3.9 |
|  | 2 | 21.5 | 18.8 | 2.9 | 3 |
|  | 3 | 21.7 | 19 | 3.4 | 3.4 |
|  | 4 | 23.4 | 20.3 | 3.6 | 3.7 |
|  | 5 | 22.8 | 18.9 | 2.7 | 2.6 |
| Average |  | 22.6 | 19.3 | 3.3 | 3.3 |

According to the embodiment, the averaged gloss value of the composite CMP1 product may be preferably at least 10, more preferably at least 13 and most preferably at least 15.

In the above mentioned examples, CMP1 products made either by injection moulded or by extruded, the gloss value GV3 measured from a surface portion with respect to the direction of the mass flow $S_{FLV}$ was higher than the gloss value GV4 measured from the same spot with respect to the direction perpendicular to the direction of the mass flow $S_{FLV}$. The relative percentage difference between GV3 and GV4 may be presented by equation 1:

$$[(GV3-GV4)/GV3]*100\%  \quad \text{Equation 1}$$

In some embodiments, the relative percentage difference was at least 2%, and it was least 3% in some preferred embodiments, and it was at least 5% in some more preferred embodiments. In some embodiments, the relative percentage difference was less than 50%, and it was less than 35% in some preferred embodiments, and it was less than 20% in some more preferred embodiments. In some embodiments, the relative percentage difference was between 2%-50%, and it was between 3%-35% in some preferred embodiments, and it was between 5%-20% in some more preferred embodiments.

A surface may be provided to comprise a desired level of micro contouring to select the gloss properties of the surface (101, 102 A composite CMP1 comprising matrix material MTX1 and organic natural fiber FIB1 based material, the matrix material MTX1 comprising a thermoplastic polymer may comprise a surface layer 101, 102 with a gloss value on a given surface roughness as below:

- an averaged gloss value in the range of 20 to 17, when the surface roughness level of said surface layer 101, 102 is in the range of 0.5 to 2.5,
- an averaged gloss value in the range of 17 to 14, when the surface roughness level of said surface layer 101, 102 is in the range of 1.0 to 3.5,
- an averaged gloss value in the range of 14 to 11, when the surface roughness level of said surface layer 101, 102 is in the range of 2.0 to 4.5,
- an averaged gloss value in the range of 11 to 8, when the surface roughness level of said surface layer 101, 102 is in the range of 3.0 to 5.5,
- an averaged gloss value in the range of 8 to 5, when the surface roughness level of said surface layer 101, 102 is in the range of 4 to 6.5.

Alternatively, the composite may comprise a surface layer 101, 102 with a gloss value on a given surface roughness as below:

- an averaged gloss value in the range of 20 to 17, when the surface roughness level of said surface layer 101, 102 is in the range of 0.5 to 1.5,
- an averaged gloss value in the range of 17 to 14, when the surface roughness level of said surface layer 101, 102 is in the range of 1.0 to 2.5,
- an averaged gloss value in the range of 14 to 11, when the surface roughness level of said surface layer 101, 102 is in the range of 2.0 to 3.5,
- an averaged gloss value in the range of 11 to 8, when the surface roughness level of said surface layer 101, 102 is in the range of 3.0 to 4.5,
- an averaged gloss value in the range of 8 to 5, when the surface roughness level of said surface layer 101, 102 is in the range of 4 to 5.5.

Figure 14A:
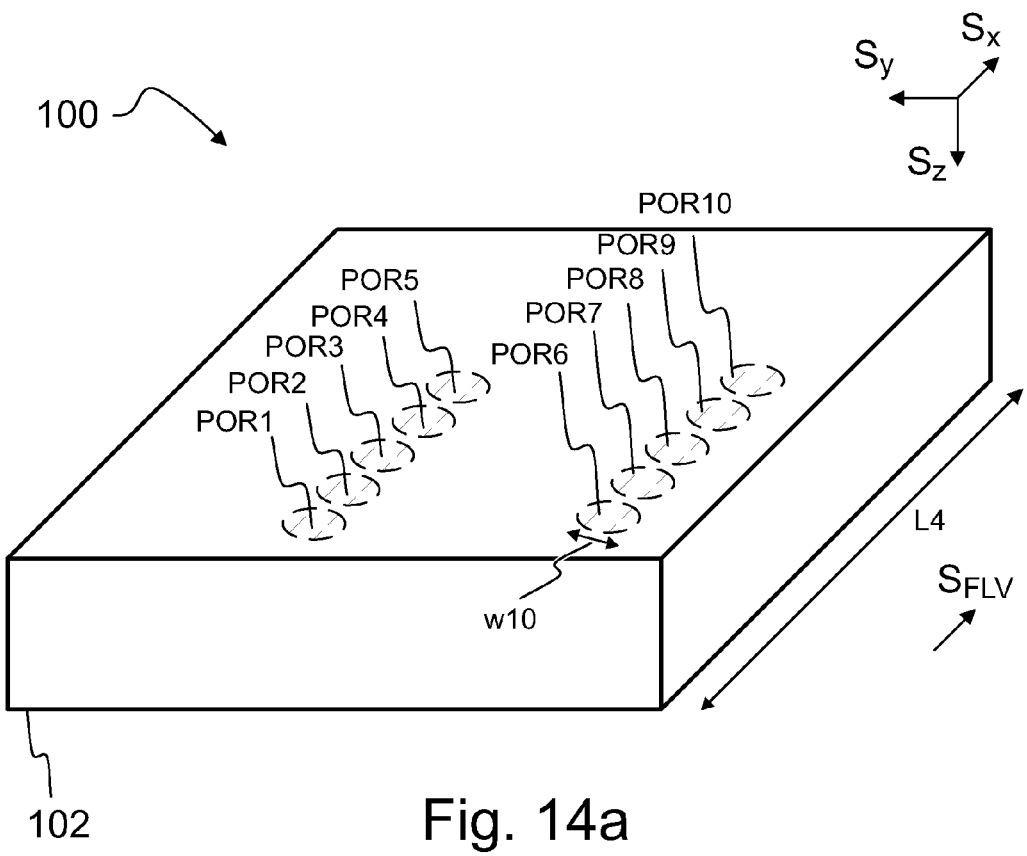
FIGS. 14a, 14b, 14c, 14d, 14e, 14f and 14g illustrate examples of surface portions on a surface of one or more composite products.
Figure 14B:
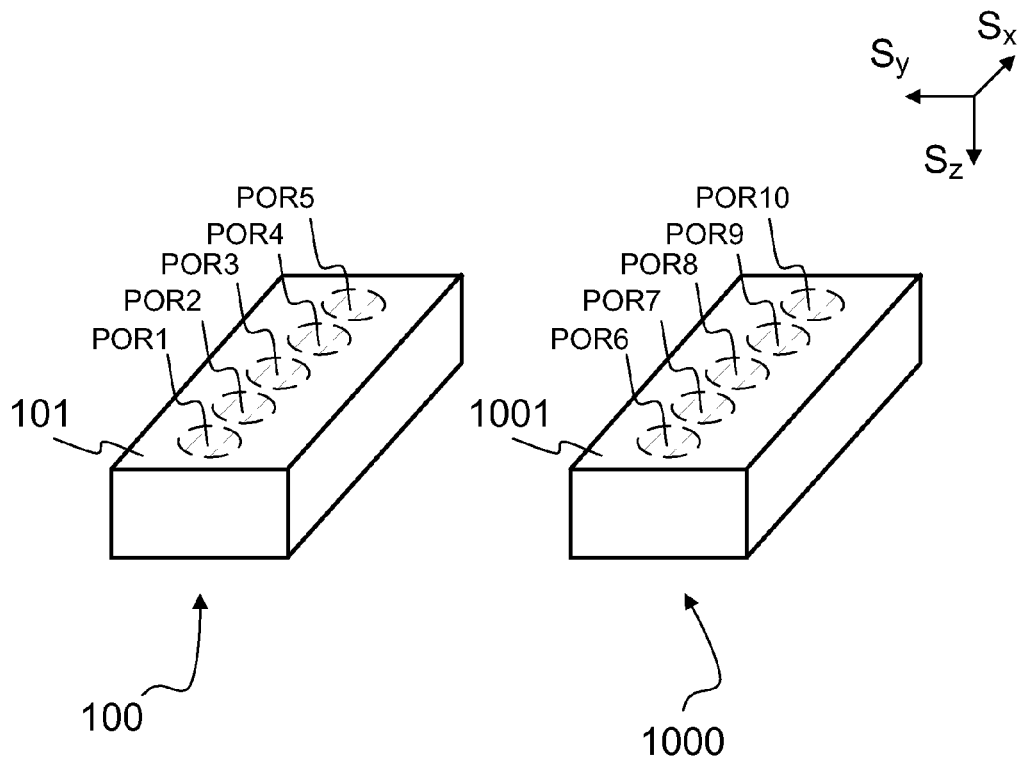
Figure 14C:
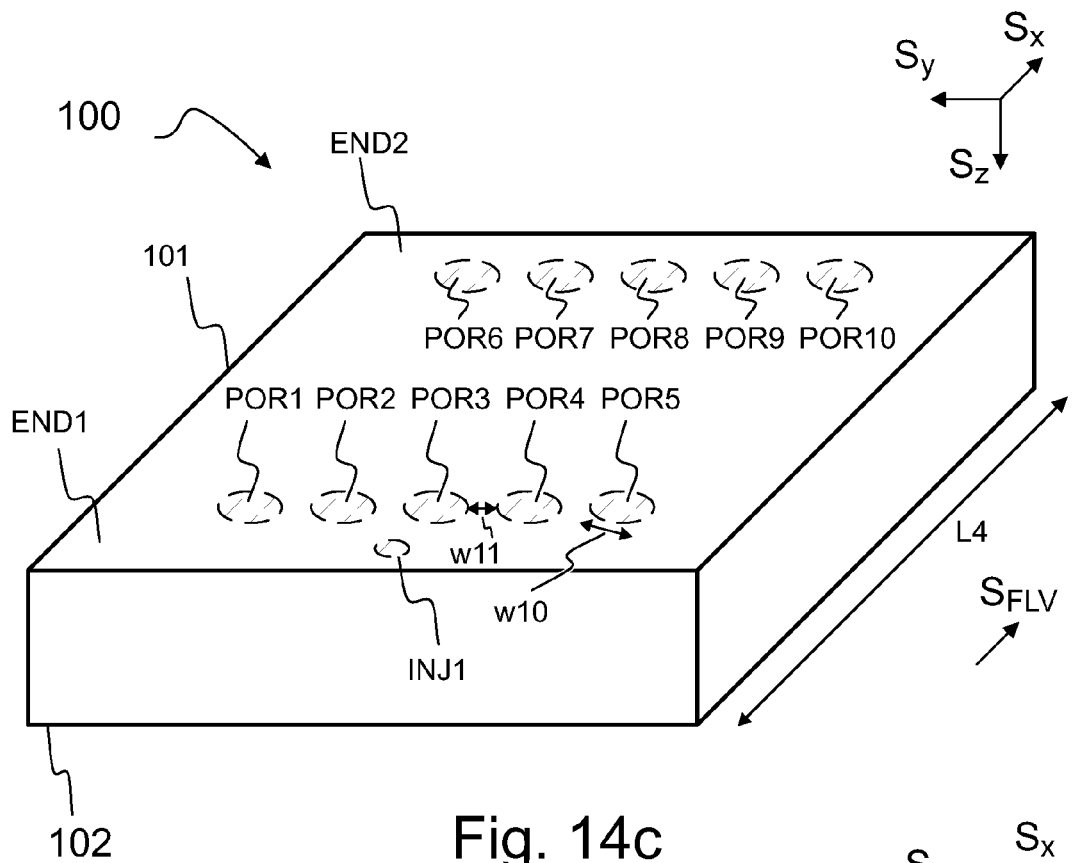
Figure 14D:
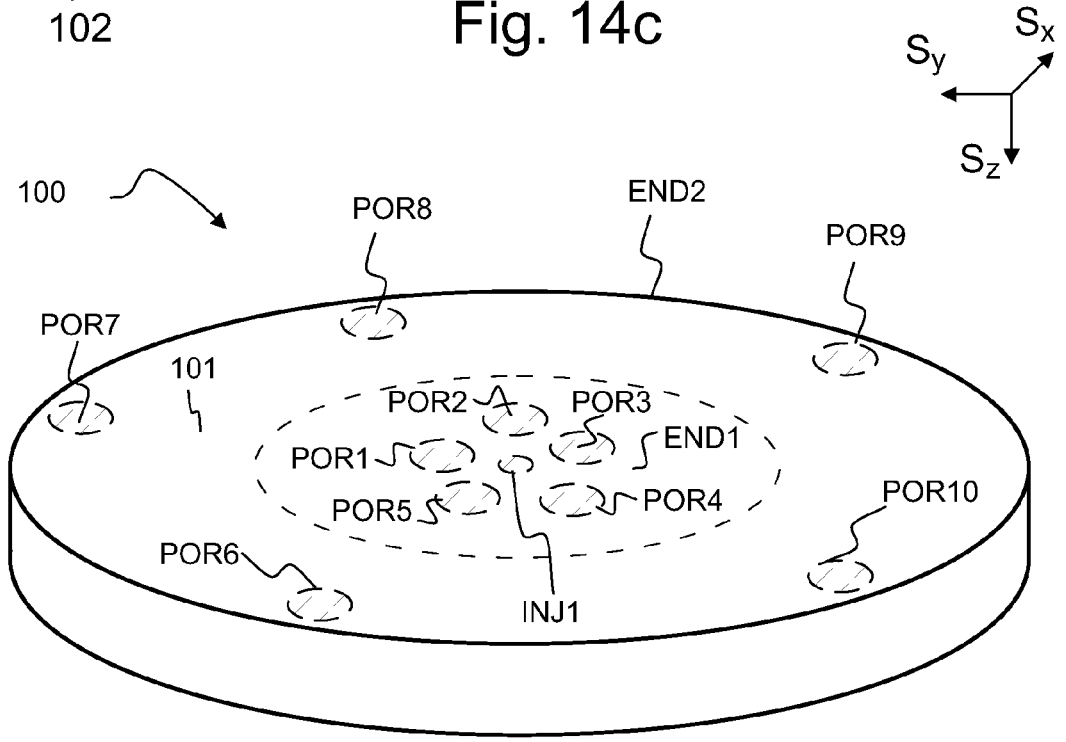
Figure 14E:
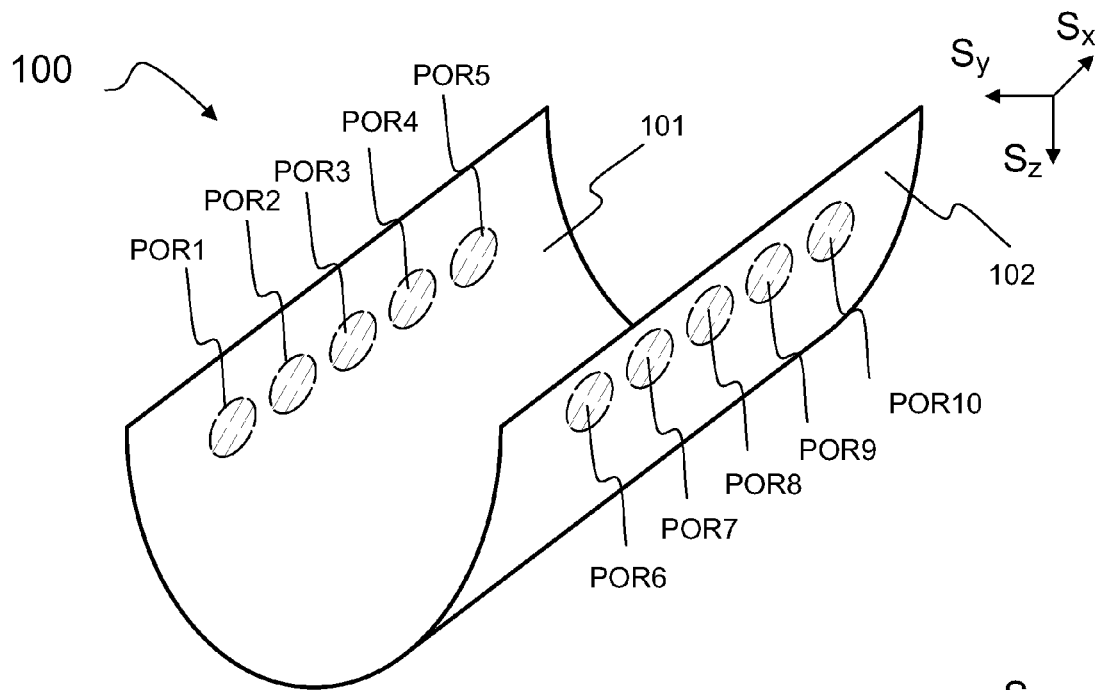
Figure 14F:
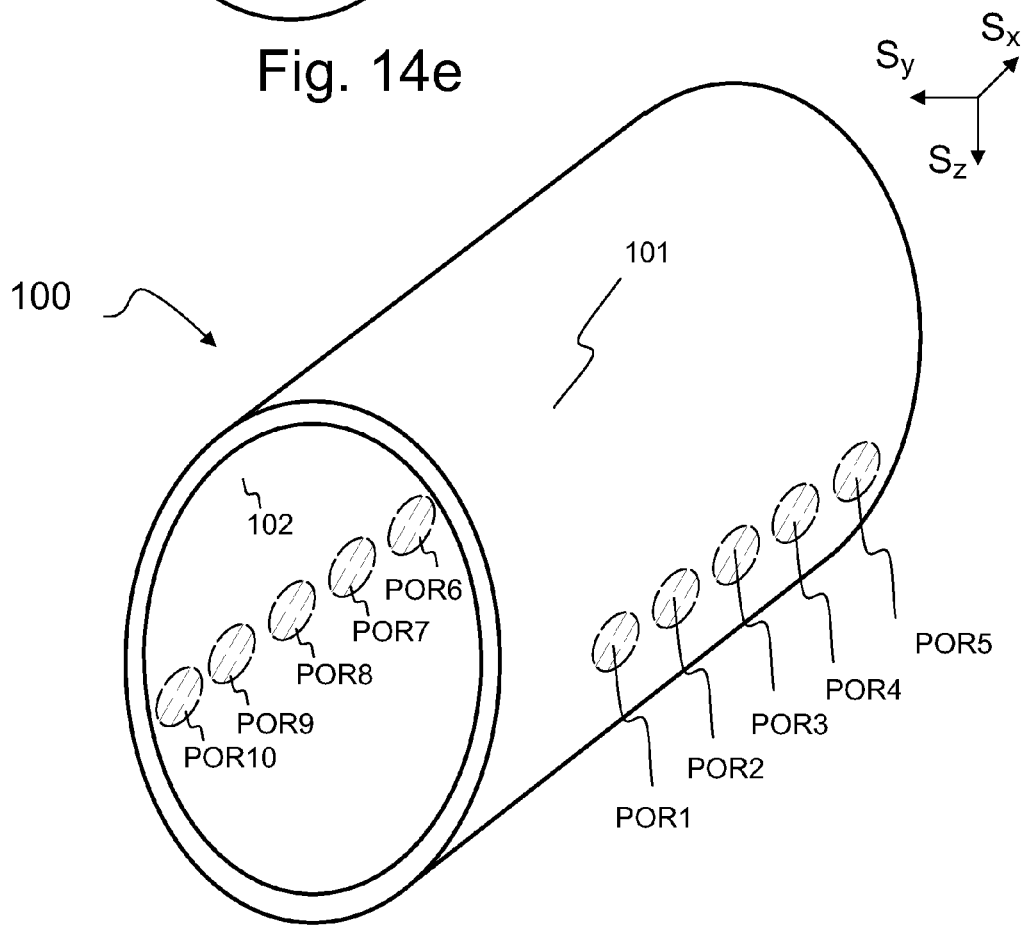
Figure 14G:
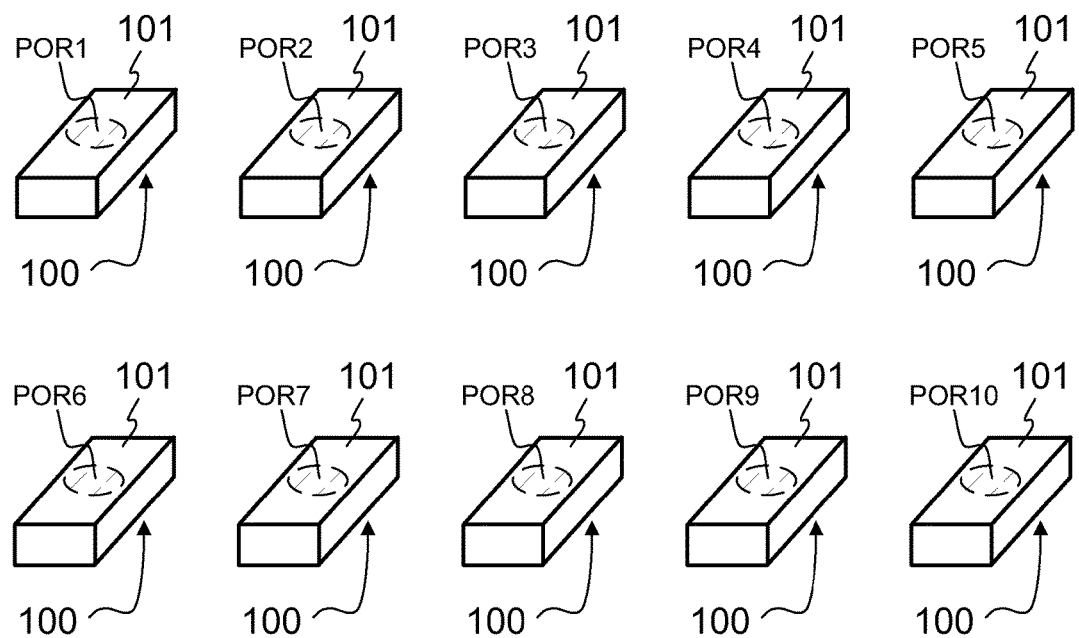
Figure 14G:
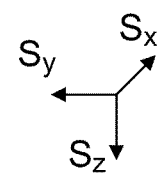

FIG. 14a shows an example of product 100 having capability to comprise surface portions POR1, POR2, POR3, POR4, POR5, POR6, POR7, POR8, POR9, POR10, where five or more non-overlapping surface portions POR1, POR2, POR3, POR4, POR5, POR6, POR7, POR8, POR9, POR10 are at a distance from each other. Each portion has a width w10. The distance between two adjacent surface portions may be less than surface portion width w10. FIG. 14b shows an example of a product 100 and having capability to comprise surface portions POR1, POR2, POR3, POR4, POR5, and a product 1001 having capability to comprise surface portions POR6, POR7, POR8, POR9, POR10, where on each product five or more non-overlapping surface portions are at a distance from each other. FIG. 14a is an illustration of the principle for measuring non-overlapping surface portions from a product 100 surface 101, 102, where there may be ten or more, such as fifteen or more non-overlapping surface portions POR1, POR2, POR3, POR4, POR5, POR6, POR7, POR8, POR9, POR10, POR11, POR12, POR13, POR14, POR15. From each surface portion POR1, POR2, POR3, POR4, POR5, POR6, POR7, POR8, POR9, POR10, POR11, POR12, POR13, POR14, POR15 the measurement, such as a friction coefficient measurement or a gloss measurement or an ink absorption measurement, may be performed in a certain state or between two states. The states may refer to direction, such as the direction of the mass flow $S_{FLV}$ and/or in a direction perpendicular to it. The states may further refer to state before and after a treatment of a surface, such as spraying a dry surface with water to obtain a wet surface, or staining an unstained surface with ink to obtain a stained surface. Therefore, multiple measurements in different states may be performed from each surface portion POR1, POR2, POR3, POR4, POR5, POR6, POR7, POR8, POR9, POR10, POR11, POR12, POR13, POR14, POR15. Each surface portion POR1, POR2, POR3, POR4, POR5, POR6, POR7, POR8, POR9, POR10, POR11, POR12, POR13, POR14, POR15 may further provide different measurement values, when different method, such as determination of friction or gloss or colour difference or colour variation, and/or state is used. Similarly, FIG. 14b is an illustration of the principle for measuring non-overlapping surface portions from two or more self-similar products 100, 100 having a surface 101, 1001, where there may be ten or more, such as fifteen or more non-overlapping surface portions POR1, POR2, POR3, POR4, POR5, POR6, POR7, POR8, POR9, POR10, POR11, POR12, POR13, POR14, POR15. A measurement, such as a friction coefficient measurement or a gloss measurement or an ink absorption measurement, may be performed from each non-overlapping surface portion POR1, POR2, POR3, POR4, POR5, POR6, POR7, POR8, POR9, POR10, POR11, POR12, POR13, POR14, POR15 on each product surface 101, 100. The measurements may be in a certain direction, such as the direction of the mass flow $S_{FLV}$ and/or in a direction perpendicular to it. As shown in FIG. 14c, on a composite CMP1 product 100 having a surface 101, a first group of surface portions POR1, POR2, POR3, POR4, POR5 may be at the first end END1 closer to the injection point INJ1 than a second group of surface portions POR6, POR7, POR8, POR9, POR10. Each of the surface portions POR1, POR2, POR3, POR4, POR5, POR6, POR7, POR8, POR9, POR10 in a group may be separated by a distance w11. Preferably, adjacent non-overlapping surface portions (POR1, POR2, POR3, POR4, POR5, POR6, POR7, POR8, POR9, POR10) in a group are separated by at least the distance w11 from each other. The distance between two groups of surface portions, such as the first group and the second group, may be different from the distance w11 between two adjacent surface portions in a group. The distance between two groups of surface portions may depend of the length L4 of the product 100, and is preferably less than the length L4 of said product 100. The END1 may be formed first by the melted composite CMP1 introduced at a velocity v1 in the direction of the melt flow $S_{FLV}$. FIG. 14d shows an example of a product 100, wherein the injection point INJ1 has been in the central portion of a workpiece 200. The composite CMP1 material in general propagates radially in the workpiece 200, such that the central portion of the workpiece 200 is filled first, forming the first end END1 of a composite CMP1 product, and the peripheral surface 201 of the workpiece 200 is filled last. The workpiece surface 201 may thus form the peripheral boundary of the composite CMP1 product 100 farthest from the injection point INJ1, referred to as the second end END2 of a composite CMP1 product. Therefore, on such products the first group of surface portions POR1, POR2, POR3, POR4, POR5 may be in the central parts of the surface 101 near or around the injection point INJ1, and the second group of surface portions POR6, POR7, POR8, POR9, POR10 may be near or around the peripheral boundary of the composite CMP1 on the same surface 101 as the first group of surface portions POR1, POR2, POR3, POR4, POR5. FIG. 14e shows an example of a CMP1 product 100 and having capability to comprise surface portions POR1, POR2, POR3, POR4, POR5, on the first surface 101 and portions POR6, POR7, POR8, POR9, POR10 on the second surface 102, where on each product five or more non-overlapping surface portions are at a distance from each other. This portion configuration is especially suitable for films or plates or sheet and for thermoformed products 100 made out of films or plates or sheets. FIG. 14f shows an example of a CMP1 product 100 and having capability to comprise surface portions POR1, POR2, POR3, POR4, POR5, on first surface 101 of the product 100 which is an exterior side and portions POR6, POR7, POR8, POR9, POR10 on the second surface 102 which is the interior side of the product 100, wherein on each surface 101, 102 five or more non-overlapping surface portions POR1, POR2, POR3, POR4, POR5, POR6, POR7, POR8, POR9, POR10 are at a distance from each other. FIG. 14f is an illustration, which may represent a whole composite CMP1 product 100 or a part of a composite CMP1 product 100. This surface portion POR1, POR2, POR3, POR4, POR5, POR6, POR7, POR8, POR9, POR10 configuration is especially suitable for an extruded product 100 or a rotation molded product 100, in particular for a product 100 having a hollow interior. For the extruded hollow product or for the rotation molded product, the surface portions POR1, POR2, POR3, POR4, POR5 may be on the outer surface 101 of the composite product 100 and the portions POR6, POR7, POR8, POR9, POR10 may be on the inner surface 102 of the CMP1 product 100. FIG. 14g shows an example of multiple composite CMP1 products 100. The composite CMP1 products 100 may be self-similar to each other and form a group of composite CMP1 products. Each composite CMP1 products 100 in a group may comprise a surface portion POR1, POR2, POR3, POR4, POR5, POR6, POR7, POR8, POR9, POR10 such that a single surface portion POR1, POR2, POR3, POR4, POR5, POR6, POR7, POR8, POR9, POR10 is on each composite CMP1 product 100. For example, in a group of ten self-similar composite CMP1 products, the first composite product 100 may comprise the surface portion POR1, the second composite product 100 may comprise the second surface portion POR2, the second composite product 100 may comprise the second surface portion POR2, the second composite product 100 may comprise the second surface portion POR2, the third composite product 100 may comprise the third surface portion POR3, the fourth composite product 100 may comprise the fourth surface portion POR4, the fifth composite product 100 may comprise the fifth surface portion POR5, the sixth composite product 100 may comprise the sixth surface portion POR6, the seventh composite product 100 may comprise the seventh surface portion POR7, the eight composite product 100 may comprise the eight surface portion POR8, the ninth composite product 100 may comprise the ninth surface portion POR9 and the tenth composite product 100 may comprise the tenth surface portion POR10 on a surface 101. In particular, the location of the surface portion POR1, POR2, POR3, POR4, POR5, POR6, POR7, POR8, POR9, POR10, on the surface 101 of each composite CMP1 product 100 should be essentially identical. By essentially identical it is meant that on a group of self-similar 100 composite CMP1 products 100 said surfaces 101 on each of the products 100 comprise the same surface area and dimensions, and the surface portion POR1, POR2, POR3, POR4, POR5, POR6, POR7, POR8, POR9, POR10 position is the same on every composite product 100. A measurements may be performed such that, for example from a group of ten self-similar composite CMP1 products 100, each comprising a single surface portion POR1, POR2, POR3, POR4, POR5, POR6, POR7, POR8, POR9, POR10, said surface portion POR1, POR2, POR3, POR4, POR5, POR6, POR7, POR8, POR9, POR10 is measured. The measurements may therefore represent a group of values from the same location from separate self-similar product surfaces 101.

Micro Contoured Surface Layer—Colour Measurements

The composite CMP1 product may be provided having a specific colour value. Some applications may desire coloured composite CMP1 products comprising constant quality in colour and surface properties. For example, a light or dark composite CMP1 product surface 101, 102 may be desired. The hue, saturation or the chroma of the color may have an effect on the absorbance of light and heat. A dark surface may absorb more heat than a light surface. The micro contoured surface layer comprising micro contours G2 may be used in combination with the specific colour value to both give a visually pleasing appearance and desired surface properties to a composite CMP1 surface.

To visualize, determine or compare the micro contoured surface layer and colour value of a composite CMP1 surface or surfaces 101, 102 methods such as ink-absorbency value (SCAN-P 70:09) or CIE-standard using CIE Lab –colour values with GretagMacbeth Spectrolino may be used. The CIE colour chart defines L, a and b axes, wherein a specific colour may comprise a value for the L, a and b coordinates. A CIELab colour chart value may be determined for a specific area, such as a surface portion POR1. Preferably, the CIELab colour chart value may be determined for multiple surface portions POR1, POR2, POR3, POR4, POR5, POR6, POR7, POR8, POR9, POR10, wherein each surface portion POR1, POR2, POR3, POR4, POR5, POR6, POR7, POR8, POR9, POR10 may comprise a specific CIElab color value.

An example of Spectrolino method measuring conditions for determining CIE Lab –colour values is given below:
calibration of the device with an ABS white standard
annular optics 45°/0° for measuring geometry
a measuring diaphragm comprising a diameter 4 mm
light source, such as a gas filled type A light tungsten lamp
spectral measurement by holographic defraction grating
definition from 380 to 730 nm at 10 nm intervals.
colorimetric analysis with D65 light type
colorimetric analysis observation angle of 10°.
measuring time 2 s.
a short term repeatability of 0.02 DE CIE.

For injection moulded composite CMP1 products the measurement may be performed with 4 mm diameter measurement probe on self-similar products. Self-similar products are, for example composite CMP1 products comprising the same shape and/or products having been manufactured using a workpiece 200 with a self-similar shape. Multiple measurement, such as 1, 2, 3, 4, 5 or up to 10 times are performed such that on each composite CMP1 product a first surface portion POR1 on the same position in each composite CMP1 product is measured, to provide more information of the colour value. This may further be used to enhance the representativeness of the measurement results.

The maximum deviation in any surface direction $S_x$, $S_y$ of any measurement from the centre of the surface portion POR1 is 3 mm. Injection moulded composite CMP1 products 100 should be done with stable process conditions targeting to constant quality in colour and surface properties.

For composite CMP1 products comprising extrusion profiles or sheets the measurement may be performed in the direction of the mass flow $S_{FLV}$ with 4 mm diameter measurement probe. Multiple measurement, such as 1, 2, 3, 4, 5 or up to 10 or more times are performed such that on each composite CMP1 product a first, second, third, fourth, fifth and/or up to tenth surface portion POR1, POR2, POR3, POR4, POR5, POR6, POR7, POR8, POR9, POR10 in each composite CMP1 product is measured, to provide more information of the colour value. The multiple measurements may be performed in the direction of the mass flow $S_{FLV}$ such that the distance between two adjacent surface portions POR1, POR2, is 20±5 mm in the direction of the mass flow $S_{FLV}$. From a composite CMP1 product comprising a height H3, length L3 and a width w3, the position of the surface portions POR1, POR2, POR3, POR4, POR5, POR6, POR7, POR8, POR9, POR10 may be selected such that distances d10 and d11 from the centre of the surface portion POR1 to the product edges and perpendicular to the direction of the mass flow $S_{FLV}$ are equal, with a maximum deviation in the direction perpendicular to the direction of the mass flow $S_{FLV}$ being 3 mm.

The ink-absorbency properties of a composite CMP1 surface may be determined by measuring colour difference at a given timepoint between a standard, such as unstained, and a stained sample. Depending of the ink, the staining test may be done either by spreading the ink on a surface 101, 102 or dipping the product 100 in the ink. Depending of the micro contoured surface layer, roughness and darkness or lightness of the composite CMP1 product, different inks may be used to determine the colour change. For the ink-absorbency determination, any of the following inks and absorption times may be used:
  K&N, 2 minutes
  NP, 2 minutes
  Red Mottle, 2 minutes
  Micro Contour (MC) Blue 2 minutes
  Victorian Blue B, 2 hours
  Red oil O, 2 hours The method for determining the CIE Lab –colour value of a composite CMP1 surface using a ink absorption treatment may comprise:
  providing an ink coating having a thickness of 1 mm, for example with a blade, on a composite CMP1 surface capable to comprising ten or more surface portions (POR1, POR2, POR3, POR4, POR5, PORE, POR7, POR8, POR9, POR10) each having a circular area of at least 2 mm in radius,
  wiping the coated surface portions POR1 to POR10 a first time after 2 minutes with said blade to remove any unabsorbed ink coating
  wiping the coated the coated surface portions POR1 to POR10 a second time after the first swiping with a sheet to remove any excess unabsorbed ink coating
  performing a ink-absorbency measurement, wherein said measurement may be started in a time range of 15 minutes to 120 minutes after the second swiping.

The ink coating may be applied using a template, or suitable device, comprising a flat plate roughly 80×60 mm in size with a thickness of in the range of 0.1 mm, and an opening to enable the ink to be applied to the coated surface portions POR1 to POR10. If no template is available, the ink may be applied with a spatula or roller. The ink is preferably applied over an area having a diameter of at least 35 mm.

The sheet used for the second time wiping may be wipe-off paper, cellulose wadding, soft cotton, or an uncoated, calendered paper grade, having a grammage of 50-60 g/m2 and an air permeance of 0.25-0.50 μm/Pas, according to ISO 5636-3.

Alternatively, the ink absorbency treatment may be modified by immersing the surface into a staining solution comprising ink for ten (10) minutes. This allows the colour pigments of the ink to be absorbed into the micro contoured surface layer of the composite CMP1 product. For the ink-absorbency determination by immersion, the following staining solution may be used:
  Stained corn oil with one drop of MC Blue-ink/10 ml corn oil or
  1% solution of Red Oil O-ink.
  0.2% Victorian Blue B-solution (water based solution)
, as referred to in the FC/TM/14 Clariant Corn Oil Absorbency Test.

When determining the CIE Lab –colour value L, a and/or b of a composite CMP1 surface, measurement are preferably performed from coated and/or uncoated surface portions (POR1, POR2, POR3, POR4, POR5, PORE, POR7, POR8, POR9, POR10). The measurements may be performed both before and after providing the ink coating. Multiple measurements enable the determination of a colour variation $\Delta E_1$ (equation 2) of a surface (or surfaces) in an unstained or a stained state, as well as the determination of a colour difference $\Delta E_2$ (equation 3) a surface (or surfaces) between a stained state and/or an unstained state, as presented below. The stained state refers to a surface (or surfaces) after the ink absorption treatment and the unstained state refers to said surface (or surfaces) prior to the ink absorption treatment. During the measurement the measuring probe is maintained in contact to the surface. The CIE Lab –colour values may be determined using a reflectometer, such as a GretagMacbeth's Spectrolino color measurement instrument.

$$\Delta E_1 = \sqrt[2]{\sigma_L^2 + \sigma_a^2 + \sigma_b^2} \qquad \text{Equation 2}$$

, where $\Delta E_1$ is colour variation, $\sigma_L$ is standard deviation of CIE L –value, $\sigma_a$ is standard deviation of CIE a –value and $\sigma_b$ is standard deviation of CIE b –value.

$$\Delta E_2 = \sqrt{(L_2-L_1)^2 + (a_2-a_1)^2 + (b_2-b_1)^2} \qquad \text{Equation 3}$$

, where $\Delta E_2$ is colour difference, $L_1$ is a CIE L –value before ink absorption, $L_2$ is a CIE L –value after ink absorption, $a_1$ is a CIE a –value before ink absorption, $a_2$ is a CIE a –value after ink absorption, $b_1$ is a CIE b –value before ink absorption and $b_2$ is a CIE b –value after ink absorption.

Preferably, the ink used for a given group of self-similar products 100 may be either a K&N or NP ink pigments. In general, K&N ink pigment may be used on composite surfaces 101, 102 having a dark colour, while NP ink pigment may be used on composite surfaces 101, 102 having a light colour. As a method to select the ink for the colour difference $\Delta E_2$ determination, a comparison between a measured averaged colour difference $\Delta E_2$ value between a K&N and NP stained product surfaces 101, 102 may be used. In the comparison, an averaged colour difference $\Delta E_2$ value determined from a group of 10 or more composite (CMP1) products in a K&N stained state is compared to an averaged colour difference $\Delta E_2$ value determined from another group of 10 or more self-similar composite (CMP1) products in a NP stained state. The stained state having a larger averaged colour difference $\Delta E_2$ value is selected. When the larger colour difference $\Delta E_2$ value is used, it enables a more accurate determination of the level of micro contoured surface layer in a given group of self-similar products 100, wherein the self-similarity refers to the product 100 surface shape, the second roughness level provided by the mould surface, and/or to the colour of the surface 101, 102. However, the method may be performed on any combination of two inks of the following group: K&N, NP, Red Mottle or Micro Contour (MC) Blue. Furthermore, the method may use Victorian Blue B and Red oil O.

Table 13 below shows an example of a colour change determination due to ink absorption on a dark composite CMP1 product comprising matrix material MTX1 and organic natural fiber FIB1 based material. The composite CMP1 product was a black injection moulded product with a surface roughness level $R_a$ equal to or less than 2 μm imprinted by machining a finished mould surface. The matrix material MTX1 comprised polypropylene and the fiber content was in the range of 20 wt-% to 50 wt-%. The CIE Lab –colour values and the colour variation $\Delta E_1$ were determined both before and after providing the ink coating. The CIE Lab –colour values were determined as an average of six or ten measurements, and a standard deviation for the measured values is shown. The colour difference $\Delta E_2$ between the stained state and the unstained state was measured from CIE Lab –values before and after the ink absorption treatment.

TABLE 13

CIE Lab-colour values of a dark composite CMP1 surface.

| Black plate injection moulded | Fibre 20% average | StdDev | Fibre 20% with K&N ink average | StdDev |
|---|---|---|---|---|
| CIE L | 15.88 | 1.088 | 21.16 | 1.651 |
| CIE a | 0.08 | 0.071 | 0.23 | 0.076 |
| CIE b | −0.62 | 0.142 | −2.97 | 0.554 |
| $\Delta E_1$ (Colour variation) | | 1.1 | | 1.7 |
| $\Delta E_2$ (Colour difference) | | | 5.8 | |

| Black plate injection moulded | Fibre 30% average | StdDev | Fibre 30% with K&N ink average | StdDev |
|---|---|---|---|---|
| CIE L | 17.06 | 1.586 | 23.01 | 1.834 |
| CIE a | 0.08 | 0.122 | 0.26 | 0.106 |
| CIE b | −0.39 | 0.140 | −3.05 | 0.689 |
| $\Delta E_1$ (Colour variation) | | 1.6 | | 2.0 |
| $\Delta E_2$ (Colour difference) | | | 6.5 | |

| Black plate injection moulded | Fibre 40% average | StdDev | Fibre 40% with K&N ink average | StdDev |
|---|---|---|---|---|
| CIE L | 19.75 | 1.892 | 24.08 | 3.863 |
| CIE a | 0.01 | 0.079 | 0.15 | 0.044 |
| CIE b | −0.38 | 0.070 | −3.44 | 1.039 |
| $\Delta E_1$ (Colour variation) | | 1.9 | | 4.0 |
| $\Delta E_2$ (Colour difference) | | | 5.3 | |

| Black plate injection moulded | Fibre 50% average | StdDev | Fibre 50% with K&N ink average | StdDev |
|---|---|---|---|---|
| CIE L | 20.50 | 3.955 | 28.67 | 3.767 |
| CIE a | −0.22 | 0.054 | −0.24 | 0.097 |
| CIE b | −0.23 | 0.632 | −3.79 | 0.927 |

TABLE 13-continued

CIE Lab-colour values of a dark composite CMP1 surface.

| | | |
|---|---|---|
| $\Delta E_1$ (Colour variation) | 4.0 | 3.9 |
| $\Delta E_2$ (Colour difference) | | 8.9 |

Table 14 below shows another example of a colour change determination due to ink absorption on dark plastic products and on a dark composite CMP1 product comprising matrix material MTX1 and organic natural fiber FIB1 based material. The plastic products were black injection moulded products comprising polypropylene and had either a spark surface having a surface roughness level $R_a$ of more than 2 μm or machine finished mould surfaces with SPI –values 3, 4 or 5. The composite CMP1 product was a black injection moulded product with a surface roughness level $R_a$ of more than 2 μm imprinted by spark. The matrix material MTX1 comprised polypropylene and the fiber content was in the range of 20 wt-% to 40 wt-%. Every product in the example was a black injection moulded product. The colour difference $\Delta E_2$ between the stained state and the unstained state was measured from CIE Lab –values before and after the ink absorption treatment.

TABLE 14

CIE Lab-colour values of dark plastic product surfaces and of a composite CMP1 surface.

| Black plate injection moulded | PP surface SPI 3 average | StdDev | PP surface SPI 3 with K&N average | StdDev |
|---|---|---|---|---|
| CIE L | 20.29 | 0.284 | 23.12 | 0.336 |
| CIE a | −0.06 | 0.085 | −0.21 | 0.027 |
| CIE b | −3.95 | 0.075 | −4.38 | 0.057 |
| $\Delta E_1$ (Colour variation) | | 0.31 | | 0.34 |
| $\Delta E_2$ (Colour difference) | | | 2.9 | |

| Black plate injection moulded | PP surface SPI 4 average | StdDev | PP surface SPI 4 with K&N average | StdDev |
|---|---|---|---|---|
| CIE L | 25.21 | 0.576 | 27.83 | 0.477 |
| CIE a | −0.06 | 0.064 | −0.10 | 0.050 |
| CIE b | −3.27 | 0.076 | −4.46 | 0.074 |
| $\Delta E_1$ (Colour variation) | | 0.58 | | 0.49 |
| $\Delta E_2$ (Colour difference) | | | 2.9 | |

| Black plate injection moulded | PP surface SPI 5 average | StdDev | PP surface SPI 5 with K&N average | StdDev |
|---|---|---|---|---|
| CIE L | 21.74 | 0.314 | 25.70 | 0.437 |
| CIE a | −0.03 | 0.016 | −0.12 | 0.021 |
| CIE b | −3.74 | 0.039 | −4.55 | 0.057 |
| $\Delta E_1$ (Colour variation) | | 0.32 | | 0.44 |
| $\Delta E_2$ (Colour difference) | | | 4.0 | |

| Black plate injection moulded | PP surface Ra >2 μm average | StdDev | PP surface Ra >2 μm with K&N average | StdDev |
|---|---|---|---|---|

TABLE 14-continued

CIE Lab-colour values of dark plastic product surfaces and of a composite CMP1 surface.

| | | | | |
|---|---|---|---|---|
| CIE L | 29.24 | 0.561 | 34.37 | 0.333 |
| CIE a | −0.01 | 0.032 | −0.15 | 0.032 |
| CIE b | −2.71 | 0.049 | −5.64 | 0.256 |
| $\Delta E_1$ (Colour variation) | | 0.56 | | 0.42 |
| $\Delta E_2$ (Colour difference) | | | 5.9 | |

| Black complex article | CMP1 40 WT-% FIB1 surface Ra >2 μm | | Fibre 40% with K&N ink | |
|---|---|---|---|---|
| injection moulded | average | StdDev | average | StdDev |
| CIE L | 23.20 | 0.088 | 34.30 | 0.698 |
| CIE a | 0.25 | 0.074 | −0.06 | 0.031 |
| CIE b | −0.30 | 0.051 | −6.60 | 0.302 |
| $\Delta E_1$ (Colour variation) | | 0.13 | | 0.76 |
| $\Delta E_2$ (Colour difference) | | | 12.8 | |

Table 15 below shows another example of a colour change determination due to ink absorption on a dark composite CMP1 product comprising matrix material MTX1 and organic natural fiber FIB1 based material. The composite CMP1 product was a blue injection moulded product with a surface roughness level $R_a$ either in the range of 0.5 to 3 μm imprinted by spark machining or had a machine finished grade of mold finish in the range of SPI3 to SPI5. The matrix material MTX1 comprised polypropylene and the fiber content was in the range of 40 wt-%. The colour difference $\Delta E_2$ between the stained state and the unstained state was measured from CIE Lab -values before and after the ink absorption treatment.

TABLE 15

CIE Lab-colour values of a dark composite CMP1 surface.

| Blue plate | CMP1 40 WT-% FIB1 Prod. surface Ra 0.5 | | K&N CMP1 40 WT-% FIB1 Prod. surface Ra 0.5 | |
|---|---|---|---|---|
| injection moulded | average | StdDev | average | StdDev |
| CIE L | 38.15 | 0.114 | 42.21 | 0.705 |
| CIE a | −0.77 | 0.098 | −1.40 | 0.117 |
| CIE b | −39.52 | 0.192 | −34.90 | 0.714 |
| $\Delta E_1$ (Colour variation) | | 0.24 | | 1.01 |
| $\Delta E_2$ (Colour difference) | | | 6.2 | |

| Blue plate | CMP1 40 WT-% FIB1 Prod. surface Ra 3.0 | | K&N CMP1 40 WT-% FIB1 Prod. surface Ra 3.0 | |
|---|---|---|---|---|
| injection moulded | average | StdDev | average | StdDev |
| CIE L | 40.01 | 0.226 | 46.31 | 0.279 |
| CIE a | −0.53 | 0.079 | −1.55 | 0.037 |
| CIE b | −38.29 | 0.262 | −31.56 | 0.232 |
| $\Delta E_1$ (Colour variation) | | 0.35 | | 0.37 |
| $\Delta E_2$ (Colour difference) | | | 9.3 | |

| Blue plate | CMP1 40 WT-% FIB1 Prod. surface SPI 5 | | K&N CMP1 40 WT-% FIB1 Prod. surface SPI 5 | |
|---|---|---|---|---|
| injection moulded | average | StdDev | average | StdDev |
| CIE L | 37.79 | 0.152 | 42.37 | 0.278 |

TABLE 15-continued

CIE Lab-colour values of a dark composite CMP1 surface.

| | | | | |
|---|---|---|---|---|
| CIE a | −0.83 | 0.136 | −1.36 | 0.065 |
| CIE b | −39.88 | 0.208 | −34.96 | 0.287 |
| $\Delta E_1$ (Colour variation) | | 0.29 | | 0.40 |
| $\Delta E_2$ (Colour difference) | | | 6.7 | |

| Blue plate | CMP1 40 WT-% FIB1 Prod. surface SPI 3 | | K&N CMP1 40 WT-% FIB1 Prod. surface SPI 3 | |
|---|---|---|---|---|
| injection moulded | average | StdDev | average | StdDev |
| CIE L | 36.83 | 0.198 | 40.84 | 0.351 |
| CIE a | −0.58 | 0.125 | −0.89 | 0.060 |
| CIE b | −40.99 | 0.206 | −37.18 | 0.262 |
| $\Delta E_1$ (Colour variation) | | 0.31 | | 0.44 |
| $\Delta E_2$ (Colour difference) | | | 5.5 | |

| Blue plate | CMP1 40 WT-% FIB1 Prod. surface Ra 3.0 | | K&N CMP1 40 WT-% FIB1 Prod. surface Ra 2 μm | |
|---|---|---|---|---|
| injection moulded | average | StdDev | average | StdDev |
| CIE L | 40.27 | 0.184 | 46.12 | 0.285 |
| CIE a | −0.32 | 0.400 | −1.71 | 0.431 |
| CIE b | −38.21 | 0.630 | −31.25 | 0.935 |
| $\Delta E_1$ (Colour variation) | | 0.77 | | 1.07 |
| $\Delta E_2$ (Colour difference) | | | 9.2 | |

Table 16 below shows an example of a colour change determination due to ink absorption on a light shade composite CMP1 product comprising matrix material MTX1 and organic natural fiber FIB1 based material. The composite CMP1 products were a white and beige injection moulded products with a surface roughness level $R_a$ above 2 μm imprinted by spark machining. The matrix material MTX1 comprised polypropylene and the fiber content was in the range of 20 wt-% to 50 wt-%. The CIE Lab -colour values and the Delta E colour variation were determined both before and after providing the ink coating. The colour difference $\Delta E_2$ between the stained state and the unstained state was measured from CIE Lab -values before and after the ink absorption treatment.

TABLE 16

CIE Lab-colour values of a light colour composite CMP1 surface.

| White complex article | CMP1 40 wt-% FIB1 | | CMP1 40 wt-% FIB1 with NP ink | |
|---|---|---|---|---|
| injection moulded | average | StdDev | average | StdDev |
| CIE L | 94.31 | 0.469 | 72.05 | 3.776 |
| CIE a | 0.42 | 0.208 | −1.37 | 0.308 |
| CIE b | 6.55 | 0.529 | −0.22 | 0.981 |
| $\Delta E_1$ (Internal) | | 0.7 | | 3.9 |
| $\Delta E_2$ (Colour difference) | | | 23.3 | |

| White complex article | CMP1 40 wt-% FIB1 | | CMP1 40 wt-% FIB1 with K&N ink | |
|---|---|---|---|---|
| injection moulded | average | StdDev | average | StdDev |
| CIE L | 94.74 | 0.394 | 88.56 | 1.055 |
| CIE a | 0.39 | 0.183 | 0.83 | 0.091 |
| CIE b | 6.58 | 0.487 | 4.88 | 0.161 |
| $\Delta E_1$ (Internal) | | 0.7 | | 1.1 |

TABLE 16-continued

CIE Lab-colour values of a light colour composite CMP1 surface.

| | | | | |
|---|---|---|---|---|
| $\Delta E_2$ (Colour difference) | | 6.4 | | |

| Beige complex article | CMP1 40 wt-% FIB1 | | CMP1 40 wt-% FIB1 with NP ink | |
|---|---|---|---|---|
| injection moulded | average | StdDev | average | StdDev |
| CIE L | 58.57 | 0.592 | 49.46 | 0.756 |
| CIE a | 1.94 | 0.318 | 0.92 | 0.276 |
| CIE b | 16.45 | 0.375 | 12.83 | 0.616 |
| $\Delta E_1$ (Internal) | | 0.8 | | 1.0 |
| $\Delta E_2$ (Colour difference) | | | 9.9 | |

Table 17 below shows another example of a colour change determination due to ink absorption on light shade plastic products. The plastic products were light coloured injection moulded products having a machine finished mould surface comprising polypropylene, and polypropylene comprising 20 wt-% of talc and had either a spark surface or a surface roughness level $R_a$ of less than 2 μm. The colour difference $\Delta E_2$ between the stained state and the unstained state was measured from CIE Lab –values before and after the ink absorption treatment.

TABLE 17

CIE Lab-colour values of light shade plastic product surfaces.

| Light coloured plate | PP + 20% Talc Ra <2 μm | | PP + 20% Talc with NP ink | |
|---|---|---|---|---|
| injection moulded | average | StdDev | average | StdDev |
| CIE L | 61.89 | 0.077 | 60.52 | 0.199 |
| CIE a | −0.52 | 0.010 | −0.70 | 0.024 |
| CIE b | 0.61 | 0.028 | 0.25 | 0.096 |
| $\Delta E_1$ (Internal) | | 0.08 | | 0.22 |
| $\Delta E_2$ (Colour difference) | | | 1.4 | |

| Light coloured plate | PP surface Ra <2 μm | | PP surface Ra <2 μm NP ink | |
|---|---|---|---|---|
| injection moulded | average | StdDev | average | StdDev |
| CIE L | 48.19 | 0.286 | 48.69 | 0.202 |
| CIE a | −0.60 | 0.078 | −0.74 | 0.038 |
| CIE b | −2.64 | 0.128 | −2.70 | 0.084 |
| $\Delta E_1$ (Internal) | | 0.32 | | 0.22 |
| $\Delta E_2$ (Colour difference) | | | 0.5 | |

Table 18 below shows an example of a colour change determination due to ink absorption on a light shade composite CMP1 product comprising matrix material MTX1 and organic natural fiber FIB1 based material. The composite CMP1 product was a green injection moulded product with a surface roughness level $R_a$ less than 2 μm imprinted by spark machining. The matrix material MTX1 comprised polypropylene and the fiber content was in the range of 20 wt-% to 40 wt-%. The CIE Lab –colour values and the colour variance $\Delta E_1$ were determined both before and after providing the ink coating. The colour difference $\Delta E_2$ between the stained state and the unstained state was measured from CIE Lab –values before and after the ink absorption treatment.

TABLE 18

CIE Lab-colour values of a light shade composite CMP1 surface.

| Green coloured plate | CMP1 20 wt-% | | CMP1 20 wt-% FIB1 with NP ink | |
|---|---|---|---|---|
| injection moulded | average | StdDev | average | StdDev |
| CIE L | 69.16 | 0.300 | 64.42 | 0.472 |
| CIE a | −40.29 | 0.113 | −36.45 | 0.210 |
| CIE b | 52.39 | 0.287 | 45.44 | 0.349 |
| $\Delta E_1$ (Internal) | | 0.43 | | 0.62 |
| $\Delta E_2$ (Colour difference) | | | 9.2 | |

| Green coloured plate | CMP1 40 wt-% | | CMP1 40 wt-% FIB1 with NP ink | |
|---|---|---|---|---|
| injection moulded | average | StdDev | average | StdDev |
| CIE L | 67.54 | 0.321 | 61.41 | 1.238 |
| CIE a | −37.00 | 0.823 | −34.56 | 1.700 |
| CIE b | 53.78 | 1.296 | 49.55 | 3.252 |
| $\Delta E_1$ (Internal) | | 1.57 | | 3.87 |
| $\Delta E_2$ (Colour difference) | | | 7.8 | |

Another example in Table 19 below shows an example of a colour change determination due to ink absorption on an dark composite CMP1 product comprising matrix material MTX1 and organic natural fiber FIB1 based material. The composite CMP1 products were black extrusion sheets having a thickness in the range of 1 to 2 mm with a surface roughness level $R_a$ less than 2 μm and equal to or more than 2 μm. The matrix material MTX1 comprised polyolefine. The CIE Lab –colour values and the colour variance $\Delta E_1$ were determined both before and after providing the ink coating. The colour difference $\Delta E_2$ between the stained state and the unstained state was measured from CIE Lab –values before and after the ink absorption treatment.

TABLE 19

CIE Lab-colour values of a dark extruded composite CMP1 surface.

| Black extruded | CMP1 20 wt-% FIB1. Ra <2 μm | | CMP1 20 wt-% FIB1, with K&N ink | |
|---|---|---|---|---|
| 1.2 mm sheet | average | StdDev | average | StdDev |
| CIE L | 23.06 | 0.575 | 30.34 | 0.649 |
| CIE a | 0.06 | 0.075 | −0.05 | 0.015 |
| CIE b | −0.27 | 0.057 | −4.33 | 0.186 |
| $\Delta E_1$ (Colour variation) | | 0.58 | | 0.68 |
| $\Delta E_2$ (Colour difference) | | | 8.3 | |

| Black extruded | CMP1 20 wt-% FIB1. Ra >2 μm | | CMP1 20 wt-% FIB1. with K&N ink | |
|---|---|---|---|---|
| 1.2 mm sheet | average | StdDev | average | StdDev |
| CIE L | 24.44 | 0.275 | 39.69 | 1.105 |
| CIE a | 0.18 | 0.017 | −0.31 | 0.080 |
| CIE b | −0.12 | 0.035 | −7.40 | 0.352 |
| $\Delta E_1$ (Colour variation) | | 0.28 | | 1.16 |
| $\Delta E_2$ (Colour difference) | | | 16.9 | |

Another example in Table 20 below shows an example of a colour change determination due to ink absorption on an light shade composite CMP1 product comprising matrix material MTX1 and organic natural fiber FIB1 based material. The composite CMP1 products were beige extrusion sheets having a thickness in the range of 4 to 5 mm with a surface roughness level $R_a$ less than 2 μm and equal to or more than 2 μm. The matrix material MTX1 comprised polyolefine. The CIE Lab –colour values and the colour variance $\Delta E_1$ were determined both before and after providing the ink coating. The colour difference $\Delta E_2$ between the stained state and the unstained state was measured from CIE Lab –values before and after the ink absorption treatment.

TABLE 20

CIE Lab-colour values of a light shade extruded composite CMP1 surface.

| Beige extruded 4.8 mm sheet | CMP1 20 wt-% FIB1, Ra <2 μm | | CMP1 20 wt-% FIB1 with NP ink | |
|---|---|---|---|---|
| | average | StdDev | average | StdDev |
| CIE L | 79.29 | 0.150 | 65.80 | 0.681 |
| CIE a | 1.04 | 0.081 | −0.50 | 0.112 |
| CIE b | 11.83 | 0.119 | 6.41 | 0.222 |
| $\Delta E_1$ (Colour variation) | | 0.21 | | 0.72 |
| $\Delta E_2$ (Colour difference) | | | 14.6 | |

| Beige extruded 4.8 mm sheet | CMP1 20 wt-% FIB1, Ra >2 μm | | CMP1 20 wt-% FIB1 with NP ink | |
|---|---|---|---|---|
| | average | StdDev | average | StdDev |
| CIE L | 77.65 | 0.382 | 56.16 | 1.736 |
| CIE a | 0.62 | 0.092 | −0.90 | 0.123 |
| CIE b | 10.37 | 0.295 | 2.47 | 0.454 |
| $\Delta E_1$ (Colour variation) | | 0.49 | | 1.80 |
| $\Delta E_2$ (Colour difference) | | | 22.9 | |

Figure 15A:
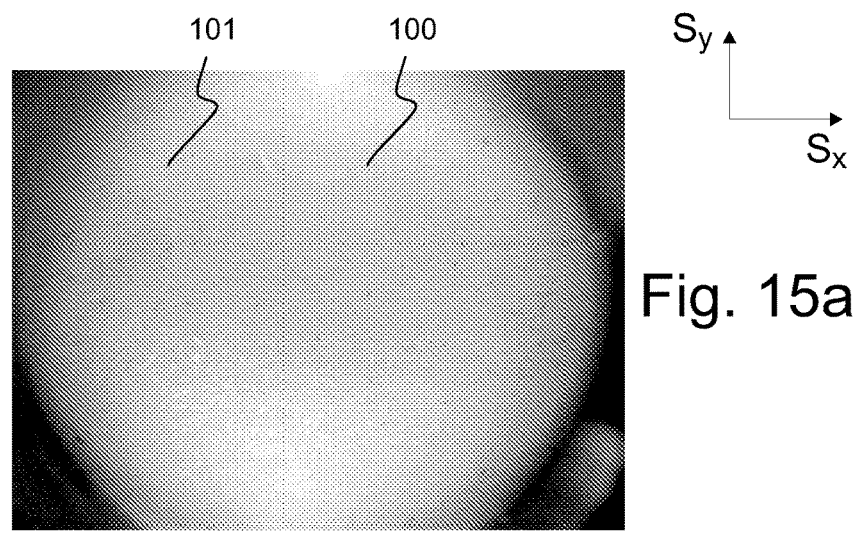
FIGS. 15a, 15b and 15c illustrate another example of composite product surfaces and of a polymer matrix material surface.
Figure 15B:
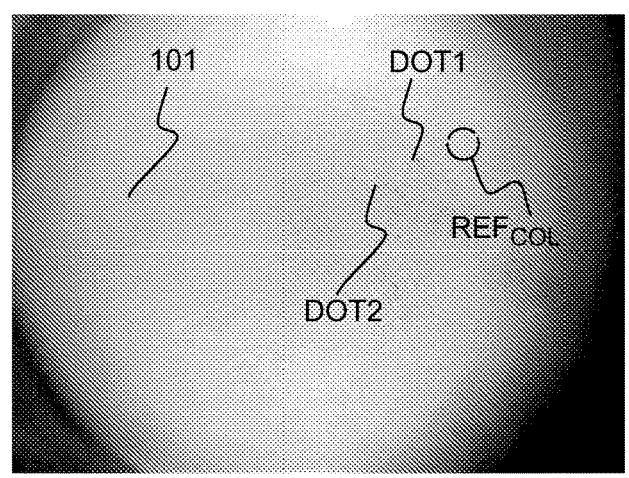
Figure 15C:
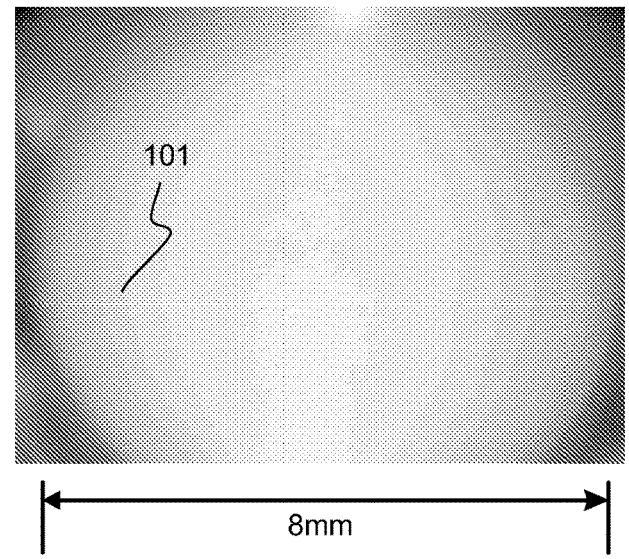

The micro contoured surface layer determinable by a colour value measurement, such as any of the above described methods, may be provided on a composite CMP1 product comprising organic natural fiber FIB1 material, such as Kraft cellulose, preferably in a flake form comprising an even particle size distribution. The specific particle size distribution together with the selected process parameters to obtain a desired level of micro contoured surface layer may be used to promote desired surface properties, such as reduced gloss together with small surface roughness where the gloss may be reduced in a controlled manner, for example in a certain direction. Alternatively, or in addition, the composite CMP1 product may comprise a biodegradable polymer matrix material MTX1. The use of a biodegradable polymer in the matrix material MTX1 may be used to provide products comprising a high grade of recyclability. FIGS. 15a, 15b, and 15c are examples of product surfaces 101. A scale of 8 mm is shown below the figures. FIG. 15a is an example of a composite CMP1 product 100 comprising matrix material MTX1 and 40 wt-% of organic natural fiber FIB1 based material, stained with NP ink. The determined colour difference $\Delta E_2$ from the surface 101 between stained and unstained state was 7.8. FIG. 15b is an example of a composite CMP1 product 100 comprising matrix material MTX1 and 20 wt-% of organic natural fiber FIB1 based material, stained with NP ink. The determined colour difference $\Delta E_2$ from the surface 101 between stained and unstained state was 9.2. FIG. 15c is an example of a product 100 comprising polypropylene matrix material MTX1, stained with NP ink. The determined colour difference $\Delta E_2$ from the surface 101 between stained and unstained state was 9.2. FIG. 15c illustrates an example of a product 100 comprising polypropylene matrix material MTX1, without organic natural fiber FIB1 based material The determined colour difference $\Delta E_2$ from the surface 101 between stained and unstained state was measured from two such products, producing $\Delta E_2$ values of 0.5 and 1.4. Comparison of the evenness and amount of NP ink staining between the product surfaces 101 in each of the FIGS. 15a, 15b and 15c show the effect of organic natural fiber FIB1 based material in the composite surface 101. In FIG. 15c, the staining is even and light on a polymer matrix material MTX1 surface 101. In FIG. 15b, the surface 101 comprises micro contouring determinable by stained areas DOT1 coloured by the ink pigment spots and reference areas $REF_{COL}$ which comprise less or no amounts of the ink pigment. The surface 101 of the composite CMP1 comprises matrix material MTX1 and 20 wt-% of organic natural fiber FIB1 based material. In FIG. 15a, the surface 101 comprises micro contouring determinable by stained areas DOT1 coloured by the ink pigment spots and reference areas $REF_{COL}$ which comprise less or no amounts of the ink pigment. The surface 101 of the composite CMP1 comprises matrix material MTX1 and 40 wt-% of organic natural fiber FIB1 based material. The FIGS. 15a to 15c show, that addition of increasing levels organic natural fiber FIB1 based material on a composite CMP1 may be used to provide a micro contoured surface layer. Furthermore, different amounts of organic natural fiber FIB1 based material may be used to adjust the surface evenness. By comparing the colour difference $\Delta E_2$ of the surfaces 101 which have no organic natural fiber FIB1 based material, 20 wt-% of organic natural fiber FIB1 based material and 40 wt-% of organic natural fiber FIB1 based material between a stained and unstained state, it may be seen that addition of the organic natural fiber FIB1 based material to the composite further has an effect on the reflective properties and colour of the surface.

Figure 16A:
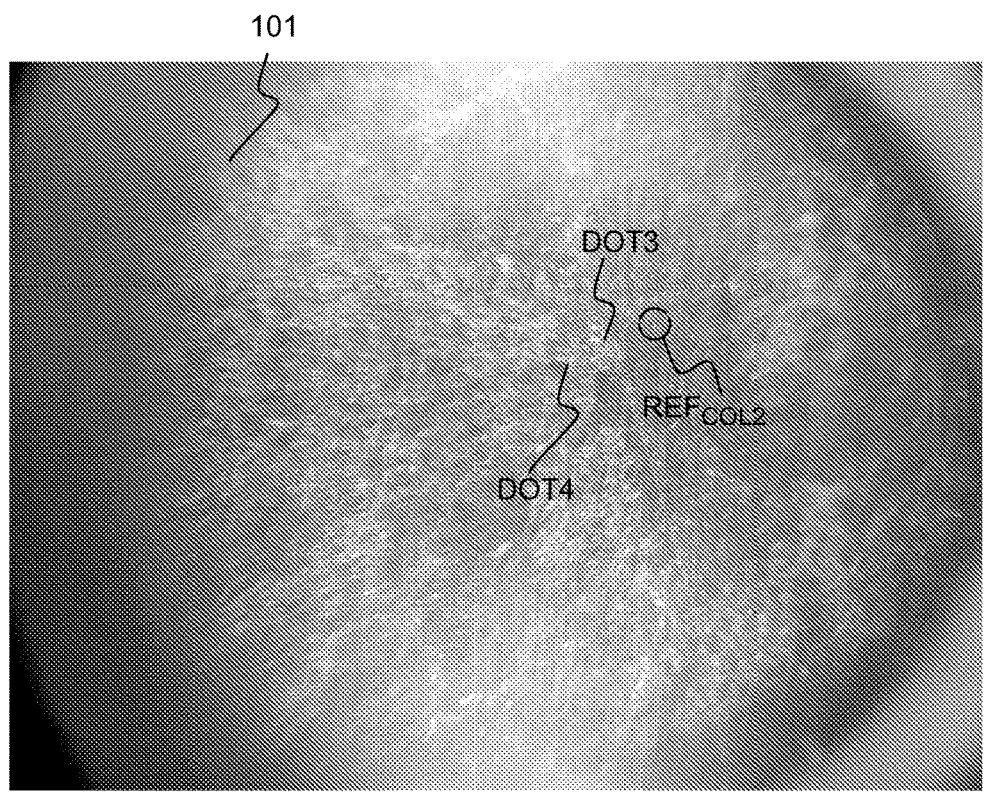
FIGS. 16a and 16b illustrate another example of composite product surfaces.
Figure 16B:
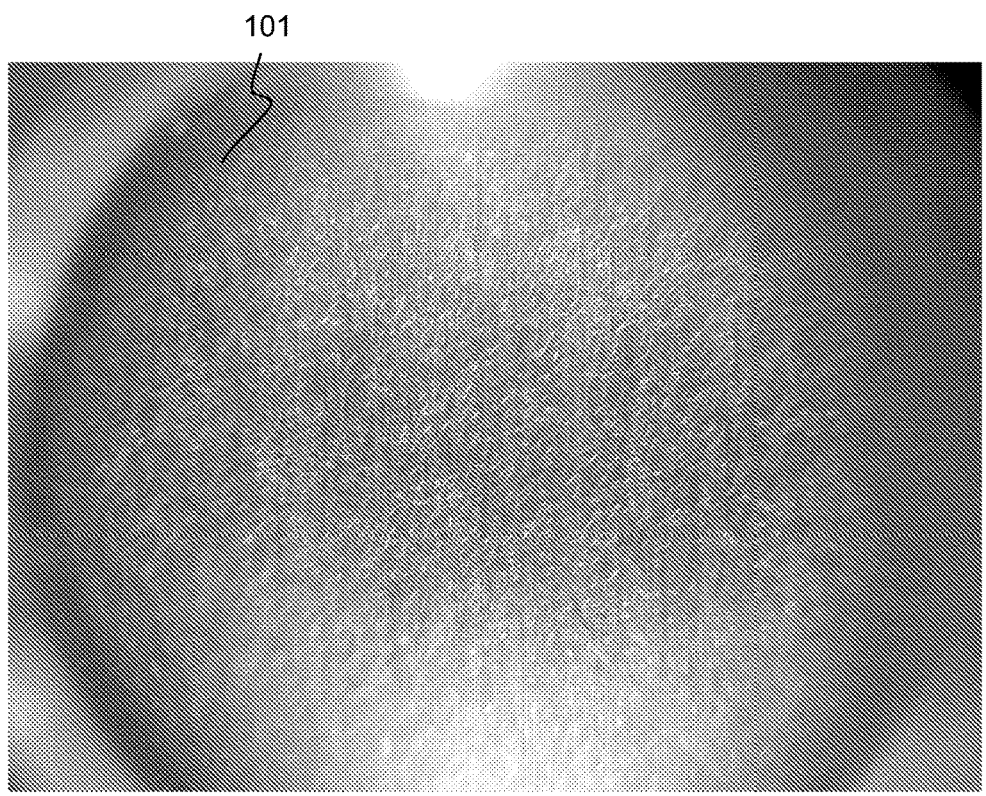

FIGS. 16a and 16b represent K&N stained composite CMP1 surfaces 101 comprising organic natural fiber FIB1 based material. The surfaces between FIGS. 16a and 16b comprise different levels of micro contouring on the surface. FIG. 16a shows the surface 101 comprising micro contouring determinable by unstained areas DOT, DOT4 having less or no amounts of the K&N ink, whereas a reference area $REF_{COL}$ shows a more stained area. As can be seen, the extent and evenness of a surface 101 micro contouring on a composite CMP1 product surface 101 may vary. Products 100 may be provided with differ levels of micro contouring on the surface 101, said level being determinable by, for example, an ink absorbency method using ink pigments such as K&N or NP.

Conclusively, a composite CMP1 comprising thermoplastic polymer matrix material MTX1 and organic natural fiber FIB1 based material and having a surface layer 101, 102 capable to comprise at least 10 non-overlapping surface portions POR1, POR2, POR3, POR4, POR5, POR6, POR7, POR8, POR9, POR10 having a circular shape with a radius of 2 mm, may comprise an averaged colour variance $\Delta E_1$ according to CIELab colour chart values from the at least 10 non-overlapping surface portions POR1, POR2, POR3, POR4, POR5, POR6, POR7, POR8, POR9, POR10 is in the range of 0.3 to 5 in a stained state or in the range of 0.2 to 5 in an unstained state, said stained state referring to a K&N or NP stained surface layer 101, 102.

Alternatively, or in addition, a composite CMP1 comprising thermoplastic polymer matrix material MTX1 and organic natural fiber FIB1 based material and having a surface layer 101, 102 capable to comprise at least 10 non-overlapping surface portions POR1, POR2, POR3, POR4, POR5, POR6, POR7, POR8, POR9, POR10 having a circular shape with a radius of 2 mm, may comprise an averaged colour difference $\Delta E_2$ between a stained state and an unstained state of CIELab colour chart values from the at least 10 non-overlapping surface portions POR1, POR2, POR3, POR4, POR5, POR6, POR7, POR8, POR9, POR10 is at least 3, when a third roughness level of said surface layer 101, 102 is equal to or less than 2 μm, and at least 6, when said third roughness level of said surface layer 101, 102 is higher than 2 μm.

When having more than one self-similar composite CMP1 products, an averaged colour variance $\Delta E_1$ may be determined, for example from a group of 10 or more self-similar composite CMP1 products. Therefore, a composite CMP1 may comprise matrix material MTX1 and organic natural fiber FIB1 based material, the matrix material MTX1 comprising a thermoplastic polymer, the composite CMP1 having a surface layer 101, 102, said surface layer 101, 102 having capability to a surface portion POR1 having a circular shape with a radius of 2 mm, wherein a group of 10 or more self-similar composite CMP1 products comprises an averaged colour variance $\Delta E_1$ in the range of 0.3 to 5 in a stained state or in the range of 0.2 to 5 in an unstained state, said averaged colour variance $\Delta E_1$ value referring to CIELab colour chart values from the surface portion POR1 in each of said products, said stained state referring to a K&N or NP stained surface layer 101, 102.

When having more than one self-similar composite CMP1 products, an averaged colour difference $\Delta E_2$ may be determined, for example from a group of 10 or more self-similar composite CMP1 products. Therefore, a composite CMP1 may comprise matrix material MTX1 and organic natural fiber FIB1 based material, the matrix material MTX1 comprising a thermoplastic polymer, the composite CMP1 having a surface layer 101, 102, said layer 101, 102 having capability to a surface portion POR1 having a circular shape with a radius of 2 mm, wherein a group of 10 or more self-similar composite CMP1 products comprising an averaged colour difference $\Delta E_2$ between a stained state and an unstained state, said averaged colour difference $\Delta E_2$ being at least 3, when a third roughness level of said surface layer 101, 102 is equal to or less than 2 μm, and at least 6, when said third roughness level of said surface layer 101, 102 is higher than 2 μm, said colour difference $\Delta E_2$ referring to CIELab colour chart values from the surface portion POR1 in each of said products, said stained state referring to a K&N or NP stained surface layer 101, 102.

On a dark moulded composite CMP1 surface coloured with K&N, having a roughness $R_a$ level up to 2 μm, such as in the range of 0.01 to 2 μm, or a surface degree of polish value (SPI) in the range of 1 to 4, the composite CMP1 product surface having a stained state may comprise a value for colour difference $\Delta E_2$ equal to or more than 3, such as in the range of 3 to 20, preferably in the range of 4 to 7.

On a dark moulded composite CMP1 surface coloured with K&N, having a roughness $R_a$ level above 2 μm, or a SPI above 4, such as 5 or above, the composite CMP1 product surface having a stained state may comprise a value for colour difference $\Delta E_2$ equal to or more than 6, such as in the range of 6 to 30, preferably in the range of 7 to 10.

On a dark extruded composite CMP1 surface coloured with K&N, having a roughness $R_a$ level up to 2 μm, such as in the range of 0.01 to 2 μm, or a SPI in the range of 1 to 4, the composite CMP1 product surface having a stained state may comprise a value for colour difference $\Delta E_2$ equal to or more than 3, such as in the range of 3 to 20, preferably in the range of 4 to 7.

On a dark extruded composite CMP1 surface coloured with K&N, having a roughness $R_a$ level above 2 μm, or a SPI above 4, such as 5 or above, the composite CMP1 product surface having a stained state may comprise a value for colour difference $\Delta E_2$ equal to or more than 6, such as in the range of 6 to 30, preferably in the range of 7 to 10.

On a light shade moulded composite CMP1 surface coloured with NP, having a roughness $R_a$ level up to 2 μm, such as in the range of 0.01 to 2 μm, or a SPI in the range of 1 to 4, the composite CMP1 product surface having a stained state may comprise a value for colour difference $\Delta E_2$ equal to or more than 2, such as in the range of 6 to 30, preferably in the range of 7 to 10.

On a light shade moulded composite CMP1 surface coloured with NP, having a roughness $R_a$ level above 2 μm, or a SPI above 4, such as 5 or above, the composite CMP1 product surface having a stained state may comprise a value for colour difference $\Delta E_2$ equal to or more than 2, such as in the range of 6 to 30, preferably in the range of 7 to 10.

On a light shade extruded composite CMP1 surface coloured with NP, having a roughness $R_a$ level up to 2 μm, such as in the range of 0.01 to 2 μm, or a SPI in the range of 1 to 4, the composite CMP1 product surface having a stained state may comprise a value for colour difference $\Delta E_2$ equal to or more than 2, such as in the range of 6 to 30, preferably in the range of 7 to 15.

On a light shade extruded composite CMP1 surface coloured with NP, having a roughness $R_a$ level above 2 μm, or a SPI above 4, such as 5 or above, the composite CMP1 product surface having a stained state may comprise a value for colour difference $\Delta E_2$ equal to or more than 2, such as in the range of 6 to 30, preferably in the range of 15 to 20.

On a extruded or moulded composite CMP1 surface coloured with NP or K&N, the composite CMP1 product surface having a stained state may comprise a value for colour variation $\Delta E_1$ equal to or more than 0.3, preferably in the range of 0.3 to 5 or in the range of 0.3 to 1, or in the range of 0.6 to 2, most preferably in the range of 2 to 5.

Furthermore, a light shade or a dark shade extruded or moulded composite CMP1 surface having an unstained state may comprise a value for colour variation $\Delta E_1$ or in the range of 0.2 to 5, preferably in the range of 0.3 to 0.7, most preferably in the range of 0.7 to 1.5.

Numbered Examples Relating to the Composite CMP1:

N1. A composite (CMP1) comprising matrix material (MTX1) and organic natural fiber (FIB1) based material,
the matrix material (MTX1) comprising a thermoplastic polymer, and
the composite (CMP1) having a surface layer (101, 102) capable to comprise at least 10 non-overlapping surface portions (POR1, POR2, POR3, POR4, POR5, POR6, POR7, POR8, POR9, POR10) having a circular shape with a radius of 2 mm, wherein
an averaged colour variance ($\Delta E_1$) according to CIELab colour chart values from the at least 10 non-overlapping surface portions (POR1, POR2, POR3, POR4, POR5, POR6, POR7, POR8, POR9, POR10) is in the range of 0.3 to 5 in a stained state or in the range of 0.2 to 5 in an unstained state, said stained state referring to a K&N or NP stained surface layer (101, 102).

N2. A composite (CMP1) comprising matrix material (MTX1) and organic natural fiber (FIB1) based material,
the matrix material (MTX1) comprising a thermoplastic polymer, and
the composite (CMP1) having a surface layer (101, 102) capable to comprise at least 10 non-overlapping surface portions (POR1, POR2, POR3, POR4, POR5, POR6, POR7, POR8, POR9, POR10) having a circular shape with a radius of 2 mm, wherein an averaged colour difference ($\Delta E_2$) between a stained state and an unstained state of CIELab colour chart values from the at least 10 non-overlapping surface portions (POR1, POR2, POR3, POR4, POR5, POR6, POR7, POR8, POR9, POR10) is at least 3, when a third roughness level of said surface layer (101, 102) is equal to or less than 2 μm, and at least 6, when said third roughness level of said surface layer (101, 102) is higher than 2 μm.

N3. A composite (CMP1) comprising matrix material (MTX1) and organic natural fiber (FIB1) based material, the matrix material (MTX1) comprising a thermoplastic polymer, and the composite (CMP1) having a surface layer (101, 102), said surface layer (101, 102) having capability to a surface portion (POR1) having a circular shape with a radius of 2 mm, wherein a group of 10 or more self-similar composite (CMP1) products comprises an averaged colour variance ($\Delta E_1$) in the range of 0.3 to 5 in a stained state or in the range of 0.2 to 5 in an unstained state, said averaged colour variance ($\Delta E_1$) value referring to CIELab colour chart values from the surface portion (POR1) in each of said products, said stained state referring to a K&N or NP stained surface layer (101, 102).

N4. A composite (CMP1) comprising matrix material (MTX1) and organic natural fiber (FIB1) based material, the matrix material (MTX1) comprising a thermoplastic polymer, and the composite (CMP1) having a surface layer (101, 102), said layer (101, 102) having capability to a surface portion (POR1) having a circular shape with a radius of 2 mm, wherein a group of 10 or more self-similar composite (CMP1) products comprising an averaged colour difference ($\Delta E_2$) between a stained state and an unstained state, said averaged colour difference ($\Delta E_2$) being at least 3, when a third roughness level of said surface layer (101, 102) is equal to or less than 2 μm, and at least 6, when said third roughness level of said surface layer (101, 102) is higher than 2 μm, said colour difference ($\Delta E_2$) referring to CIELab colour chart values from the surface portion (POR1) in each of said products, said stained state referring to a K&N or NP stained surface layer (101, 102).

N5. A composite (CMP1) comprising matrix material (MTX1) and organic natural fiber (FIB1) based material, the matrix material (MTX1) comprising a thermoplastic polymer matrix, wherein a first averaged gloss value GV1 from a first group of non-overlapping surface portions (POR1, POR2, POR3, POR4, POR5) on a surface (101, 102) of said composite (CMP1) is different from a second averaged gloss value GV2 from a second group of non-overlapping surface portions (PORE, POR7, POR8, POR9, POR10) on a surface (101, 102) of said composite (CMP1).

N6. A composite (CMP1) comprising matrix material (MTX1) and organic natural fiber (FIB1) based material, the matrix material (MTX1) comprising a thermoplastic polymer, a surface (101, 102) of said composite (CMP1) having a reference kinetic friction coefficient (FR1, FR3, FR5), and a surface (101, 102) of said composite (CMP1) having a kinetic friction coefficient (FR2, FR4, FR6), wherein the reference kinetic friction coefficient (FR1, FR3, FR5), is different from the kinetic friction coefficient (FR2, FR4, FR6).

N7. A composite (CMP1) comprising thermoplastic matrix material (MTX1) and organic natural fiber (FIB1) based material, said composite (CMP1) having a primary surface layer (101, 102) having a primary surface roughness level, a primary gloss value and a primary friction coefficient value, wherein the composition of said composite (CMP1) has been arranged such that the primary surface layer (101, 102) will be converted into a secondary surface layer (101, 102) when softened by heating and cooling said composite (CMP1), the secondary surface layer (101, 102) having a secondary surface roughness level different from the primary surface roughness level and/or a secondary gloss value different from the primary gloss value and/or a secondary kinetic friction coefficient value different from the primary kinetic friction coefficient value.

N8. A composite (CMP1) according to any of the numbered examples 1 to 4, 6 or 7, wherein a first averaged gloss value GV1 from a first group of non-overlapping surface portions (POR1, POR2, POR3, POR4, POR5) on a surface (101, 102) of said composite (CMP1) is different from a second averaged gloss value GV2 from a second group of non-overlapping surface portions (PORE, POR7, POR8, POR9, POR10) on a surface (101, 102) of said composite (CMP1).

N9. A composite (CMP1) according to any of the numbered examples 1 to 5 or 7, further comprising a surface (101, 102) of said composite (CMP1) having a reference kinetic friction coefficient value (FR1, FR3, FR5), and a surface (101, 102) of said composite (CMP1) having a kinetic friction coefficient value (FR2, FR4, FR6), wherein the reference kinetic friction coefficient value (FR1, FR3, FR5), is different from the kinetic friction coefficient value (FR2, FR4, FR6).

N10. A composite (CMP1) according to any of the numbered examples 1 to 6 having a primary surface layer (101, 102) having a primary surface roughness level, a primary gloss value and a primary friction coefficient value, wherein the composition of said composite (CMP1) has been arranged such that the primary surface layer (101, 102) will be converted into a secondary surface layer (101, 102) when softened by heating and cooling said composite (CMP1), the secondary surface layer (101, 102) having a secondary surface roughness level different from the primary surface roughness level and/or a secondary gloss value different from the primary gloss value and/or a secondary kinetic friction coefficient value different from the primary kinetic friction coefficient value.

N11. A composite (CMP1) according to any of the numbered examples 2 to 7, said composite (CMP1) having a surface layer (101, 102) capable to comprise at least 10 non-overlapping surface portions (POR1, POR2, POR3, POR4, POR5, POR6, POR7, POR8, POR9, POR10) having a circular shape with a radius of 2 mm, wherein an averaged colour variance ($\Delta E_1$) according to CIELab colour chart values from the at least 10 non-overlapping surface portions (POR1, POR2, POR3, POR4, POR5, POR6, POR7, POR8, POR9, POR10) is in the range of 0.3 to 5 in a stained state or in the range of 0.2 to 5 in an unstained state, said stained state referring to a K&N or NP stained surface layer (101, 102).

N12. A composite (CMP1) according to numbered example 1 or any of the numbered examples 3 to 7, said composite (CMP1) having a surface layer (101, 102) capable to comprise at least 10 non-overlapping surface portions (POR1, POR2, POR3, POR4, POR5, POR6, POR7, POR8, POR9, POR10) having a circular shape with a radius of 2 mm, wherein
- an averaged colour difference ($\Delta E_2$) between a stained state and an unstained state of CIELab colour chart values from the at least 10 non-overlapping surface portions (POR1, POR2, POR3, POR4, POR5, POR6, POR7, POR8, POR9, POR10) is at least 3, when a third roughness level of said surface layer (101, 102) is equal to or less than 2 μm, and at least 6, when said third roughness level of said surface layer (101, 102) is higher than 2 μm.

N13. A composite (CMP1) according to numbered example 1 or 2 or any of the numbered examples 4 to 7, said composite (CMP1) having a surface layer (101, 102), said surface layer (101, 102) having capability to a surface portion (POR1) having a circular shape with a radius of 2 mm, wherein
- a group of 10 or more self-similar composite (CMP1) products comprises an averaged colour variance ($\Delta E_1$) in the range of 0.3 to 5 in a stained state or in the range of 0.2 to 5 in an unstained state, said averaged colour variance ($\Delta E_1$) value referring to CIELab colour chart values from the surface portion (POR1) in each of said products, said stained state referring to a K&N or NP stained surface layer (101, 102).

N14. A composite (CMP1) according to any of numbered examples 1 to 3 or any of the numbered examples 5 to 7, said composite (CMP1) having a surface layer (101, 102), said layer (101, 102) having capability to a surface portion (POR1) having a circular shape with a radius of 2 mm, wherein
- a group of 10 or more self-similar composite (CMP1) products comprising an averaged colour difference ($\Delta E_2$) between a stained state and an unstained state, said averaged colour difference ($\Delta E_2$) being at least 3, when a third roughness level of said surface layer (101, 102) is equal to or less than 2 μm, and at least 6, when said third roughness level of said surface layer (101, 102) is higher than 2 μm, said colour difference ($\Delta E_2$) referring to CIELab colour chart values from the surface portion (POR1) in each of said products, said stained state referring to a K&N or NP stained surface layer (101, 102).

N15. The composite (CMP1) according to any of the numbered examples 1 to 14, having an averaged colour variance $\Delta E1$ in the range of 0.3 to 1, preferably in the range of 0.6 to 2, most preferably in the range of 2 to 5 in a stained state, said stained state referring to a K&N or NP stained surface layer (101, 102).

N16. The composite (CMP1) according to numbered example 1 or 3 or 11 or 13 or 15, wherein the averaged colour variance ($\Delta E_1$) is preferably in the range of 0.3 to 0.7, most preferably in the range of 0.7 to 1.5 in an unstained state.

N17. The composite (CMP1) according to numbered examples 1 or 3 or 11or 13 or 15, wherein the averaged colour variance ($\Delta E_1$) is preferably in the range of 2 to 5, preferably in the range of 0.6 to 2, most preferably in the range of 0.3 to 1 in a stained state.

N18. The composite (CMP1) according to any of the numbered examples 2, 4 or 12 or 14 or 15, where the averaged colour difference ($\Delta E_2$) is in the range of 3 to 20, preferably in the range of 4 to 7, when said composite (CMP1) has been obtained by moulding and said surface layer (101, 102) has the third roughness level equal to or less than 2 micrometers.

N19. The composite (CMP1) according to any of the numbered examples 2, 4 or 12 or 14 or 15, where the averaged colour difference ($\Delta E_2$) is in the range of 6 to 30, preferably in the range of 7 to 10, when said composite (CMP1) has been obtained by moulding.

N20. The composite (CMP1) according to any of the numbered examples 2, 4 or 12 or 14 or 15, where the averaged colour difference ($\Delta E_2$) is in the range of 3 to 20, preferably in the range of 5 to 10, most preferably in the range of 7 to 10, when said composite (CMP1) has been obtained by extrusion and when said surface layer (101, 102) has the third roughness level equal to or less than 2 micrometers.

N21. The composite (CMP1) according to any of the numbered examples 2, 4 or 12 or 14 or 15, where the averaged colour difference ($\Delta E_2$) is in the range of 6 to 30, preferably in the range of 7 to 20, most preferably in the range of 10 to 20, when said composite (CMP1) has been obtained by extrusion and when said surface layer (101, 102) has the third roughness level larger than 2 micrometers.

N22. The composite (CMP1) according to any of the numbered examples 2, 4 or 12 or 14 or 15, where the averaged colour difference ($\Delta E_2$) is in the range of 6 to 30, preferably in the range of 7 to 15, most preferably in the range of 7 to 10, when said composite (CMP1) has been obtained by extrusion and when said surface layer (101, 102) has the third roughness level equal to or less than 2 micrometers.

N23. The composite (CMP1) according to any of the numbered examples 2, 4 or 12 or 14 or 15, where the averaged colour difference ($\Delta E_2$) is in the range of 6 to 30, preferably in the range of 7 to 20, most preferably in the range of 15 to 20, when said composite (CMP1) has been obtained by extrusion and when said surface layer (101, 102) has the third roughness level larger than 2 micrometers.

Dep. Gloss

N24. The composite (CMP1) according to numbered example 5 or 8, wherein
- adjacent non-overlapping surface portions (POR1, POR2, POR3, POR4, POR5, PORE, POR7, POR8, POR9, POR10) in a group are separated by a distance w11 from each other.

N25. The composite (CMP1) according to numbered example 5 or 8 or 24, wherein the composite (CMP1) has been injection moulded as mass flow through an injection point (INJ1).

N26. The composite (CMP1) according to numbered example 5 or 8 or 24, wherein the composite (CMP1) has been extruded as mass flow through an extrusion point, such as a nozzle (301).

N27. The composite (CMP1) according to numbered examples 5, or 8 or 24 to 26, wherein a third averaged gloss value GV3 measured from a third group of surface portions (POR11, POR12, POR13, POR14, POR15) on the composite (CMP1) surface in the direction of the mass flow $S_{FLV}$ is different from a fourth averaged gloss value GV4 measured from said group of surface portions (POR11, POR12, POR13, POR14, POR15) in a direction perpendicular to the direction of the mass flow $S_{FLV}$.

N28. The composite (CMP1) according to numbered example 27, wherein the third averaged gloss value GV3 is higher than the fourth averaged gloss value GV4 measured from the said group of surface portions (POR11, POR12, POR13, POR14, POR15)

N29. The composite (CMP1) according to numbered examples 27 or 28, wherein the relative percentage difference between the third averaged gloss value GV3 and the fourth averaged gloss value GV4 with reference to the third averaged gloss value GV3 is preferably at least 2%, more preferably at least 3% and most preferably at least 5%.

N30. The composite (CMP1) according to any of numbered examples 27 to 29, wherein the relative percentage difference between the third averaged gloss value GV3 and the fourth averaged gloss value GV4 with reference to the third averaged gloss value GV3 is preferably less than 50%, more preferably less than 35% and most preferably less than 20%.

N31. The composite (CMP1) according to any of numbered examples 27 to 30, wherein the relative percentage difference between the third averaged gloss value GV3 and the fourth averaged gloss value GV4 with reference to the third averaged gloss value is preferably in the range of 2% to 50%, more preferably in the range of 3% to 35% and most preferably in the range of 5% to 20%.

N32. The composite (CMP1) according to numbered example 5 or 8 or any of preceding numbered examples 24 to 31, wherein the averaged gloss value is preferably at least 10, more preferably at least 13 and most preferably at least 15 on a scale of 0 to 100.

N33. The composite (CMP1) according to numbered example 5 8 or any of preceding numbered examples 24 to 32, wherein the averaged gloss value is in the range of 0.1 to 19.5, more preferably in the range of 1 to 16.5, most preferably in the range of 6 to 15.5.

N34. The composite (CMP1) according to numbered example 5 or 8 or any of preceding numbered examples 24 to 33, wherein said first group of surface portions (POR1, POR2, POR3, POR4, POR5) is closer to the injection point (INJ1) than said second group of surface portions (POR6, POR7, POR8, POR9, POR10).

N35. The composite (CMP1) according to numbered example 5 or 8 or any of preceding numbered examples 24 to 34, wherein the composite (CMP1) comprises a first surface (101) and a second surface (102), and said first group of surface portions (POR1, POR2, POR3, POR4, POR5) is on the first surface (101) and said second group of surface portions (POR6, POR7, POR8, POR9, POR10) is on the second surface (102).

N36. The composite (CMP1) according to numbered example 5 or 8 or any of preceding numbered examples 24 to 35, wherein the second averaged gloss value (GV2) is preferably less than 95%, more preferably less than 60% and most preferably less than 45% of the first averaged gloss value (GV1).

N37. The composite (CMP1) according to numbered example 5 or 8 or any of preceding numbered examples 24 to 35, wherein the second averaged gloss value (GV2) is in the range of 40% to 95% of the first averaged gloss value (GV1).

N38. The composite (CMP1) according to numbered example 5 or 8 or any of preceding numbered examples 24 to 35, wherein the second averaged gloss value (GV2) is preferably in the range of 5% to 45%, more preferably in the range of 5% to 25% of the first averaged gloss value (GV1).

N39. The composite (CMP1) according to numbered example 5 or 8 or any of preceding numbered examples 24 to 35, the relative percentage difference between the first averaged gloss value (GV1) and the second averaged gloss value (GV2) with reference to the first averaged gloss value (GV1) is preferably in the range of 15% to 70%, more preferably in the range of 25% to 60%.

N40. The composite (CMP1) according to numbered example 37, the relative percentage difference between the first averaged gloss value (GV1) and the second averaged gloss value (GV2) with reference to the first averaged gloss value (GV1) is preferably in the range of 50% to 95%, more preferably in the range of 60% to 90%.

N41. The composite (CMP1) according to numbered example 6 or 9, comprising a first surface portion (POR1) on a first composite (CMP1) surface (101) having a first reference kinetic friction coefficient value (FR1) in a dry state and a first kinetic friction coefficient value (FR2) in a wet state, wherein the first kinetic coefficient value (FR2) is in the range of 35% to 85%, preferably in the range of 40% to 80%, most preferably in the range of 45% to 75% of the first reference kinetic friction coefficient value (FR1), N42. The composite (CMP1) according to numbered example 41, where the wet state refers to
a state where 30 g of water per square meter has been added on said composite (CMP1) surface (101) having a surface roughness Ra below 20 μm in a dry state or
a state where 120 g of water per square meter has been added on said composite (CMP1) surface (101) having a surface roughness Ra equal to or above 20 μm in a dry state or
a state where water (WATER) has been added on composite (CMP1) surface (101) comprising grooves (GRV1) having a height $h_{surf}$ of at least 0.5 mm such that the water surface ($SURF_W$) level has reached 90% of said height $h_{surf}$.

N43. The composite (CMP1) according to numbered example 6 or 9, comprising a first surface portion (POR1) on a first composite (CMP1) surface (101) having a second reference kinetic friction coefficient value (FR3) in a first direction parallel to the direction of the mass flow ($S_{FLV}$) and a second kinetic friction coefficient value (FR4) in a second direction perpendicular to the direction of the mass flow ($S_{FLV}$), wherein the second reference kinetic coefficient value (FR3) is in the range of 35% to 95%, preferably in the range of 40% to 90%, most preferably in the range of 45% to 85% of the second kinetic friction coefficient value (FR4).

N44. The composite (CMP1) according to numbered example 6 or 9, comprising a first surface portion (POR1) on a first composite (CMP1) surface (101) having a third reference kinetic friction coefficient value (FR5) and a second surface portion (POR2) on a second composite (CMP1) surface (102) having a third kinetic friction coefficient value (FR6), wherein the third kinetic coefficient value (FR6) is at least 5%, or preferably at least 10%, or more preferably at least 15% lower than the third reference kinetic friction coefficient value (FR5).

N45. The composite (CMP1) according to numbered example 44, wherein the third reference kinetic friction coefficient value (FR5) is in a direction parallel to the direction of the mass flow ($S_{FLV}$).

N46. The composite (CMP1) according to numbered example 44, wherein the third kinetic friction coefficient value (FR6) is in a direction parallel to the direction of the mass flow ($S_{FLV}$).

N47. The composite (CMP1) according to numbered example 44, wherein the third reference kinetic friction coefficient value (FR5) is in a direction perpendicular to the direction of the mass flow ($S_{FLV}$).

N48. The composite (CMP1) according to numbered example 44, wherein the third kinetic friction coefficient value (FR6) is in a direction perpendicular to the direction of the mass flow ($S_{FLV}$).

N49. The composite (CMP1) according to numbered example 6 or 9 or 44, wherein the kinetic friction coefficient value (FR2, FR4, FRF6) and the reference kinetic friction coefficient value (FR1, FR3, FR5) is an averaged value.

N50. A composite (CMP1) according to numbered example 7 or 10, wherein said composite (CMP1) has been heated in the range of 2 to 6 minutes, preferably in the range of 4 to 6 minutes in a temperature below 280° C. but at least 20° C., preferably at least 30° C. above a temperature ($T_{heat}$), where the temperature ($T_{heat}$) is selected from the melting point ($T_m$) or the glass transition temperature ($T_g$) of the thermoplastic matrix material (MTX1), whichever of the temperatures ($T_g$, $T_m$) is higher.

N51. A composite (CMP1) according to numbered examples 7 or 10 or 50, wherein the primary surface roughness level is at least 5%, preferably at least 10%, most preferably at least 15% lower than the secondary surface roughness level.

N52. A composite (CMP1) according to numbered examples 7 or 10 or 50, wherein the primary surface roughness level is in the range of 5 to 95%, preferably in the range of 10 to 90%, most preferably in the range of 15 to 85% of the secondary surface roughness level.

N53. A composite (CMP1) according to numbered examples 7 or 10 or 50, wherein the primary kinetic friction coefficient value is at least 5%, preferably at least 10%, most preferably at least 15% lower than the secondary kinetic friction coefficient value.

N54. A composite (CMP1) according to numbered examples 7 or 10 or 50, wherein the primary kinetic friction coefficient value is in the range of 5 to 95%, preferably in the range of 10 to 90%, most preferably in the range of 15 to 85% of the secondary kinetic friction coefficient value.

N55. A composite (CMP1) according to numbered examples 7 or 10 or 50, wherein the secondary gloss value is at least 5%, preferably at least 10%, most preferably at least 15% lower than the primary gloss value.

N56. A composite (CMP1) according to numbered examples 7 or 10 or 50, wherein the secondary gloss value is in the range of 5 to 95%, preferably in the range of 10 to 90%, most preferably in the range of 15 to 85% of the primary gloss value.

N57. The composite (CMP1) according to any of numbered examples 1 to 56, wherein the composite (CMP1) comprises 5-90 wt-%, or preferably 10-75 wt-%, or more preferably 20-65 wt-%, or most preferably 40-60 wt-% of thermoplastic polymer matrix.

N58. The composite (CMP1) according to any of numbered examples 1 to 57, wherein the matrix material (MTX1) comprises 75-90 wt-% of thermoplastic material.

N59. The composite (CMP1) according to any of numbered examples 1 to 58 numbered examples, wherein the matrix material (MTX1) comprises biodegradable polymer, such as poly(lactic acid) (PLA) polymer.

N60. The composite (CMP1) according to any of numbered examples 1 to 59, wherein the matrix material (MTX1) comprises polyolefin.

N61. The composite (CMP1) according to any of numbered examples 1 to 60, wherein the matrix material (MTX1) comprises a polypropylene.

N62. The composite (CMP1) according to any of numbered examples 1 to 61, wherein the matrix material (MTX1) comprises at least 50 wt-%, or preferably 70 wt-%, or more preferably 95 wt-%, or most preferably 100 wt-% of virgin polymer material.

N63. The composite (CMP1) according to any of numbered examples 1 to 62, wherein the organic natural fiber (FIB1) material comprises wood pulp material.

N64. The composite (CMP1) according to any of numbered examples 1 to 63, wherein the organic natural fiber (FIB1) material comprises chemical pulp material.

N65. The composite (CMP1) according to any of numbered examples 1 to 64, wherein the organic natural fiber (FIB1) material comprises chemical wood pulp material.

N66. The composite (CMP1) according to any of numbered examples 1 to 65, wherein the organic natural fiber (FIB1) material comprises organic natural fiber (FIB1) material form a kraft process.

N67. The composite (CMP1) according to any of numbered examples 1 to 66, wherein the organic natural fiber (FIB1) material comprises organic natural fiber (FIB1) material in a flake form.

N68. The composite (CMP1) according to any of numbered examples 1 to 67, wherein the organic natural fiber (FIB1) material comprises fibers in a flake form, wherein the flake form comprises length, width and thickness, and the width of the flake is 2-10 times larger than the thickness of the flake.

N69. The composite (CMP1) according to any of numbered examples 1 to 68, wherein the organic natural fiber (FIB1) material comprises fibers in a flake form, wherein the flake form comprises length, width and thickness, and the width of the flake is at least 2, or preferably at least 2.5, or more preferably at least 3 times the thickness of the flake.

N70. The composite (CMP1) according to any of numbered examples 1 to 69, wherein the organic natural fiber (FIB1) material comprises fibers in a flake form, wherein the flake form comprises length, width and thickness, and the flake form comprising an aspect ratio relating to the ratio of the length to the thickness of 25-1500, or preferably 25-1000, or more preferably 25-500, or most preferably 25-300.

N71. The composite (CMP1) according to any of numbered examples 1 to 70, wherein the organic natural fiber (FIB1) material comprises fibers in a flake form, wherein the flake form comprises length, width and thickness, and the length of the flake is at least 10 times the width of the flake.

N72. The composite (CMP1) according to any of numbered examples 1 to 71, wherein the organic natural fiber (FIB1) material comprises flake form fiber material at least 30 dry wt-%, or at least 50 dry wt-%, or preferably at least 70 dry wt-%, or more preferably at least 80 dry wt-%, or most preferably at least 98 dry wt-% of the total amount of the organic natural fiber (FIB1) material.

N73. The composite (CMP1) according to any of numbered examples 1 to 72, wherein the organic natural fiber (FIB1) material comprises lignin amount of less than 15 wt-%, or preferably less than 5 wt-%, or more preferably less than 1 wt-%, or most preferably less than 0.5 wt-%.

N74. The composite (CMP1) according to any of numbered examples 1 to 73, wherein the organic natural fiber (FIB1) material comprises organic natural fiber (FIB1) components comprising at least partly hollow interior outlined by a tubular organic natural fiber.

N75. The composite (CMP1) according to any of numbered examples 1 to 74, wherein the composite (CMP1) comprises at least 10 wt-%, or preferably at least 20 wt-%, or more preferably at least 30 wt-% of the organic natural fiber (FIB1) material.

N76. The composite (CMP1) according to any of numbered examples 1 to 75, wherein the composite (CMP1) comprises less than 90 wt-%, or preferably less than 70 wt-%, or most preferably less than 60 wt-% of the organic natural fiber (FIB1) material.

N77. The composite (CMP1) according to any of numbered examples 1 to 76, wherein the composite (CMP1) comprises 10-90 wt-%, or preferably 20-70 wt-%, or more preferably most preferably 40-60 wt-% of the organic natural fiber (FIB1) material.

N78. The composite (CMP1) according to any of numbered examples 1 to 77, wherein the organic natural fiber (FIB1) material comprises virgin material of at least 30 wt-%, or at least 40 wt-%, or more preferably at least 60 wt-%, or more preferably at least 80 wt-%, or most preferably at least 90 wt-%.

N79. The composite (CMP1) according to any of numbered examples 1 to 78, wherein the composite (CMP1) comprises an additive comprising at least one of coupling agent, lubricant and inorganic filler.

N80. The composite (CMP1) according to any of numbered examples 1 to 79, wherein the composite (CMP1) comprises 0.5-10.0 wt-%, or preferably 1.5-5.0 wt-%, or more preferably 2.0-3.0 wt-% of coupling agent.

N81. The composite (CMP1) according to any of numbered examples 1 to 80, wherein the composite (CMP1) comprises maleic anhydride based coupling agent.

N82. The composite (CMP1) according to numbered example 81, wherein the coupling agent comprises 0.2-8.0 wt-%, or preferably 1.0-3.0 wt-% of maleic anhydride.

N83. The composite (CMP1) according to any of numbered examples 1 to 82, wherein the composite (CMP1) comprises 0.01 to 5.00 wt-%, or preferably 0.05-3.00 wt-% of lubricant.

N84. The composite (CMP1) according to any of numbered examples 1 to 83, wherein the composite (CMP1) comprises 0-40 wt-%, or preferably 1 to 20 wt-% of inorganic filler(s).

N85. The composite (CMP1) according to any of numbered examples 1 to 84, wherein the composite (CMP1) comprises thermal expansion coefficient of 40-80%, or preferably 50-80%, or more preferably 60-80% of the thermal expansion coefficient of the matrix material.

N86. The composite (CMP1) according to any of numbered examples 1 to 85, wherein the organic natural fiber (FIB1) based material consist of organic natural fiber (FIB1) material.

N87. The composite (CMP1) according to any of numbered examples 1 to 86, wherein the composite (CMP1) is a product.

N88. A component comprising the composite (CMP1) according to any of numbered examples 1 to 86.

N89. A product (100) comprising a component according to numbered example 87 or 88.

N90. A method to manufacture a composite (CMP1) (100), said method comprising
providing a composite (CMP1) melt comprising matrix material (MTX1) having a surface temperature (T1),
providing an amount of organic natural fiber (FIB1) based material to said composite (CMP1) melt in a range of 10 to 90%, preferably 10 to 70%, and most preferably 20 to 50% by weight of the composite (CMP1) melt,
introducing the composite (CMP1) melt to a workpiece (200) surface (201) having a surface temperature ($T_{201}$) and a first roughness level,
providing a micro contouring by cooling the composite (CMP1) melt to form a hardened composite (CMP1) surface (101) comprising a second roughness level and a third roughness level; wherein the second roughness level is equal to the first roughness level and the third roughness level less than the second roughness level.

N91. The method according to numbered example 90, further comprising
selecting the workpiece surface temperature ($T_{201}$) to be less than the composite (CMP1) melt surface temperature (T1) to adjust the rate of the cooling of the composite (CMP1) melt to a hardened composite (CMP1) surface (101, 102).

N92. The method according to numbered example 91, wherein the workpiece surface temperature ($T_{201}$) is in the range of 20° C. to 100° C., preferably in the range of 30° C. to 80° C., most preferably in the range of 50° C. to 80° C.

N93. The method according to numbered example 90, wherein the workpiece surface temperature ($T_{201}$) is above the melting point ($T_m$) of the matrix material (MTX1) when introducing composite (CMP1) is in a melt form, said melting point ($T_m$) being in the range of 100° C. to 280° C., to prevent the hardening of composite (CMP1) melt before formation of the third roughness level in manufacturing of a composite (100).

N94. The method according to any of the numbered examples 90 to 93, further comprising
providing an introduction velocity (v1) to flow said composite (CMP1) melt in a direction $S_{FLV}$ N95. The method according to any of the numbered examples 90 to 94, wherein the introduction velocity (v1) is in a range of 5 to 400 mm/s, preferably 10 to 300 mm/s, most preferably 25 to 250 mm/s, to control the filling or extrusion of the composite (CMP1)

N96. The method according to any of the numbered examples 90 to 95, further comprising
adjusting the third roughness level in manufacturing by
selecting the amount of organic natural fiber (FIB1) based material and/or
selecting the introduction velocity (v1) and/or
selecting the surface temperature ($T_{201}$) of the workpiece (200) and/or
selecting the matrix material (MTX1)

N97. The method according to any of the numbered examples 90 to 96, further comprising
adjusting the formation of the third roughness level in manufacturing by selecting the method of manufacturing.

N98. The method according to any of the numbered examples 90 to 95, further comprising
increasing the third roughness level in manufacturing by
increasing the amount of organic natural fiber (FIB1) based material and/or
decreasing the introduction velocity v1 and/or
decreasing the surface temperature ($T_{201}$) of the workpiece (200)

N99. The method according to any of the numbered examples 90 to 95, further comprising
decreasing the third roughness level in manufacturing by
decreasing the amount of organic natural fiber (FIB1) based material and/or
increasing the introduction velocity (v1) and/or
increasing the surface temperature ($T_{201}$) of the workpiece (200)

N100. The method according to any of the numbered examples 90 to 99, wherein the surface temperature (T1) is above the melting point ($T_m$) of the matrix material (MTX1) when the composite (CMP1) is in a melt form, said melting point ($T_m$) being in the range of 100° C. to 280° C., to prevent the hardening of composite (CMP1) melt before formation of the third roughness level in manufacturing of a composite (100).

N101. The method according to any of the numbered examples 90 to 100, further comprising providing the third roughness level by moulding, extrusion, thermoforming or any combination of these.

N102. The method according to numbered example 101, wherein the composite (100) is manufactured by moulding, such as injection moulding, to provide the third roughness level on the hardened composite (CMP1) surface (101).

N103. The method according to numbered example 101, wherein the composite (100) is manufactured by extrusion to provide a composite (100) comprising a first surface (101) and a second surface (102).

N104. The method according to numbered example 103, wherein the third roughness level may be adjusted after hardening of at least one of the composite (CMP1) surfaces (101, 102).

N105. A method to enhance a surface roughness of a composite (CMP1) (100) comprising;
providing a composite (CMP1) comprising matrix material (MTX1) and organic natural fiber (FIB1) based material having a primary surface layer with a primary surface roughness level, a primary gloss value and a primary friction coefficient
softening said primary surface layer (101, 102) of said composite (CMP1) material by heating,
providing a secondary surface layer (101, 102) of said composite (CMP1) material surface with a secondary surface roughness level, a secondary gloss value and a secondary friction coefficient by cooling said softened surface layer, wherein the secondary surface roughness level is different from the primary surface roughness level and/or a secondary gloss value different is from the primary gloss value and/or a secondary kinetic friction coefficient value is different from the primary kinetic friction coefficient value.

For the person skilled in the art, it will be clear that modifications and variations of the products according to the present invention are perceivable. The drawings are schematic. Any particular embodiments examples described above with reference to the accompanying drawings are illustrative and non-limiting. The method and the products are not limited solely to the above presented embodiments, but may be modified within the scope of the appended numbered examples.

The invention claimed is:

1. A method to manufacture a composite product with micro contoured surface layer, the composite product comprising micro contours on the surface having depth of less than 10 µm, the method comprising
providing a composite melt comprising matrix material and organic natural fiber based material,
introducing the composite melt to a workpiece surface having a first roughness level,
selecting the surface temperature of the workpiece, and
cooling the composite melt to form the composite product having a hardened composite surface comprising a second roughness level and a third roughness level;
wherein the second roughness level is equal to the first roughness level and the third roughness level less than the second roughness level, thereby providing the composite product with micro contoured surface layer.

2. The method according to claim 1, wherein the workpiece surface temperature is in the range of 20° C. to 100° C.

3. The method according to claim 1, wherein the workpiece surface temperature is above the melting point of the matrix material when introducing composite in a melt form, said melting point being in the range of 100° C. to 280° C., to prevent the hardening of composite melt before formation of the third roughness level in manufacturing of a composite product.

4. The method according to claim 1, further comprising providing an introduction velocity to flow the composite melt in a direction $S_{FLV}$, wherein the introduction velocity is in a range of 5 to 400 mm/s to control the filling or extrusion of the composite.

5. The method according to claim 1, further comprising adjusting the third roughness level in manufacturing by
selecting the amount of organic natural fiber based material and/or
selecting the introduction velocity and/or selecting the matrix material.

6. The method according to claim 1, further comprising increasing the third roughness level in manufacturing by
increasing the amount of organic natural fiber based material and/or
decreasing the introduction velocity and/or
decreasing the surface temperature of the workpiece, or
decreasing the third roughness level in manufacturing by
decreasing the amount of organic natural fiber based material and/or
increasing the introduction velocity and/or
increasing the surface temperature of the workpiece.

7. The method according to claim 1, wherein the composite product is manufactured by moulding or extrusion.

8. The method according to claim 1, wherein the third roughness level may be adjusted after hardening of at least one of the composite product surfaces.

9. A method to enhance a surface roughness of a composite product, the composite product comprising:
matrix material and organic natural fiber based material,
the matrix material comprising a thermoplastic polymer,
the composite product comprising micro contours on the surface having a depth of less than 10 µm, and
the composite product having a surface layer capable to comprise at least 10 non-overlapping surface portions having a circular shape with a radius of 2 mm, wherein the micro contoured surface layer has an averaged colour variance (DE1) according to CIELab colour chart values in the range of 0.3 to 5 in a stained state or in the range of 0.2 to 5 in an unstained state, said stained state referring to a K&N or NP stained surface layer, when measured as a averaged colour variance (DE1) according to CIELab colour chart values from the at least 10 non-overlaping surface portions, the method comprising:
providing the composite product comprising matrix material and organic natural fiber based material having a primary surface layer with a primary surface roughness level, a primary gloss value and a primary friction coefficient
softening said primary surface layer of said composite product material by heating and,
providing a secondary surface layer of said composite product material surface layer of said composite product material surface with a secondary surface roughness level, a secondary gloss value and a secondary friction coefficient by cooling said softened surface layer, wherein the secondary surface roughness level is different from the primary surface roughness level and/or a secondary gloss value is different from the primary gloss value and/or a secondary kinetic friction coefficient value is different from the primary kinetic friction coefficient value.

\* \* \* \* \*